RAYMOND C. SIEBERT
INVENTOR.

BY Robert G. Clay

ATTORNEY

Nov. 5, 1968 R. C. SIEBERT 3,409,239

TAPE RECORDING AND REPRODUCING MACHINE

Filed May 4, 1964 17 Sheets-Sheet 2

RAYMOND C. SIEBERT
INVENTOR.

BY Robert G. Clay

ATTORNEY

RAYMOND C. SIEBERT
INVENTOR

BY Robert G. Clay

ATTORNEY

RAYMOND C. SIEBERT
INVENTOR.
BY Robert G. Clay
ATTORNEY

TAPE RECORDING AND REPRODUCING MACHINE

Filed May 4, 1964 17 Sheets-Sheet 5

RAYMOND C. SIEBERT
INVENTOR

BY Robert S. Clay

ATTORNEY

Nov. 5, 1968 R. C. SIEBERT 3,409,239

TAPE RECORDING AND REPRODUCING MACHINE

Filed May 4, 1964 17 Sheets-Sheet 6

RAYMOND C. SIEBERT
INVENTOR.

BY Robert H. Clay

ATTORNEY

TAPE RECORDING AND REPRODUCING MACHINE

Filed May 4, 1964

RAYMOND C. SIEBERT
INVENTOR.
BY Robert G. Clay
ATTORNEY

TAPE RECORDING AND REPRODUCING MACHINE

Filed May 4, 1964

17 Sheets-Sheet 8

RAYMOND C. SIEBERT
INVENTOR

BY Robert G. Clay

ATTORNEY

RAYMOND C. SIEBERT
INVENTOR.

BY Robert G. Clay

ATTORNEY

RAYMOND C. SIEBERT
INVENTOR.
BY Robert G. Clay
ATTORNEY

RAYMOND C. SIEBERT
INVENTOR.

BY Robert S. Clay

ATTORNEY

Nov. 5, 1968 R. C. SIEBERT 3,409,239

TAPE RECORDING AND REPRODUCING MACHINE

Filed May 4, 1964 17 Sheets-Sheet 12

RAYMOND C. SIEBERT
INVENTOR.

BY Robert G. Clay

ATTORNEY

RAYMOND C. SIEBERT
INVENTOR.

BY Robert G. Clay

ATTORNEY

RAYMOND C. SIEBERT
INVENTOR.

BY Robert S. Clay

ATTORNEY

RAYMOND C. SIEBERT
INVENTOR
BY Robert H. Clay
ATTORNEY

RAYMOND C. SIEBERT
INVENTOR.

BY Robert G. Clay

ATTORNEY

RAYMOND C. SIEBERT
INVENTOR.

BY Robert H. Clay

ATTORNEY

United States Patent Office 3,409,239
Patented Nov. 5, 1968

3,409,239
TAPE RECORDING AND REPRODUCING MACHINE
Raymond C. Siebert, Saratoga, Calif., assignor to Ampex Corporation, Redwood City, Calif., a corporation of California
Filed May 4, 1964, Ser. No. 364,668
29 Claims. (Cl. 242—55.12)

This invention relates to tape recording and reproducing machines, and particularly to such machines adapted for recording and reproducing signals on tape in either direction of tape motion.

In the art, particularly as it relates to magnetic tape recording and reproducing machines, it has often been attempted to produce a machine that can record and reproduce a signal on a magnetic tape in two or more tracks extending in both directions along the tape length, in order to make the most efficient use of the tape with the greatest convenience to the operator. For example, the signal may be recorded on one or more parallel tracks on the tape while the tape is moving in a "forward" direction, and when the end of the tape is reached, the tape is stopped and then reversed in direction so as to wind up on the same reel from which it started. During reverse movement, which is conducted at normal recording speed, a continuation of the signal is recorded on another and separate set of parallel tracks on the tape. One track in each direction, or two tracks in all, may be used for ordinary monaural signals. For stereophonic signals, two tracks in each direction, or four in all, must be used. The recording process can also be effected entirely in the forward mode of the machine, but with the tape reversed and inverted for the recording of the second set of tracks; while the subsequent play back of the tape is effected in both forward and reverse modes of the machine, without inverting the tape.

Many of the problems involved in constructing a bi-directional tape transport stem from the fact that the functioning of most transport components is dependent on the direction of tape motion, and components constructed to deal with tape moving in one direction are not ordinarily "reversible" so as to be able to deal with tape moving in the opposite direction. For example, in a uni-directional transport the supply reel may be braked during both forward and reverse operation, the term "supply reel" being understood always to mean the reel from which the tape is being paid off. However the braking forces on the supply reel in reverse motion must be smaller because in a uni-directional transport, reverse motion is ordinarily "fast rewind" motion. Furthermore, when the reels are to be stopped, brakes may be applied to both reels, but the supply reel needs greater braking force than the takeup reel so that the danger of throwing tape loops is avoided. When the machine is resting in stop mode, both reels must be braked but must yet be movable by hand for threading purposes. To meet all these requirements, even a unidirectional machine may have more than one set of brakes; and if the machine is to be adapted for bi-directional operation, such of these brakes as are not reversible must be provided in duplicate. As another example, when it is desired to use a "closed" tape loop in which the tape is driven by one or a pair of capstans both upstream and downstream from the transducing heads, with the capstans differentially arranged to tension the tape in the loop, then the difficulty arises that standard structures for such differential capstans, if reversed in direction of rotation, tend to slacken the tape in the loop instead of tensioning it. Consequently in this case, too, the capstan apparatus would have to be provided in duplicate, with each array adapted for movement of the tape in one of the two directions.

One of the general problems in constructing a bi-directional transport, therefore, is that of reducing the number of duplicate parts and making as many of them reversible as possible, so as to increase the efficiency of operation and enable manufacture of the transport as an inexpensive, commercially competitive product.

Accordingly, it is an object of the present invention to provide a bi-directional tape transport of improved simplicity in manufacture and operation.

It is a further object of the present invention to provide a tape transport as above described and having improved constancy of operation, and particularly low flutter and wow characteristics.

It is still a further object of the present invention to provide a tape transport as above described and suitable for automatic playing and replaying in a variety of operating modes.

It is another object of this invention to produce a self-reversing reel driving apparatus for alternately driving one of a pair of reels as a take-up reel according to the direction of rotation of a rotatable drive member.

It is another object of this invention to provide a reel brake that is self-energizing to produce varying braking forces depending on the operating mode of said reels, and self-reversing according to the direction of rotation of the reels and of a rotatable drive member therefor.

It is another object of this invention to produce a closed-loop capstan drive system that is self-reversing according to the direction of rotation of a rotatable drive member therefor, and that maintains a loop of tape in tensioned condition in either direction of movement.

These and other objects of the invention are accomplished in an apparatus driven by a single reversible electric motor. The motor drives a pair of tape driving capstans in such a way that in either direction of rotation of the motor and capstans, the latter act to tension the tape across the transducing heads. Also coupled to the motor for reversible rotation is a reel drive means that is responsive to the direction of rotation to drive the play takeup reel or to fast wind the tape. A brake for the reels is also provided that is responsive to the direction of tape motion to apply suitable braking forces in the various operating modes of the apparatus.

A better understanding of the invention may be had by reference to the following description, taken in conjunction with the accompanying drawings, in which.

Figure 1:
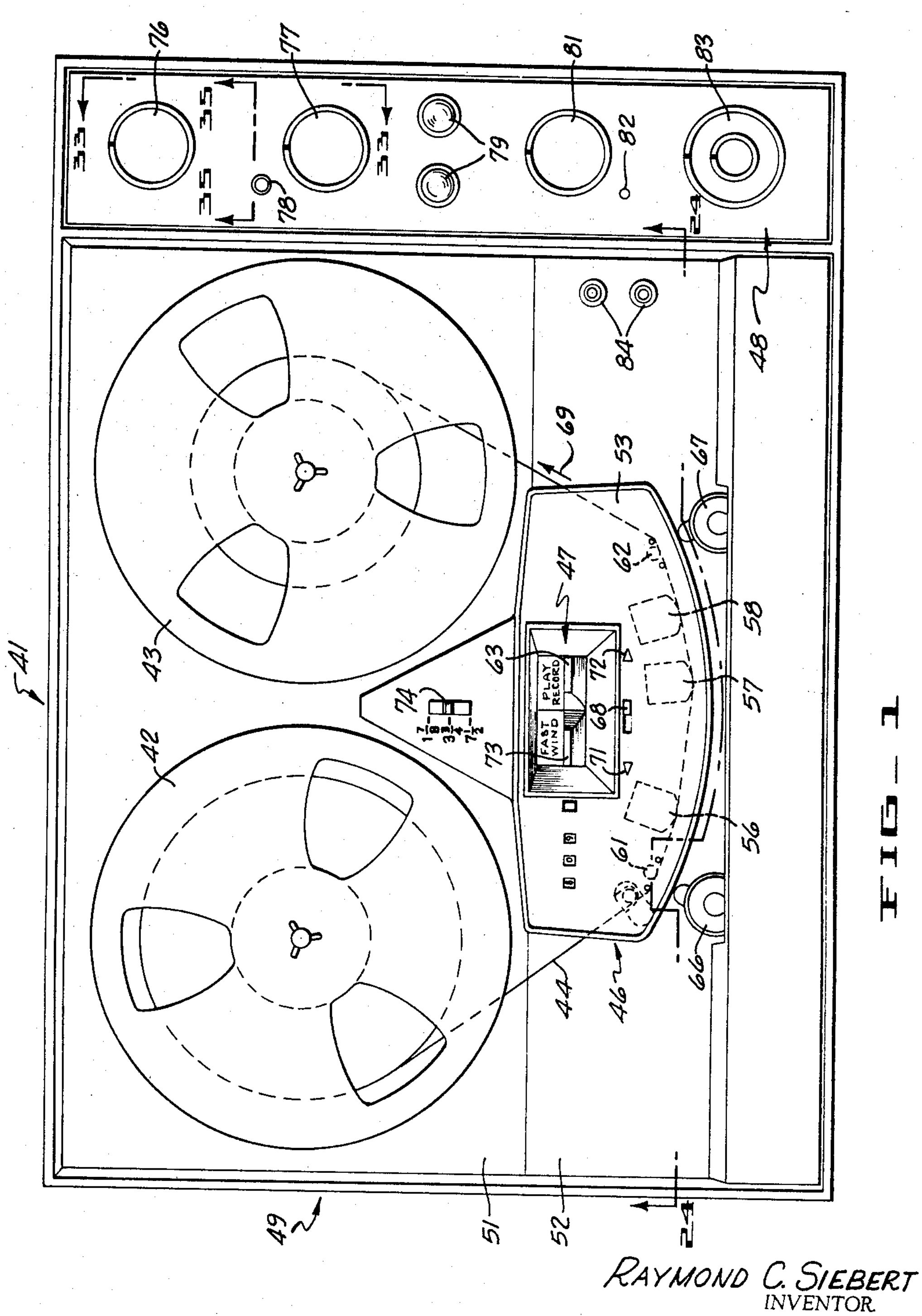
FIGURE 1 is a plan of a tape transport constructed in accordance with the invention.
Figure 2:
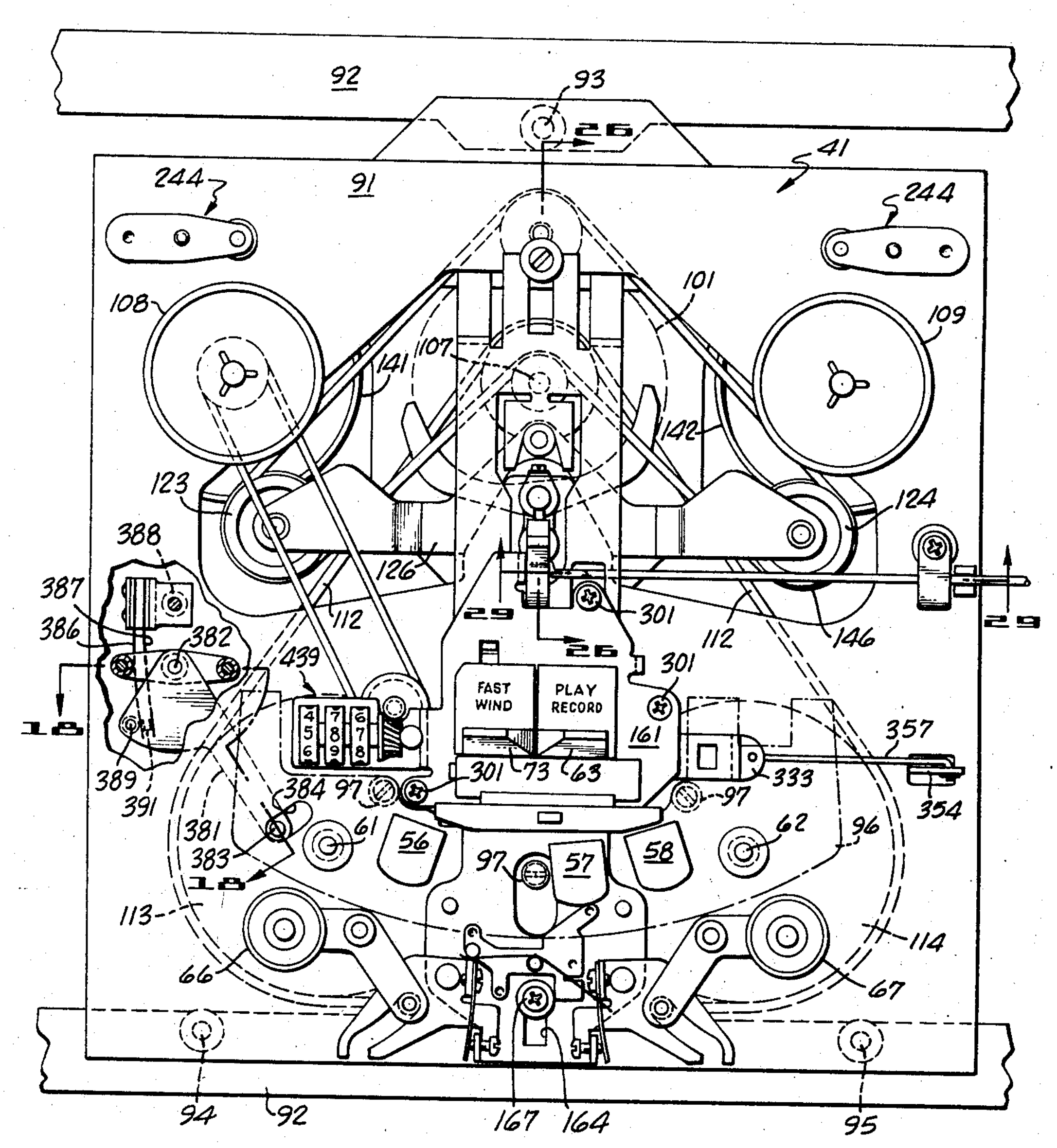
FIGURE 2 is a plan view of the apparatus shown in FIGURE 1 to a slightly enlarged scale and with the cover plate and cabinet removed.
Figure 4:
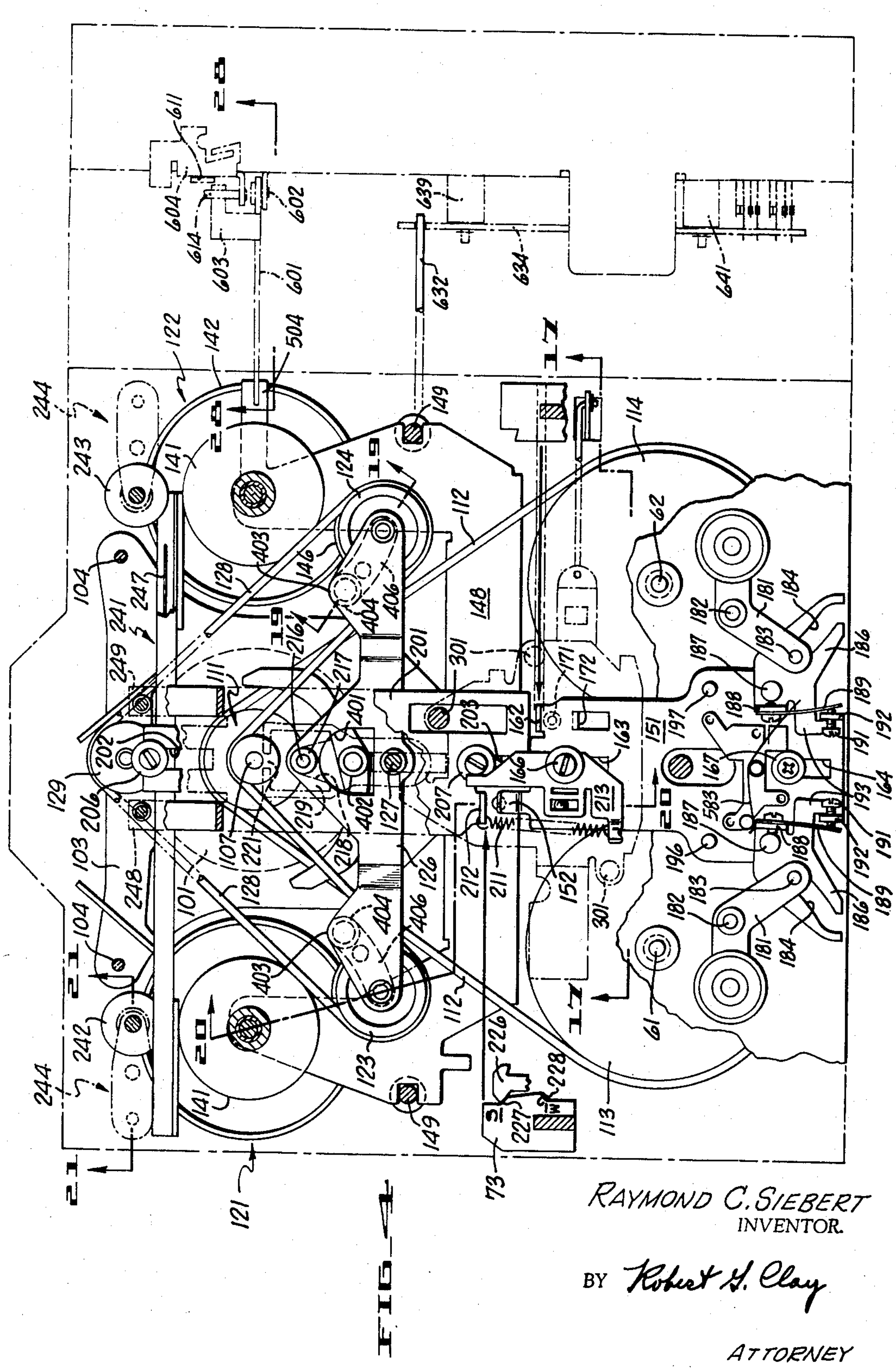
FIGURE 4 is a plan similar to that of FIGURE 2, and to said slightly enlarged scale, but cut away.
Figures 23, 23A:
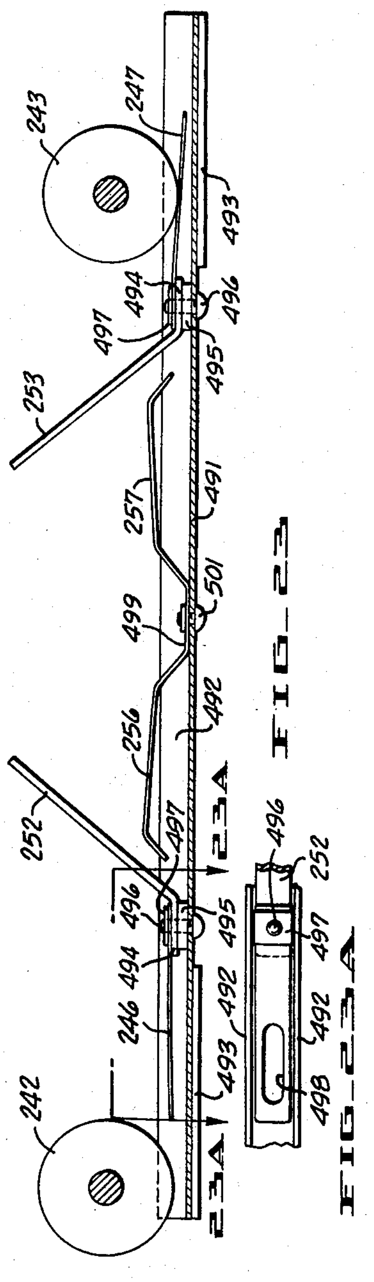
FIGURE 23 is an elevation section, to said further enlarged scale, of the braking apparatus of the invention.
Figures 24, 25:
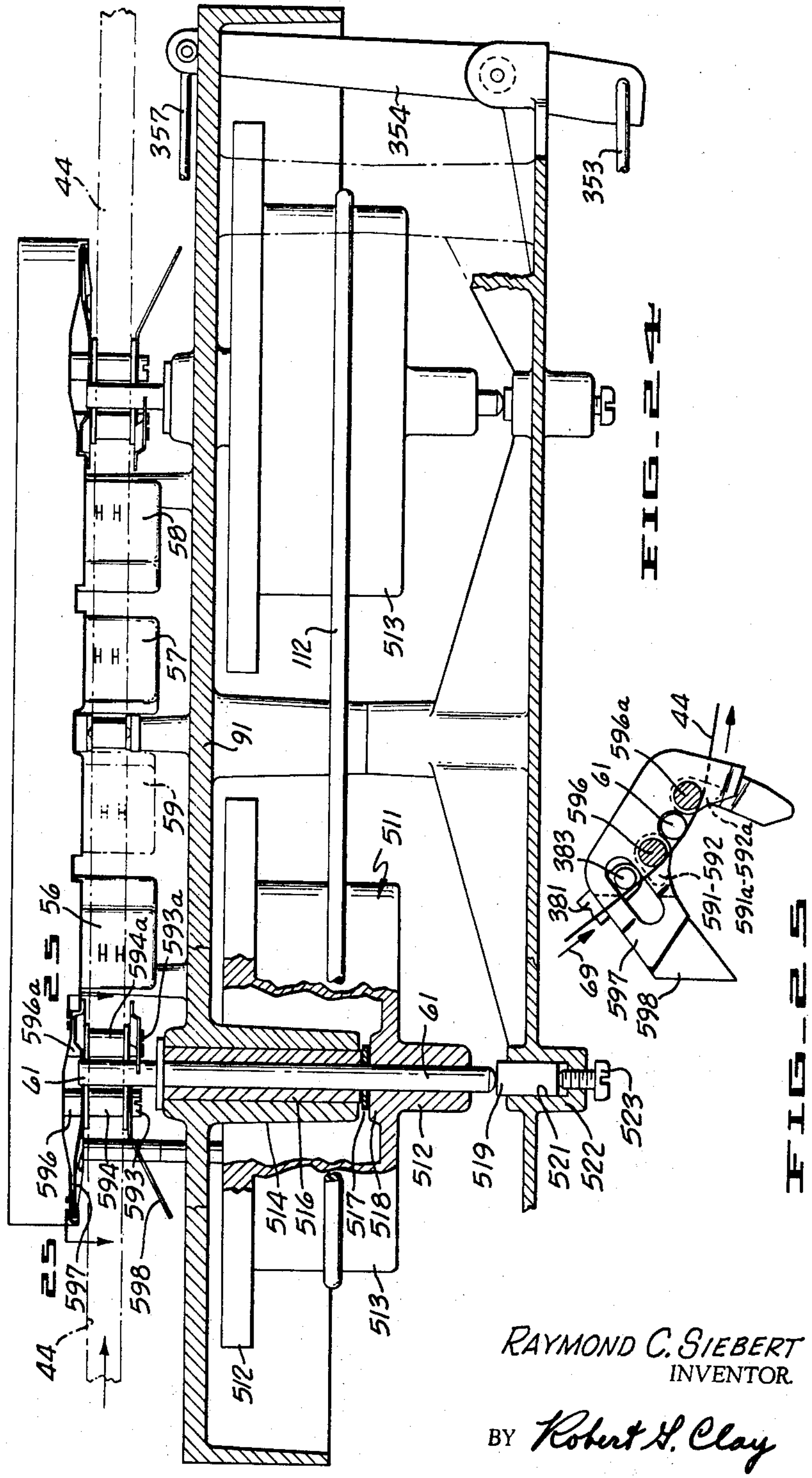
Figure 26:
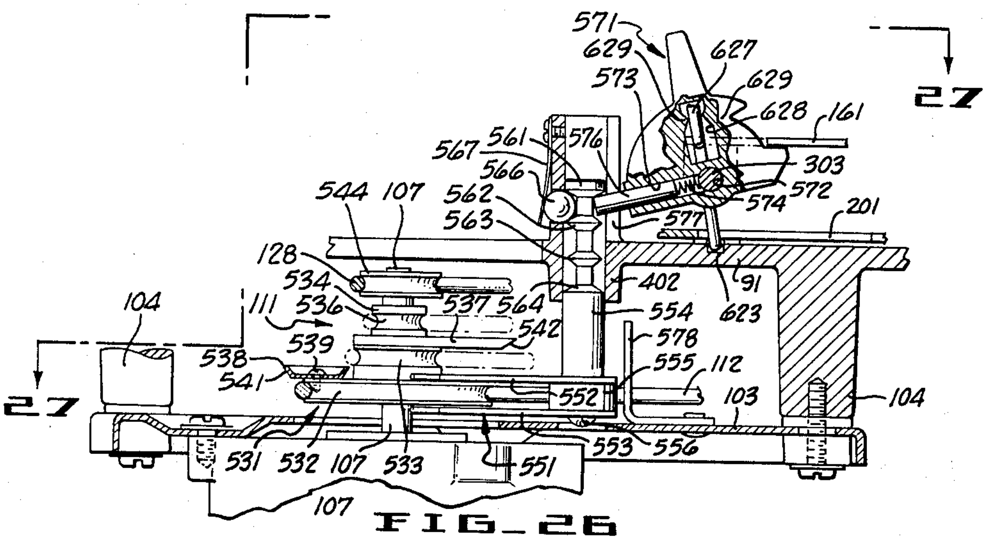
Figure 27:
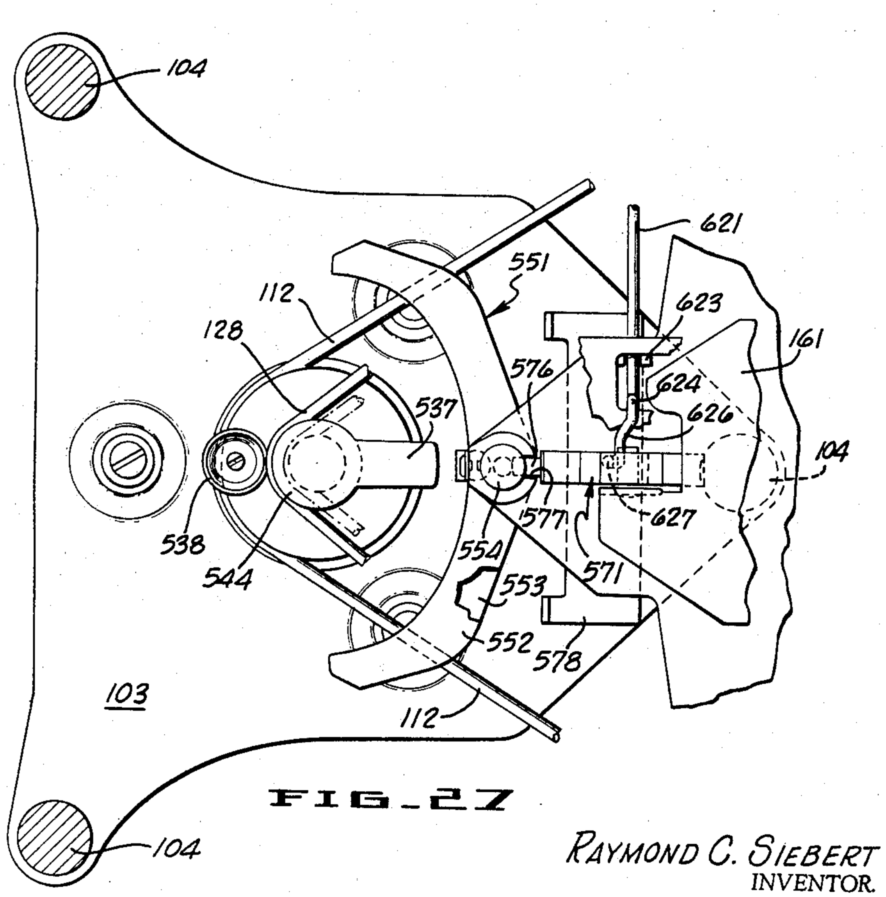
Figure 28:
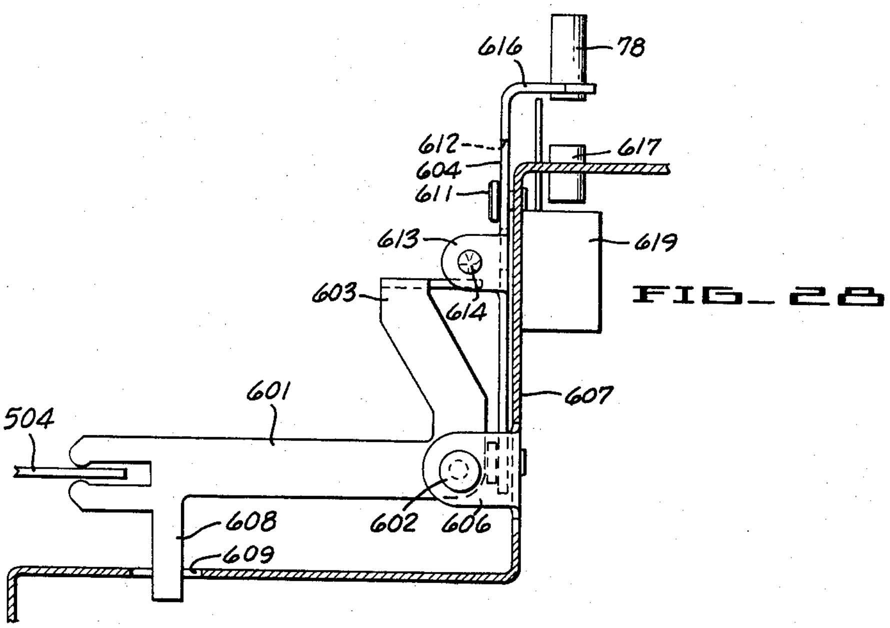
Figure 29:
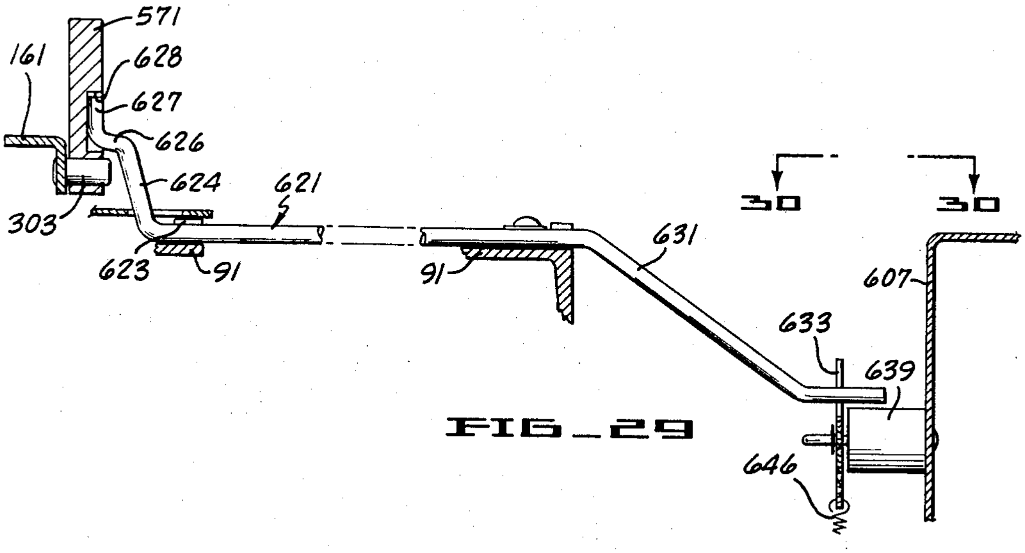
Figure 31:
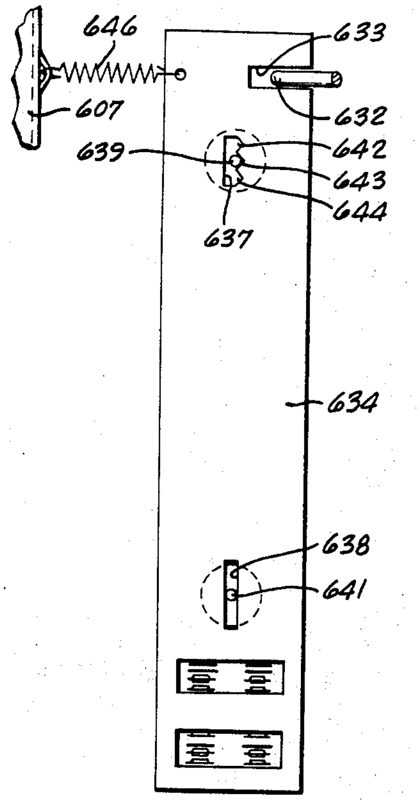
Figure 30:
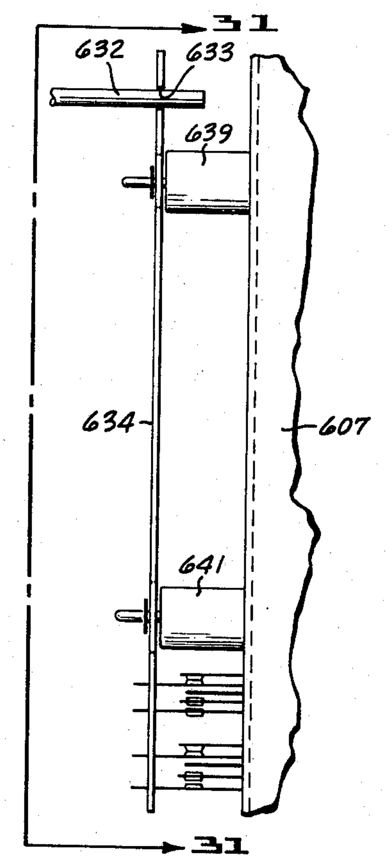
Figure 32:
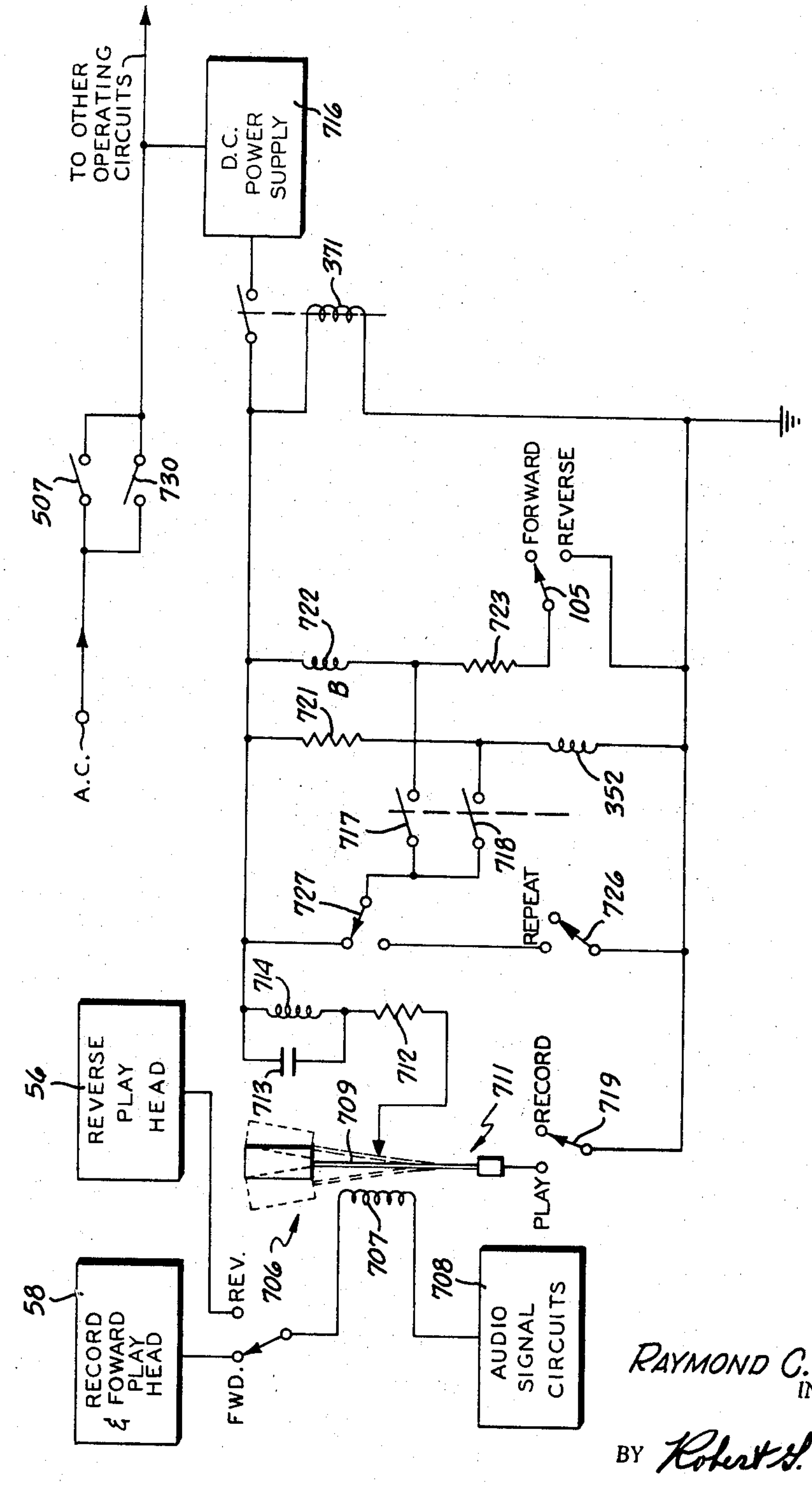
Figure 33:
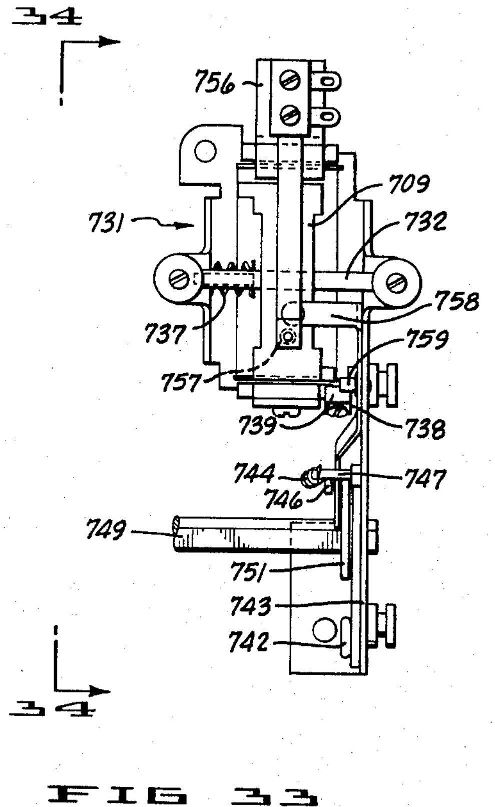
Figure 34:
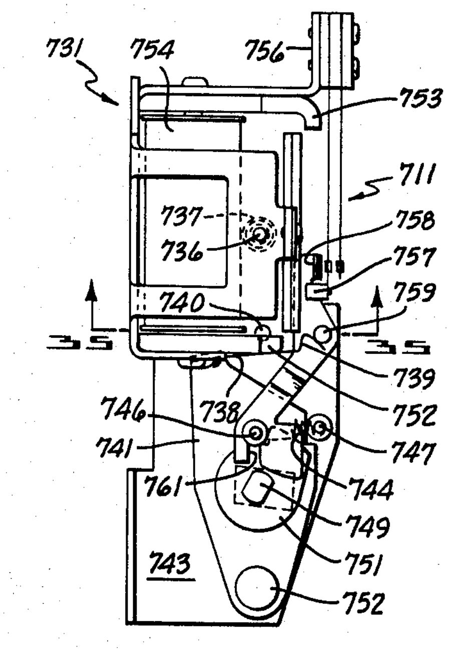
Figure 35:
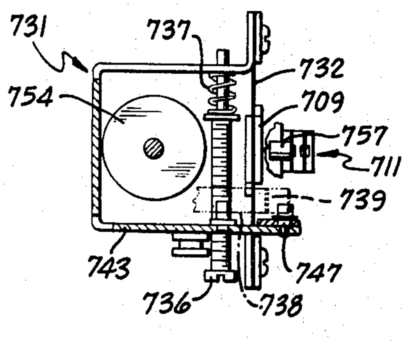

FIGURE 23*a* is a plan section, to said further enlarged scale, taken on the plane of lines **23*a*—23*a*** of FIGURE 23;

FIGURE 24 is an elevation section, to said further enlarged scale, taken on the plane of lines 24—24 of FIGURE 1;

FIGURE 25 is a plan section, to said further enlarged scale, taken on the plane of lines 25—25 of FIGURE 24;

FIGURE 26 is an elevation section, to said further enlarged scale, taken on the plane of lines 26—26 of FIGURE 2;

FIGURE 27 is a plan section, to said further enlarged scale, taken on the plane of lines 27—27 of FIGURE 26;

FIGURE 28 is an elevation section, to said further enlarged scale, taken on the plane of lines 28—28 of FIGURE 4;

FIGURE 29 is an elevation section, to said further enlarged scale, taken on the plane of lines 29—29 of FIGURE 2;

FIGURE 30 is a plan section, to said further enlarged scale, taken on the plane of lines 30—30 of FIGURE 29;

FIGURE 31 is an elevation section, to said further enlarged scale, taken on the plane of lines 31—31 of FIGURE 30;

FIGURE 32 is a schematic diagram showing the control circuits of the invention;

FIGURE 33 is an elevation section, to said further enlarged scale, taken on the plane of lines 33—33 of FIGURE 1;

FIGURE 34 is a bottom plan section, to said further enlarged scale, taken on the plane of lines 34—34 of FIGURE 33; and FIGURE 35 is an elevation section, to said further enlarged scale, taken on the plane of lines 35—35 of FIGURE 1.

Referring now to the drawings and particularly to FIGURE 1, there is shown a tape recording and reproducing machine 41 including a pair of tape storage reels 42, 43, a tape 44, a transducing head assembly 46, a transport control panel 47 and an electronics control panel 48. The transport mechanism is covered by cabinet 49, cover plates 51, 52 and 53. The cover plate 53 conceals at least three magnetic transducing heads 56, 57, and 58 past which the tape 44 is driven during play and record modes by a pair of capstans 61, 62 when a "play-record" button 63 is moved upward as shown in the figure. Under certain circumstances, a fourth head 59 may be used as shown in phantom in FIGURE 24. As shown however in FIGURE 1, the tape driving action is accomplished by engagement of a pair of pinch rollers 66 and 67 with the respective capstan 61, 62. The direction of tape motion is controlled by means of a direction button 68, which may be moved to the right to cause the tape to move from left to right as illustrated by arrow 69 and as indicated by one of a pair of appropriate indicating arrowheads 71 and 72. For example, when the button 68 is moved to the right, a brightly colored (e.g., red) portion of the button 68 extending beneath the cover plate 53 is brought into registry with a triangularly shaped window in the cover plate 53 to indicate that the tape is moving to the right, whereas at the same instant the arrowhead 71 is in a non-indicating condition represented by movement of a portion of the button 68 beneath the triangularly shaped window with this portion of the button 68 being of substantially the same color as the cover plate 53. In either direction of tape motion or setting of the button 68, the play-recording button 63 may be pushed downward as shown in the figure to cause disengagement of the pinch rollers 66, 67 and stopping of the machine. Also a fast wind button 73 may be pushed upward as shown in the figure to cause a fast winding of the tape in either direction of tape motion as controlled by the button 68. In either the play-record mode or the fast-wind mode, the takeup reel (i.e., whichever of the reels 42, 43 is the one toward which the tape is moving, as controlled by the button 68) is driven in the correct rotational direction to wind up the tape. However in the fast-wind mode, the takeup reel is driven at a much faster speed than in the play-record mode, and the pinch rollers 66, 67 are not engaged, so that the tape is free to move faster than would ordinarily be permitted by the capstans 61, 62. In addition, in the play-record mode, a selection of three tape speeds is provided as by means of a speed selection button 74, which is moveable in a vertical direction as shown in the figure between three positions giving tape speeds 1⅞ i.p.s. (inches per second), 3¾ i.p.s. and 7½ i.p.s.

The electronics shown in the figure include a stereophonic control knob 76, a play mode knob 77, a record mode button 78, a pair of record leveling lamps 79; a tone knob 81, and an "on" lamp 82; a volume knob 83; and a pair of microphone jacks 84.

Referring now to FIGURE 2 the tape transport portion of the machine 41 is shown with the cabinet 49 and cover plates 51–53 removed. It will be seen that the transport mechanism is mounted entirely on a solid mounting plate 91, which in turn is mounted in a strong box-like frame 92 as by means of a three point suspension provided by a single bolt 93 at the upper edge of the plate 91 as shown in the figure and a pair of bolts 94 and 95 at the lower edge of the plate 91. Thus, even though the entire machine may be dropped for example on a corner in such a way as to permanently spring or warp the frame 92 out of rectangular shape, nevertheless the mounting plate 91 together with the tape transport mechanism will remain undamaged.

It will be seen that the transducing heads 56–58 are mounted on and beneath a head mounting plate 96, which is in turn mounted on the mounting plate 91 by means of posts 97.

Figure 3:
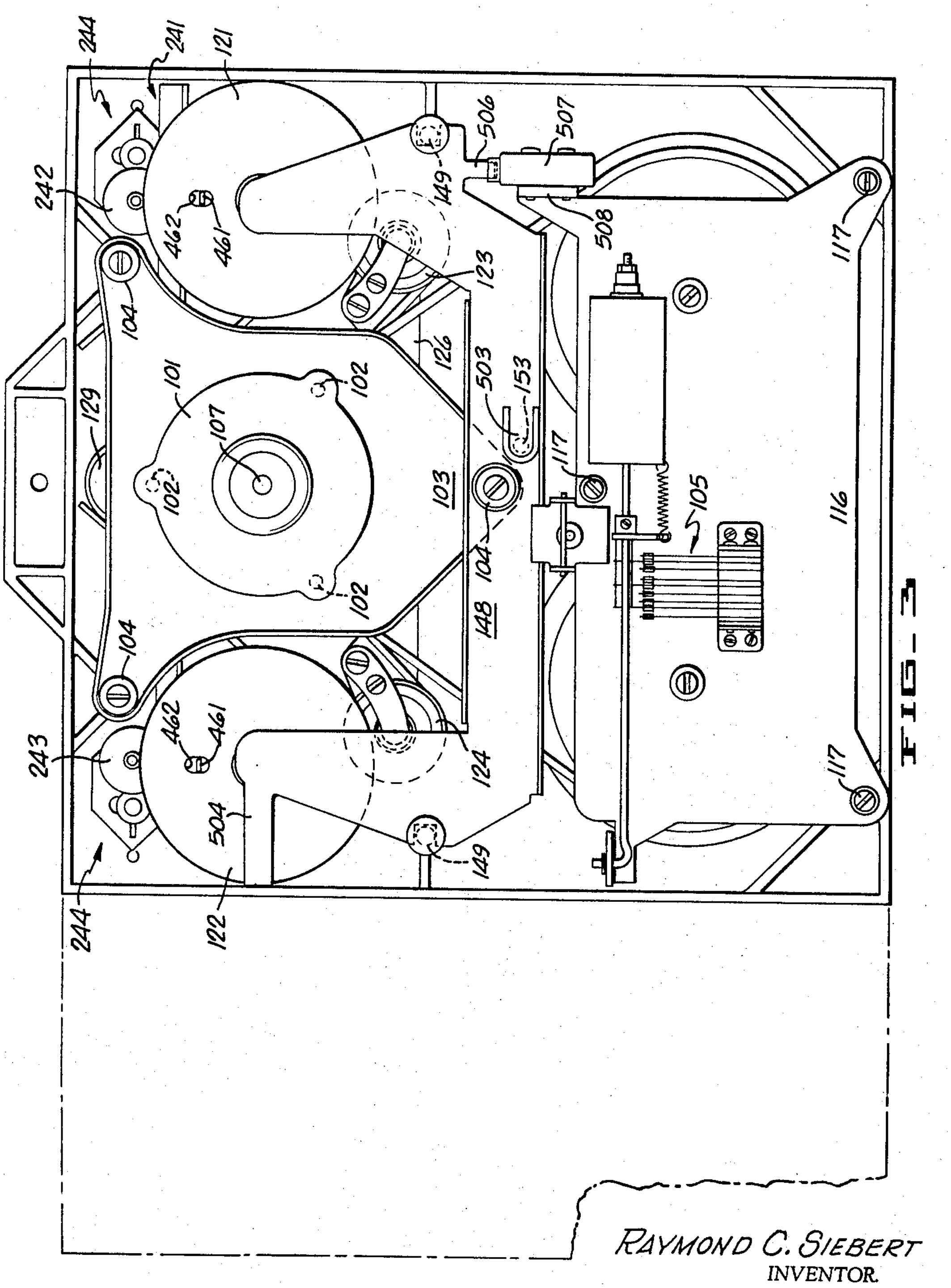
FIGURE 3 is a bottom view, to said slightly enlarged scale, of the apparatus shown in FIGURE 2.

Referring now to FIGURE 2 together with FIGURES 3 and 4, there is shown how a single main drive motor 101 is mounted as by means of bolts 102 to the bottom of a suitably apertured suspension plate 103, which in turn is mounted parallel to and beneath the mounting plate 91 as by means of three bolt and spacer sleeve suspension members 104. The motor 101 is reversible as by means of a switch 105, which in turn is controlled by the direction button 68 so as to cause the motor output shaft 107 to rotate in a counter clockwise direction as viewed in FIGURE 2 when it is desired to move the tape from left to right (forward), and to rotate in a clockwise direction when it is desired to move the tape from right to left (reverse). The motor shaft 107 not only drives the capstans 61, 62 and reel turn tables 108 and 109 in the correct direction to provide the desired movement of tape, but controls by its own direction of rotation the functioning of a number of reversible components so that the latter operate correctly according to the direction of movement of the tape. For example, the motor output shaft 107 is coupled through a stepped pulley 111 and an endless elastic belt 112 of circular cross-section, to a pair of capstan flywheels 113 and 114, which in turn are mounted for rotation with the capstans in bearings associated with the mounting plate 91 and a second suspension plate 116 also suspended parallel and beneath the mounting plate 91 as by means of a three point suspension including three bolt and spacer sleeve suspension members 117. Thus when the motor drive shaft 107 is rotating in a counter clockwise direction as viewed in FIGURE 2, the elastic belt 112 drives the two capstans 61 and 62 both in a counter clockwise direction, and if the tape is engaged with the capstans as by means of the pinch rollers 66, 67 the tape is driven from left to right as shown by the arrow 69; and when the drive output shaft 107 is rotating in a clockwise direction, the capstans are also driven clockwise and the tape is driven from right to left in the reverse direction. An important feature of the arrangement described and shown is that whichever capstan is downstream (with relation to the direction of tape motion) is driven by the elastic belt 112 in such a way that it tends to rotate faster than the upstream capstan with the consequence that the tape is tensioned between the capstans and across the tranducing heads 56–58 in either direction of tape motion. It is important for the correct production of this operating feature that the triangular arrangement of the capstans and motor drive shafts be such that the belt goes from the shaft to the upstream capstan thence to the downstream capstan and thence returns to the drive shaft. With such an arrangement, the belt between the downstream capstan and the drive shaft tends to be tensioned and stretched elastically more than the segment of belt between the two capstans, and the latter segment tends to be tensioned and stretched more than the segment of belt between the upstream capstan and drive shaft. It will be seen that the cross-sectional areas of the stretched portions of the belt are reduced and the more stretched portions of the belt move faster than the less stretched portions. The result is that the downstream capstan tends to rotate faster than the upstream capstan, and the tape between the capstans is held under constant tension. With the arrangement as described, this tensioning effect takes place in either direction of tape motion. It will be understood that this effect is provided with capstans 61, 62 of equal diameter and flywheel pulleys 113 and 114 of equal diameter, as herein shown; or more broadly, whenever the diameter ratio of capstan 61 and its associated flywheel pulley 113 is equal to the diameter ratio of capstan 62 and its associated flywheel pulley 114. It will also be understood that to produce this effect, a holdback or dragging force must be provided, either on the tape itself, or on the upstream flywheel and capstan, or on the belt upstream (with respect to belt motion) from the downstream capstan. In the illustrated arrangement, the cumulative frictional drag seen by the belt in the capstan bearings tends to stretch the belt between the capstans less than the belt between the downstream capstan and motor; and a holdback braking force is also supplied to the tape on the supply reel as further explained below.

The motor output shaft is also used to drive the takeup reel in both directions of tape motion, with automatic selection, governed by the direction of rotation of shaft 107, of the driven reel, as the reel toward which the tape is being driven by the capstans. The arrangement includes a drum means 121 and 122 coupled to each of the reel turntables 108 and 109 for rotation therewith, and a pair of driving pulleys 123 and 124 mounted at the two ends of a rocking arm 126, with the arm being centrally pivoted by means of a pin 127 at the center line of mounting plate 91. The pulleys 123 and 124 are driven by means of an endless elastic belt 128 of circular cross-section, which is coupled to the motor output shaft 107 and runs also over an idler 129 mounted on the mounting plate 91. The tensioning and driving forces of the elastic belt 128 are such that the arm 126 is caused to tilt in the direction necessary to bring the pulley (123 or 124) that is associated with the takeup reel into driving engagement with the drum means (121 or 122) that is coupled to the takeup reel, while the other pulley is retracted from the associated drum means. For example, as previously explained when the motor shaft 107 is rotating in a counter clockwise direction, then the capstans are also driven to rotate in a counter clockwise direction and the tape is driven by the capstans from left to right or in a forward direction so that the reel toward which the tape is moving, in this case, reel 43 mounted on turntable 109 is defined as a takeup reel and must be driven in a clockwise direction in order to operate to take up the tape. As will be seen from the figure, the belt 128 passes in a counter clockwise direction over the counter clockwise rotating shaft 107 beneath and around the pulley 123 in a clockwise direction so as to drive the pulley 123 in a clockwise direction, thence clockwise over the idler 129 and around the pulley 124, driving the latter also in a clockwise direction and thence back to the drive shaft 107. There exists in this case a stronger tensioning and stretching tendency in the belt segment between the pulley 124 and the drive shaft 107 than in the segment between the drive shaft and pulley 123, and the arm 126 is consequently caused to pivot in a counter clockwise direction so as to bring the pulley 124 into engagement with the drum means 122. Since as above explained the pulley 124 is pulling in a clockwise direction, it follows that the drum means 122 is caused to rotate in a counter clockwise direction, which is the correct direction for taking up the tape. When the direction of rotation of motor drive shaft 107 is reversed to drive the tape in a reverse direction, i.e., from right to left as shown in the figure, then the driving effect of the belt 128 causes the arm 126 to pivot in a clockwise direction so as to retract the pulley 124 away from the drum means 122 and to engage the pulley 123 with the drum means 121, so that the reel 42 becomes the takeup reel and is driven accordingly. In order to make sure that the pulleys successfully frictionally engage the respective drum means, the angle between the length of the arm 126 and a line joining the axes of the respective pulley and drum means is arranged to be substantially 105°. It has been found that with such an angle, the driving pulley is caused to jam or wedge into pressurized frictional driving engagement with the respective drum means.

In order to cause the takeup reel to be driven at a faster speed during fast wind than during play-record motion, each drum means is divided into a pair of drums, comprising a wind and brake drum 141 spring coupled to the associated turntable to take up slack in stop mode, as later explained, and a play drum 142 that is mounted to be axially slidable with respect to wind and brake drum 141, but is keyed for conjoint rotation therewith and is urged as by means of a spring 143 away from the wind drum 141. The play drum has a greater diameter than the wind drum, and each pulley 123, 124 is formed with a large driving diameter "wind portion" 146 and a smaller diameter "play portion" 147. The play drum 142 is also engaged by a tilting plate 148 pivoting at the ends of a pair of suspension posts 149 that extend downwardly from beneath the mounting plate 91. When the plate 148 is not tilted to move the play drums 142 toward the wind drums 141, then the takeup reel wind drum 141 is engaged by the wind portion 146 of the associated pulley and is driven at a comparatively fast wind speed which is a function of the respective diameters of the wind drum 141 and pulley wind portion 146. During such operating modes, the respective play drums 142 are axially too far removed from the pulleys to be engaged thereby. However when the tilting plate 148 is tilted so as to move the play drums towards the respective wind drum 141, then the play drums 142 are moved into the same plane as the play portions 147 of the pulleys. In this instance, the takeup reel play drum 142 is engaged by the play portion 147 of the associated pulley and is driven at a different and much slower speed. During this play mode of operation, the wind drum 141 is out of engagement with the pulley wind portion 146 because the sum of the diameters of the wind drum and associated pulley wind portion is less than the sum of the diameters of the play drum and its associated pulley play portion. Thus with the play drum engaged with the play portion, a space is left between the respective wind drum and wind portion.

The tilting of the plate 148 to bring this arrangement of the parts about during the play mode of the machine is effected by means of a "play slide" 151 that is mounted for sliding motion on the upper surface of the mounting plate 91 and has a cam 152 operating a cam follower pin 153 extending in a sliding journal through the plate 91 and engaging the tilting plate 148. As will be seen from the figure, when the play slide 151 is in a lowermost or stop position, the tilting plate 148 maintains the play drum out of engagement with the respective pulleys; but when the play slide is moved upward to a play-record position, the cam 152 moves the pin 153 and tilts the plate 148 to cause engagement of the takeup reel play drum and play portion.

The play-record control button is mounted on a control button mounting plate 161 and is coupled, as shown schematically in FIGURE 4, to an ear 162 for movement strictly with the play slide 151. The play slide has a pair of slots 163 and 164 by which the slide is guided for sliding movement on a pair of posts 166 and 167 that are affixed to the mounting plate 91. In the stop position of the slide 151, the end of the slot 164 bottoms against the post 167; and in the play position of the slide, a spring loaded latch pin 171 that projects upward from the mounting plate 91 engages a recess here shown as a hole 172 in the play slide 151. To give an idea of the range of movement of the slide 151, the slide has been marked in FIGURE 5 with index marks S and P to indicate the stop and play positions of the slide with respect to the fixed position of the latch pin 171. With the slide in the stop position as shown in the figure, the index mark S is aligned with the latch pin 171; and when the slide is moved to the play position, the index mark P on the slide is aligned with the latch pin. As shown in FIGURE 4, the latch pin 171 has a pointed cam tip engaging the recess 172 in such a way that the slide 151 can be moved into or out of the play position by hand movement of the play-record button. In moving the slide out of the play position to the stop position, the resistance of the spring loading of the latch pin 171 must be overcome.

The manner in which the play slide 151 is coupled to the pinch rollers 66, 67 is shown in FIGURE 4. Each roller is mounted at the end of an arm 181, which is pivoted near the middle of its length as by a pin 182 affixed to the mounting plate 91. The other end of each arm has a projection 183 that is engaged by an angled slot 184, the sides of which act as a cam to cause pivoting motion of the arms 181 when the play slide 151 is moved. The slot 184 may be formed directly in the play slide 151, but as shown in the figure is in actuality formed in a pivoting plate 186 secured to the play slide by a pivot pin 187. The plate 186 provides adjustment of the pressure of the pinch roller against the corresponding capstan, as follows. From an ear 188 of each plate 186, extends a leaf spring 189, the end of which is engaged by an adjusting screw 191 that is threaded through another ear 192 formed on the play slide. An extension 193 of the plate 186 also engages the ear 192 to provide an absolute limit of pivoting motion of the plate 186 in the direction opposite to that in which the plate is urged by the spring 189 and adjusting screw 191. The adjusting screws 191 are so positioned that when the play slide 151 is moved to the play position, the pinch rollers are brought into engagement with the capstans against the resistance of the springs 189, the extensions 193 and ears 192 being slightly separated so that the spring force of the springs 189 provides the entire pinch roller engagement force.

A further feature of the play slide 151 is shown as a pair of posts 196 and 197, jacketed with a low-friction material, which are used to withdraw the tape from the transducing heads during the fast wind mode of operation of the machine, so as to avoid excessive wear of the heads and tape. In the play position of the play slide, the posts 196, 197 are positioned to project between the transducing heads and on the same side of the tape as the heads and spaced from the tape. However when the play slide is moved from play to stop position, the posts 196, 197 are caused to emerge from between the transducing heads and to push the tape away from the heads. As will be seen below, this is the position that is occupied by the play slide and posts 196, 197 in the fast wind mode of operation of the machine.

As explained above, the play slide 151 controls the engagement and disengagement of the tape and capstans for direct, metered driving of the tape in the play and record modes of the machine. In a similar manner, the driving of the reels for supplying and taking up the tape to and from the capstan assembly in the play-record mode, and the driving of the reels for transferring the tape in the fast wind mode is controlled by a wind slide 201, mounted for sliding movement in the same direction as the play slide 151 and as by means of a pair of slots 202 and 203 engaging a pair of posts 206, 207 extending from the mounting plate 91. In the stop position of the wind slide 201 as shown in FIGURE 4, the end of slot 203 is bottomed against post 207, and the slide is urged to this position by means of a tension spring 211 coupled between an ear 212 on the wind slide and an anchor plate 213 which is secured at the top of the post 166 and has an extension abutting the post 207 to hold the anchor plate firm against the pull of the spring 211. The play slide 151 is formed to engage the wind slide 201 from stop to play position and to carry the wind slide over substantially the same range of movement to a similar play position, and the spring 211 attached to the wind slide in the play position also operates to urge the play slide 151 toward stop position, although the urging of the spring alone is not sufficient to overcome resistance of the latch pin 171 which holds both slides in the play position until some extra force is applied as by hand movement of the play-record button 63.

One of the objects of the wind slide 201 is to hold the rocking arm 126 and the reel drive pulleys 123 and 124 disengaged from the turntable drum means 121, 122 when the apparatus is in the stop mode, and to release the arm 126 for rocking motion as previously described when the apparatus is in play or wind modes. To this end a pin 216, here shown as having a rotatable bearing sleeve 217 mounted thereon is affixed at the midpoint of the length of the arm 126 and spaced from the pivot pin 127. In the stop position of the wind slide 201, the pin 216 and sleeve 217 are engaged by a generally V-shaped surface 218 formed in the slide 201 so as to centralize the arm 126 in an intermediate position in which the pulleys 123, 124 are both spaced equidistant from the drum means 121, 122. However, when the wind slide 201 is moved away from the stop position, i.e., either to the play position previously described or a wind position later to be described, the pin 216 and sleeve 217 are freed from intimate engagement with the surface 218, and the arm 126 is free to pivot in response to the driving direction of the belt 128 and motor shaft 107 as previously described. To facilitate adjustment and positioning of the surface 218 during the manufacture and assembly of the machine, the surface is actually formed at the end of a peninsular portion 219 in a slide 201, the peninsular portion 219 being joined to the body portion of the slide by means of a narrow neck portion 221, which may be readily bent to position the surface 218.

The wind slide 201 has a third or wind position in which it is moved substantially farther from the stop position than it is moved when it is in the play position previously described, in order to permit and control special braking effects later to be described, that are needed in the fast wind mode of operation. Movement of the wind slide to the wind position is controlled only by the fast wind button 73. As shown schematically in FIGURE 5, the fast wind button has a spring loaded pivoting latching arm 226 that engages a pair of stop S and wind W notches 227 and 228 formed in a side surface of the fast wind button. The button itself has a lost motion connection with the ear 212 of the wind slide so that when the button is moved from stop to wind position as by movement to bring the W notch 228 into engagement with latch arm 226, the button engages the ear 212 and moves the wind slide against the resistance of spring 211 to the wind position. The spring 211 is not strong enough to move the slide back to slide position until extra force is applied to the button as by hand to move it back to the position shown in which the S notch 227 is engaged by the latching arm 226. The connection between the fast wind button 73 and the wind slide 201 is a lost motion connection in that the button when moved to wind position moves the wind slide, but the wind slide when moved to play position as previously described by engagement of the play slide therewith does not carry the fast wind button 73 away from the stop position thereof. Likewise the connection between the wind and play slides is a lost motion connection in that movement of the play slide to play position moves the wind slide to play position, but movement of the wind slide to wind position does not move the play slide at all.

The primary purpose of having a third position for the wind slide in the fast wind mode of operation is to control the braking force that must be applied to at least the supply reel in either direction of tape motion with great flexibility and with braking forces of particularly suitable strength for each of the operating modes. For example, in the fast wind mode of operation, it is desired to have a relatively light braking force on the supply reel only, while the takeup reel is driven at the desired fast winding speed; and in the play-record mode to have a somewhat greater braking force on the supply reel, while the takeup reel is driven with sufficient speed to take up tape coming from the capstans. Furthermore it is desirable when attempting to stop the apparatus from either wind or play modes to have a comparatively great braking force on the supply reel and a slight braking force on the takeup reel, so as to stop the reels without throwing tape loops and so as to hold both the reels in stop position thereafter so that slack will not develop in the tape. Also the braking apparatus should be reversible to supply the major braking forces only to the supply reel in either direction of tape motion.

Figures 5, 6:
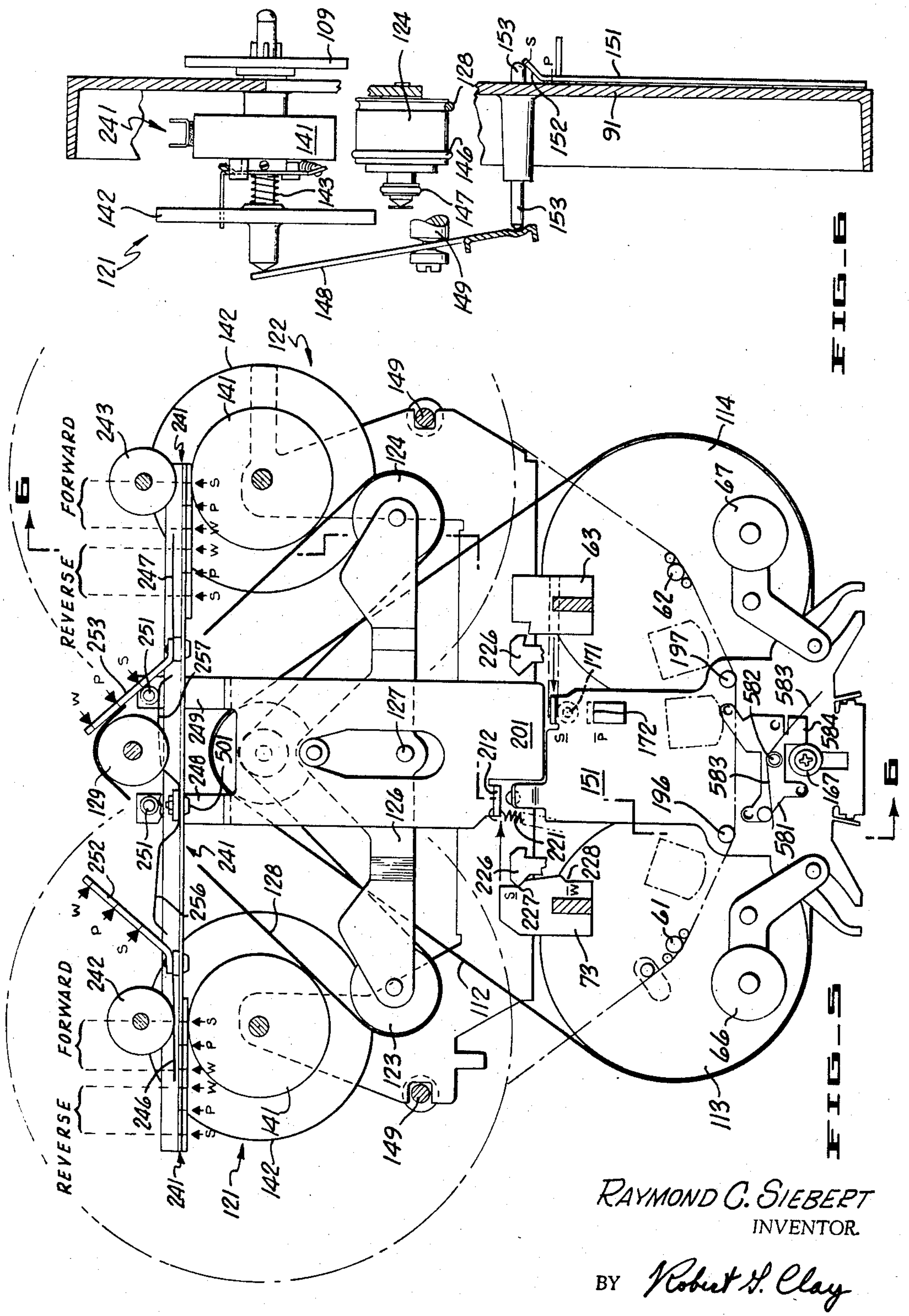
FIGURE 5 is a schematic layout, to said slightly enlarged scale, of certain operating elements of the apparatus shown in FIGURES 1–4 and illustrating an operating mode of the machine.
FIGURE 6 is a sectional elevation, to said slightly enlarged scale, taken along the plane of lines 6—6 of FIGURE 5.

Accordingly as shown in FIGURES 4 and 5, the brake for the apparatus of the invention is formed primarily as an elongated bar member 241 scanning the distance between reels and engaging the wind and brake drums 141 of both reel turntables. The braking pressures are supplied by a pair of rollers 242 and 243 mounted on the mounting plate 91 by means of adjustable mounting assembly 244; and the rollers are arranged to engage a pair of leaf springs 246, 247 mounted on the body of the bar 241 and projecting from the middle of the bar towards the ends in a plane parallel to and spaced from the braking portions of the bar. Each of the rollers 242, 243 is positioned to engage the corresponding spring 246, 247 at a point of tangency directly above the point of tangency of the bar 241 with the respective wind and brake drum 141. Thus, frictional engagement of the rotating brake drum 141 with the bar 241 causes the bar to move in a direction such that the bar and spring 246, 247 corresponding to the supply reel is pinched between the corresponding roller 242, 243 and drum 141. The farther the bar 241 moves away from a centralized position, the shorter is the length of spring 246, 247 that is distorted by the corresponding roller, and the greater is the braking force applied to the supply reel. The rollers 242, 243 are positioned sufficiently far apart with relation to the springs 246, 247 that not more than one of the springs can be engaged at any one time by its corresponding roller. Thus only the supply reel is braked; and if the direction of tape motion is changed, the resulting driving force of the brake drums 141 on the bar moves the bar in the opposite direction to bring the other spring and roller into engagement and to brake the other reel only, which at this time has become the new supply reel.

To control the distance that is moved by the bar 241 under the initial driving action of the brake drums 141, a coupling is made between the wind slide 201 and the bar 241. A pair of arms 248 and 249 project from the end of the wind slide 201 and have pins 251 mounted at the ends to overhang the bar 241 and to engage at least one of a pair of angled bracket members 252 and 253 that extend from the opposite side of the bar 241. The bracket members extend away from the bar and are angled toward one another so as to stop the bar in different positions according to the vertical position of the wind slide. For example, when the apparatus is adjusted to move the tape in a forward direction, but is stopped, then the right-hand bracket member 253 is engaged by the right-hand pin 251 of the arm 249 at a position close to the base of the bracket member and marked S in FIGURE 5. With the apparatus adjusting the tape motion still in the forward direction and for the play mode of operation, the wind slide having been moved up to play position engages the right-hand bracket member 253 at a middle point marked P; and in the wind position, the wind slide having been moved further to wind position, the right-hand pin 251 engages the bracket member 253 at a point removed from the bar marked W. Each of these positions of the bracket 253 and bar 241 entails a different position of engagement between the roller 242, spring 246, bar 241 and left-hand brake drum 141. These positions are marked S, P, and W along the length of the bar.

In the stop position, it is additionally desired to put some braking force load upon the takeup reel. For this purpose a pair of stop leaf springs 256, 257 are mounted on the bar with their bases substantially at the midpoint thereof and extending parallel to the bar and towards the ends thereof. The positioning of these springs is such that the pin 251 corresponding to the takeup reel engages the spring corresponding to the takeup reel in the stop position of the wind slide 201.

The positions and functioning of the apparatus in the various operating modes of the machine are illustrated in simplified form in FIGURES 5–10.

The machine in stop mode as it would appear after forward play (i.e., tape moving from left to right) is illustrated in FIGURES 5 and 6. It is understood that in the stop mode the motor 101 is running and is warmed up in preparation for immediate driving of the tape, the belts 112 and 128 are running, and the associated capstans 61, 62 and pulleys 123, 124 are turning, although the capstans are not driving the tape because the pinch rollers 66, 67 are retracted by the action of the play slide 151, and the pulleys 123, 124 are not engaged with or driving the drum means 121, 122 because the rocking arm 126 is centralized by the wind slide 201 in its stop position. The brake bar 241 is in its extreme position to the left as it would be after the machine has come to a stop following forward play, with the leaf spring 246 applying the maximum braking force to the left-hand drum 121 and the wind slide 201 applying a slight braking force to the right-hand drum 122 through the right-hand stop leaf spring 257. In this and following FIGURES 7–10, some of the detailed structure of the components has been omitted for the sake of simplicity and in some places has been re-arranged or replaced by schematic equivalents for the sake of clarity.

FIGURE 6 shows in elevation the corresponding arrangement of the play and wind drums 142 and 141 tilting plate 148, and cam 152 of the play slide 151.

Figures 7, 8:
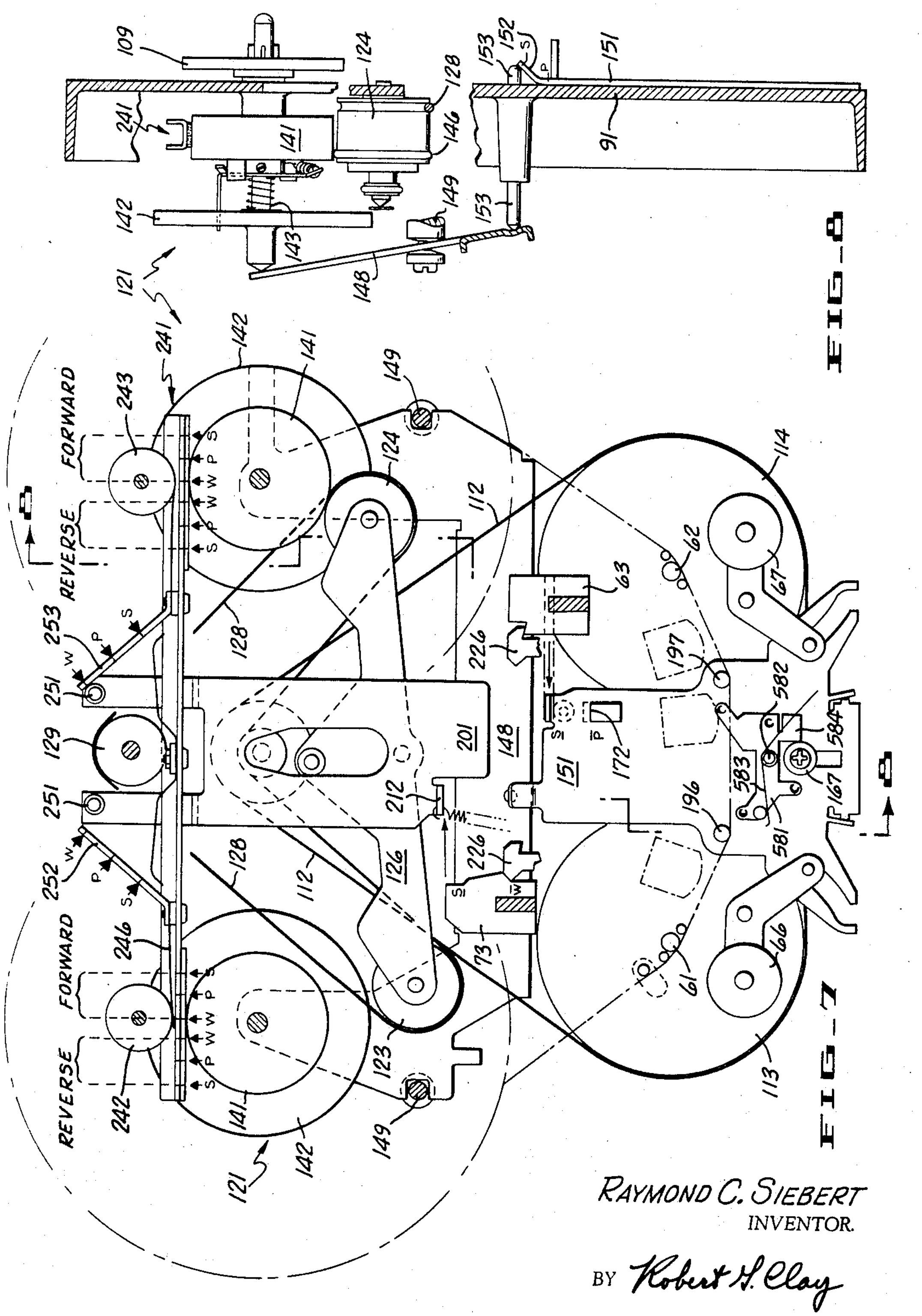
FIGURE 7 is a schematic layout, to said slightly enlarged scale, similar to that of FIGURE 5 and illustrating another operating mode of the machine.
FIGURE 8 is a sectional elevation, to said slightly enlarged scale, taken along the plane of lines 8—8 of FIGURE 7.

FIGURE 7 illustrates the arrangement of the components during forward movement of the tape in a fast wind mode. The play slide 151 has not moved, nor have the pinch rollers 66, 67 been engaged; and the posts 196, 197 are still holding the tape out of engagement with the transducing heads. However the fast wind button 73 has been moved to the wind position, together with the wind slide 201. As a result, the rocking arm 126 has been freed to pivot in a counterclockwise direction as urged by the belt 128 to bring the pulley 124 into engagement with the drum means 122. Because both drum means are rotating in a counterclockwise direction, the brake bar 241 is urged toward the left, but is stopped by the right-hand pin 251 engaging the bracket 253 at the uppermost wind position so that the spring leaf 246 is caused to apply its least braking force to the supply reel brake drum 141. As shown in FIGURE 8, the relative positions of the cam 152, tilting plate 148, play drums 142 and wind drums 141 have not changed; but the wind portion 146 of the pulley 124 is engaged with the takeup reel wind drum 141. There is negligible braking force on the takeup reel in this position.

Figures 9, 10:
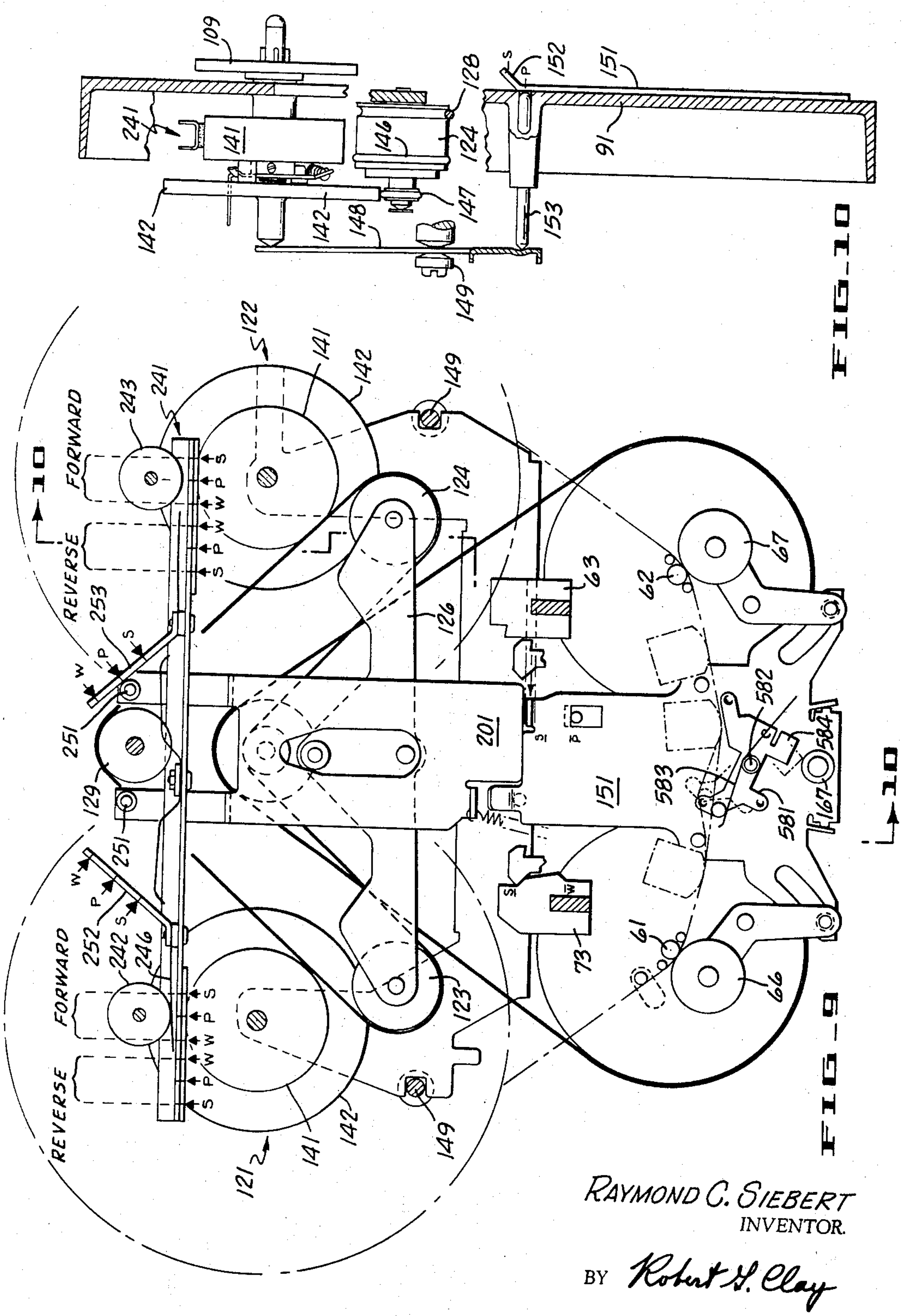
FIGURE 9 is a schematic layout, to said slightly enlarged scale, similar to that of FIGURES 5 and 7 and illustrating another operating mode of the machine.
FIGURE 10 is a sectional elevation, to said slightly enlarged scale, taken on the plane of line 10—10 of FIGURE 9.
Figure 11:
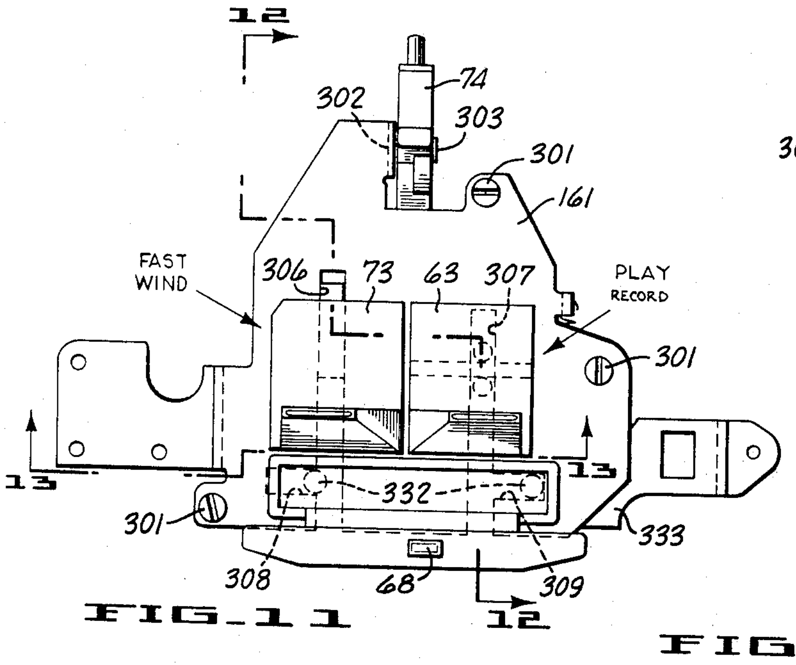
FIGURE 11 is a plan, to a further enlarged scale, of a portion of the apparatus shown in FIGURE 2.
Figure 12:
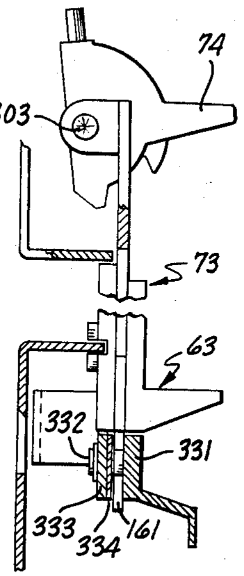
FIGURE 12 is an elevation section, to said further enlarged scale, taken on the plane of lines 12—12 of FIGURE 11.

FIGURE 9 illustrates the positions of the components in the forward direction of motion of the tape and in the play-record mode of operation. In this example, the play slide 151 has been moved to the intermediate or play position, carrying with it the wind slide 201, but not the fast wind button 73. Consequently the pinch rollers 66, 67 are both engaged with the capstans 61, 62 for driving the tape from left to right, the rocking arm 126 is freed for pivoting motion in a counterclockwise direction to bring the pulley 124 into engagement with the right-hand of takeup reel drum means 122. Furthermore the brake bar 241 still urged toward the left by rotation of the brake drums is stopped in the intermediate or play position by the right-hand pin 251 engaging the intermediate portion of the bracket 253, and the spring leaf 246 is caused to apply an intermediate braking force to the left-hand of supply reel drum means 121.

FIGURE 10 shows the relative position of the cam 152 in play position, depressing the pin 153, tilting the plate 148, and moving the play drum 142 into the plane of the play portion 147 of the pulley 124 for driving the reels at a slower speed than is used in the fast wind mode. If the direction of tape movement is changed while the apparatus is in play mode, as by operating the switch 105 to reverse the direction of rotation of the motor 101, then the capstans 61, 62 are reversed in their direction of rotation, while simultaneously the post 196 is caused to pivot in a clockwise direction to place the pulley 123 into engagement with the drum means 121 and to rotate that drum means in a clockwise direction to wind up the tape as it moves from right to left or in a reverse direction. Concurrently with these changes, as the drum means 121 and 122 reverse their direction of rotation, the brake bar 241 is urged to the right until stopped in a mirror image position by the left-hand pin 251 with the left-hand bracket 252 of the brake.

Further structural details of the components and assemblies described above are further described in the following paragraphs.

Referring now to FIGURES 11–17 the control system including the fast wind and play-record button and direction control button are shown. The control button mounting plate 161 is mounted parallel to and above the mounting plate 91 as by means of the pedestals 301 extending from the plate 91. The plate 161 has an ear 302 from which extends a pin 303 for pivotal mounting of the speed change control button 74 later to be described in detail. In addition, the plate 161 has a pair of parallel guide slots 306 and 307 extending from the lower edge of the plate and defining tracks for the sliding movement of the fast wind button 73 and play-record button 63 respectively. Near the lower edge of the plate 161, each of the slots 306, 307 has a tributary slot 308 and 309 respectively extending perpendicular to the lengths of slots 306, 307 and away from one another, the slots 308 and 309 being aligned to define a guiding track for the left-right movement of the direction control button 68. The fast wind and play-record buttons are each formed with a substantially H-shaped cross section, including a pair of panel portions 310 and 311 respectively, lower panel portions 312 and 313 respectively and narrow connecting portions 316 and 317 respectively. As will be seen from the figures, the connecting portions 316, 317 slide in the slots 306, 307 respectively, while the upper and lower panels 310, 312 and 311, 313 respectively of each button engage the upper and lower faces of the button mounting plate 161 and retain the buttons thereon. The latch arm 226 is shown as pivoted by means of a pivot pin 318 extending from and beneath the plate 161, and the arm has an extension 319 extending beneath the panel 313 of the button 63 and coupled to a tension spring 321 that is anchored to an ear 322 extending downward from the plate 161, and the spring 321 urges the arm 226 to rotate in a counterclockwise direction as seen in the figure. The operative end of the arm 226 has an offset portion 323 extending into the plane of the lower panels 312, 313 of the respective control buttons. The offset portion 323 has a pointed sear portion 324 for engaging the notches 227 and 228 previously described for the button 73, these notches being formed in the lower panel 312 of the button.

Figure 15:
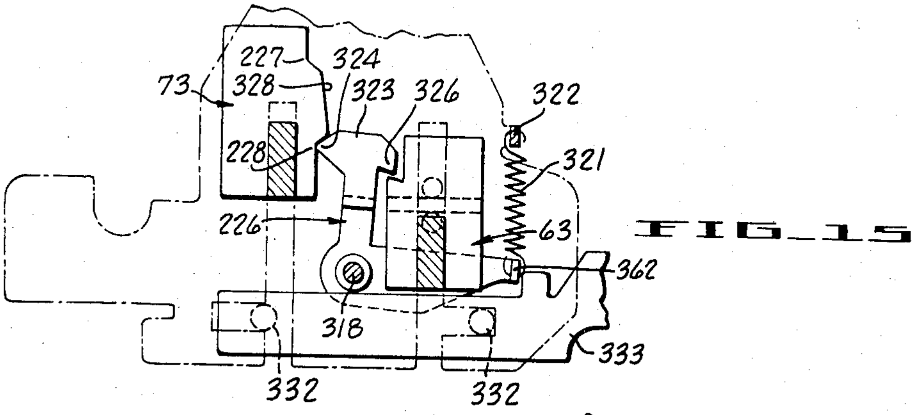
FIGURE 15 is a plan section, to said further enlarged scale, similar to that of FIGURE 14 and showing the apparatus in a different position.
Figure 16:
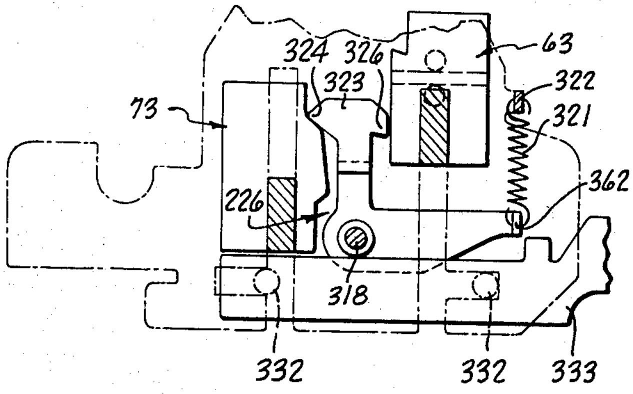
FIGURE 16 is a plan section, to said further enlarged scale, similar to that of FIGURES 14 and 15 and showing the apparatus in another position.

The arm 226 provides a mechanical interlock system to prevent movement of either of the buttons 73, 63 to an operative position when the other button is in an operative position. The offset portion 323 of the arm has a somewhat hook-shaped sear portion 326 extending towards the lower panel 313 of the play record button 63 and a mating notch 327 is formed in the panel 313. Also the confronting side of the panel 312 is formed by a sloping face 328 between the notches 227 and 228, and the notch 228 is offset toward the arm 226. Consequently when the fast wind button 73 is moved to wind position as shown in FIGURE 15, the sear portion 326 is caused to engage the notch 327 and prevents movement of the play-record button 63 away from its stop position. Likewise as shown in FIGURE 16, when the play-record button 63 is moved to its play-record position, the confronting side 329 of the panel 313 is aligned with the sear portion 326 of the arm so as to maintain the sear portion 324 engaging the notch 227 of the fast wind button 73; and the fast wind button is prevented from moving away from its stop position.

The direction control button 68 has an upper panel portion 331 (FIGURES 11, 14 and 17) from which extend a pair of studs 332 downwardly through the notches 308, 309; and the button is secured by means of a lower panel 333 secured to the studs 332. A spacer plate 334 is also mounted between the lower panel 333 and the button mounting plate 161.

Figure 17:
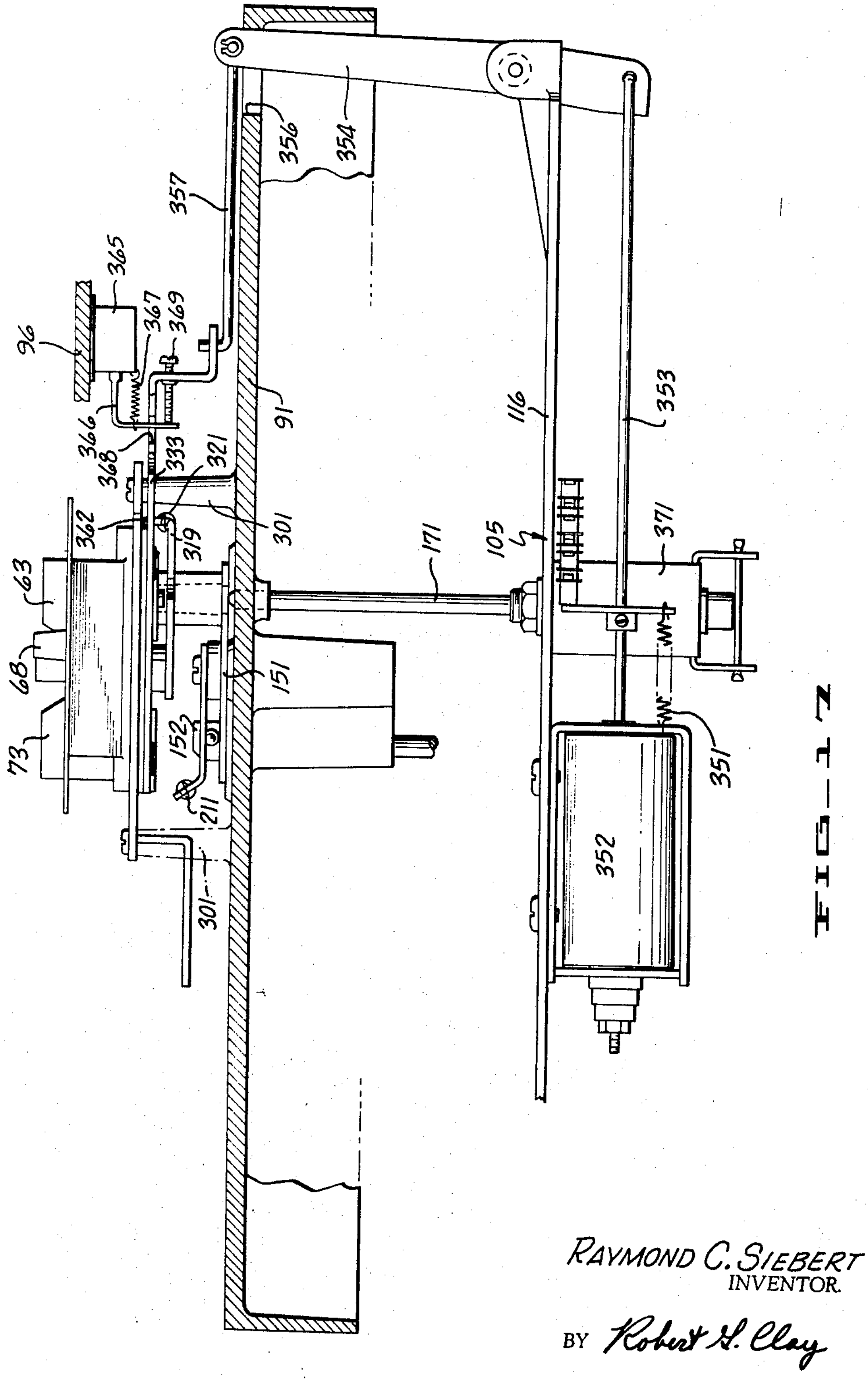
FIGURE 17 is an elevation section, to said further enlarged scale, taken on the plane of lines 17—17 of FIGURE 4.

Since the immediate purpose of the direction control button 68 is to control the direction of rotation of the motor 101, the lower panel 333 of the button is coupled to the motor reversing switch 105, through a link rod 357, a pivoting arm 354 and a member 353, 358. The limits of left-right motion of the direction control button 68 and the structure for maintaining the button in its forward and reverse positions are described as follows. A spring 351 is coupled to the member 353, 358 and urges the button 68 toward its right-hand or forward position as seen in FIGURE 17; and a reverse solenoid 352 is coupled to the member 353 to lock the button 68 in its left-hand or reverse position whenever it is moved thereto. As will be seen, the spring 351 performs several functions, one of them being to ensure that the apparatus returns to its forward tape moving dispositions whenever the machine is shut off, whenever the power fails, and under certain other conditions later to be described. The solenoid 352 is mounted on the bottom of the front suspension plate 116 and the armature or plunger of the solenoid is coupled to member 353, which in turn is coupled to the lower end of the pivoting arm 354. The arm 354 is mounted for pivoting motion on the suspension plate 116, and the upper end of the arm 354 extends through an opening 356 in the main mounting plate 91 and is coupled above the plate to the link rod 357. The spring 351 is coupled between the frame of the solenoid 352 and the ear member 358 secured to the member 353. The ear member 358 also extends to operate a series of ganged switch leaves, constituting the switch 105, mounted beneath the suspension plate 116. When the direction control button 68 is in its forward position, the armature of the solenoid 352 is out of its centralized position with relation to the coil of the solenoid; and the coil is continuously energized with a current that is of insufficient strength to move the armature with its load to a centralized position. However when the button 68 is moved to its reverse position by hand, the armature of the solenoid 352 is forced to a centralized position with respect to the coil, and the current with which the coil is energized is sufficient to maintain the armature in this position against the urging of spring 351. The entire linkage may be returned to forward position by manual movement of the button 68, or will be so moved by the spring 351 upon failure of the current to solenoid 352.

It will be noted that the panel 333 is also arranged to provide a mechanical interlock to prevent change of direction of tape motion during the fast wind mode, so as to prevent too great a strain on the tape and damage thereto such as might result if the apparatus were reversed while the tape is moving at fast speed. As shown in FIGURES 11 and 13–16, the panel 333 has an ear 361 formed thereon and projecting near the end of the extension 319 of the pivoting arm 226. This end 319 has an ear 362 formed thereon and extending into the path of movement of the ear 361 when the arm 226 is pivoted in a clockwise direction. Thus if the direction control panel 333 is in a forward position as shown in FIGURE 15 and the fast wind button is in the wind position, then the ear 362 prevents movement of the panel 333 and ear 361 to the left or reverse position. If the direction control button were in a reverse position, the ear 361 would be to the left of the ear 362, as shown in the figure, and movement of the button toward a forward position would also be prevented. As shown in FIGURE 16, the direction control button panel 333 is free to move in either direction whenever the fast wind button 73 is in its stop position, even when the record-play button 63 is in its play-record position. There is no objection to having a reversal of tape motion when the tape is moving at any of its play-record speeds.

Also shown in FIGURE 17 is a head-switching switch 365 mounted on the underside of head mounting plate 96. The switch 365 has an operating arm 366 that is urged to the right, as shown in the figure, by a tension spring 367; and the arm 366 has a downward extension passing through an opening 368 in the plate 33 and adjustably positioned with respect to the plate by means of a bolt 369 threaded through the plate.

Also shown in FIGURE 17 is the structure of the play slide latch pin 171, which is a long pin extending from the armature of a play slide latching solenoid 371 that is mounted on the bottom side of the front suspension plate 116. The solenoid 371 is continuously energized during operation of the machine in such a way as to urge the armature and pin 171 upward and into latching engagement with the opening 172 in the play slide 151. Thus when the play slide 151 is moved to play position, it is latched in that position by engagement of pin 171. Pin 171 has a pointed tip of such an angle that the play slide is held in play position against the pull of the spring 211, and upon hand movement of the play record button 63 and play slide back to stop position, the pointed tip of the pin 171 is forced downward and the slide is released. The use of the solenoid 371 is to ensure that the machine returns to stop position whenever it is shut off or when power fails so that upon undertaking a new operation of the machine, accidental erasures of previously recorded material on the tape can be avoided. For example if the power had failed during a playing operation of the machine and the machine were turned back on with the record button 78 depressed, accidental erasure of the recorded program would take place, which erasure is part of the process of making a new recording.

Figures 13, 14, 18:
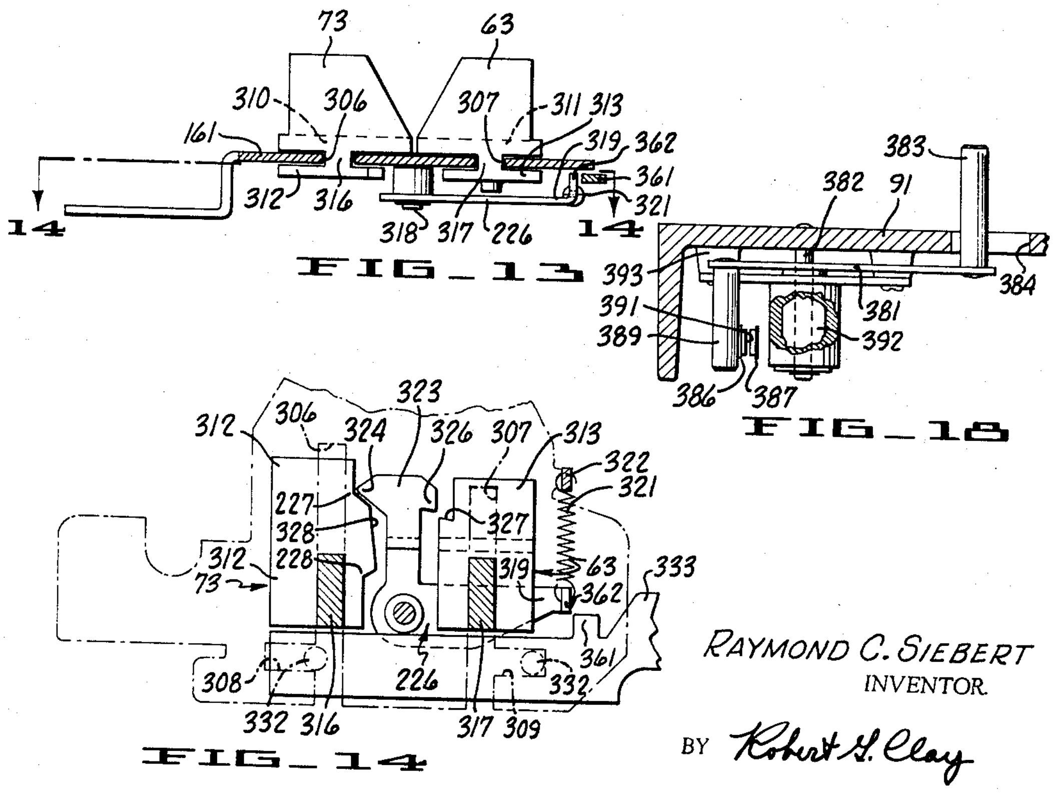
FIGURE 13 is an elevation section, to said further enlarged scale, taken on the plane of lines 13—13 of FIGURES 11 and 14.
FIGURE 14 is a plan section, to said further enlarged scale, taken on the plane of lines 14—14 of FIGURE 13.
FIGURE 18 is an elevation section, to said further enlarged scale, taken on the plane of lines 18—18 of FIGURE 2.

In connection with the use of the reverse solenoid above described, there is also provided a tape sensing mechanism illustrated in FIGURES 2 and 18. The purpose of this mechanism is twofold: first, to ensure that the machine is stopped whenever an "end of tape" is reached during reverse (or forward) motion; and, second, to ensure that the shutting off of the machine to stop the takeup reel follows the arrival of the end of tape by a certain small time delay to make sure that the loose end of the tape is properly wound up on the takeup reel. For these purposes there is provided a tape tension sensing arm 381 pivoted as by pin 382 from the underneath side of the mounting plate 91; and the arm has a tape engaging pin 383 projecting upward through an opening 384 in the plate 91 and closely adjacent the left-hand capstan 61 and on the side of that capstan on the tape path between the capstan and the left-hand reel turntable 108. The arm 381 is spring loaded in a manner to be urged to pivot in a clockwise direction as by means of pair of springy electric switch leaves 386 and 387 the bases of which are insulated from one another and are mounted on a pedestal 388 projecting from the underneath side of the plate 91. The switch leaf 386 engages a small pin 389 extending downwardly from the arm 381, and a pair of electrical contacts 391 are open when the arm 381 is in its most clockwise position. In this position, the tape engaging pin 383 is so positioned that if tape is threaded from the left-hand reel past the capstan 61 and to the right-hand reel, and is tensioned on this path as during play-record or fast wind modes of the machine, the tape engages the pin 383 and forces the arm 381 in a counter clockwise direction against the spring resistance of the switch leaves 386, 387, and concurrently closing the contacts 391. Thus an electric circuit is established, to be described later in greater detail, whenever tape is being transported on the machine, and when the end of tape is reached, the circuit is broken as by movement of the arm 381 clockwise, opening the contacts 391. As will be later seen, the electrical devices in the circuit of the contacts 391 include the reverse solenoid 352 and the play slide latching solenoid 371, which are accordingly de-energized whenever the tape breaks or the end of the tape is reached so as to return the apparatus to a stop position and prepare it for forward movement of the tape.

In order to delay the action of the sensing mechanism as above described, the pin 382 which extends from the arm 381, is journalled in a sleeve 392, which is in turn mounted beneath the mounting plate 91 as by means of a pedestal 393, the pedestal 393 being offset from the axis of rotation of the pin 382 so as to anchor the sleeve 392 against rotation. A layer of silicon grease or other damping fluid is disposed between the pin 382 and the sleeve 392, so that upon breaking of the tape or arrival of the end of tape, the arm 381 returns only slowly in a clockwise direction to its most clockwise position, and the opening of the contacts 391 is accordingly delayed.

The above described sensing mechanism is also useful to stop the machine when the tape breaks at any point on its path during reverse motion, or between the supply reel and capstan (but not at other points) during forward motion. To provide a fully effective tape-break stopping mechanism, a second sensing arm (not shown) may be provided in mirror-image position between capstan 62 and reel 43, and similarly connected.

Figure 19:
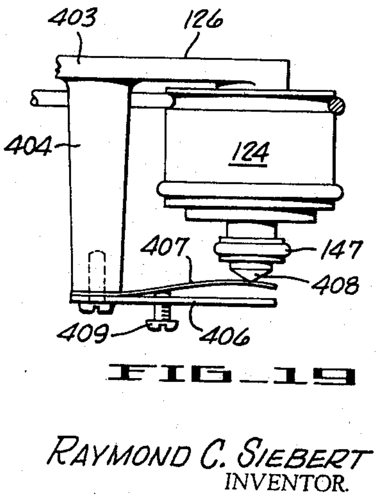
FIGURE 19 is an elevation section, to said further enlarged scale, taken on the plane of lines 19—19 of FIGURE 4.
Figure 20:
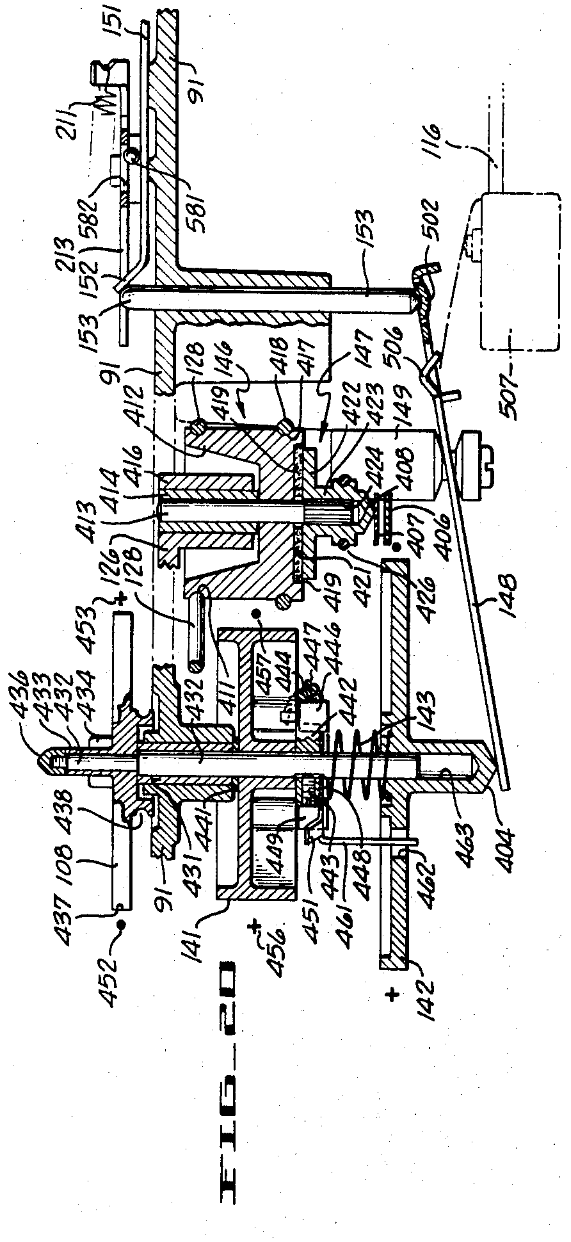
FIGURE 20 is an elevation section, to said further enlarged scale, taken on the plane of lines 20—20 of FIGURE 4.

As shown in FIGURE 4, the rocking arm 126 has an opening 401 between the pivot 127 and sleeve 217 to accommodate a vertical sleeve 402 that is mounted on the mounting plate 91 and extends upwardly to form part of the speed changing mechanism later to be described. As shown in FIGURES 4 and 19, the arm 126 also has a pair of lobes 403 forming bases for the mounting of a pair of downwardly extending pedestals 404 at the lower ends of which are mounted a laterally extending cantilever arm 406 and a spring leaf 407 that engages the tip 408 of the respective driving pulley play portion 147. The force of each leaf 407 may be adjusted by manipulation of a screw 409 threaded through the corresponding cantilever 406 and engaging the spring leaf 407. The purpose of the spring leaf 407 is to provide a desired value of frictional engagement between the pulley play portion 147 and wind portion 146, which, as shown in FIGURE 20, are formed as separate parts so as to define a frictional slipping clutch for slip-driving of the takeup reel in the play-record mode. The wind portion 146 is formed as a drum with a groove 411 for engagement with the drive belt 128, and an interior recess 412 through the axis of which extends a shaft 413 that is keyed to the play portion 146. The wind portion 146 is here shown as a molded plastic drum, into which the shaft 413 is inserted during the molding process to become bonded to the plastic and thereafter to be integrally connected therewith. The shaft 413 is journalled in an elongated bearing 414 formed as a sleeve and mounted in an elongated boss 416 extending from the arm 126 and into the interior recess 412 of the wind portion 146. The wind portion 146 also has a groove 417 into which is fitted an elastic O-ring which acts as a frictionally driving tire for driving the wind drum 141. The wind portion 146 has an end recess 419 into which is fitted a felt pad 421 and a disk portion 422 of the pulley play portion 147. Play portion 147 also has a central shaft 423 extending to the tip 408 that engages the spring 407; and an axial bore 424 fitting over the extending end of the shaft 413. An O-ring tire 426 is mounted in a corresponding groove on a driving diameter of the shaft 423 to form the frictional driving surface by which the pulley play portion 147 drives the corresponding play drum 142.

The structure of the drum means in its connection with the respective turntables is also shown in FIGURE 20. In the mounting plate 91 is press-fitted a porous metal sleeve bearing 431 in which is journaled a turntable shaft 432. One end of the shaft 432 extends upwardly and is keyed to the corresponding turntable 108, 109. For example the turntable may be formed of molded plastic and bonded to the shaft 432 during the molding process. The turntable has a central shaft 433 from which extend lugs 434 for engaging mating notches on the reel. A pointed metal cap 436 is threaded on the upper end of the shaft 432. Beneath the disk or table portion 437 of the turntable is also formed, as by an integral portion of the member and during the molding process, a grooved pulley 438, which is used for driving a revolutions counter 439 (see FIGURE 2).

The other end of the shaft 432 extends downwardly through the wind and brake drum which is also formed of molded plastic with axial extensions 441. The drum 141 is mounted on the shaft 432 for limited rotation with respect to the shaft and is axially secured as by means of a collar 442 fastened firmly to the shaft 432 by means of a set screw 443. The limited rotation of the drum 141 with respect to the shaft 432 is for the purpose of spring loading the apparatus to produce a predetermined tension in the tape and to maintain this tension even when the tape comes to a stop as when changing from one mode of operation to another. The spring loading is supplied as by means of a tension spring 444 stretched between a post 446 extending from the drum 141 and radial extension 447 of a plate 448 that is staked or riveted to the collar 442. A limit of relative rotation between drum 141 and shaft 432 in the direction urged by the spring 444 is provided by a stop post 449 against which abuts a radial extension 451 of the plate 448.

The functioning of the above-described spring loading device is best explained by reference to FIGURE 20 showing the left-hand reel driving assembly for example. It will be seen that whether the reel is being operated as a supply or takeup reel, the tape exerts a rotational moment on the reel turntable 108 and shaft 432 that is illustrated by the conventional dot 452 and feather mark 453, the dot being analogous to the head-on view of an arrow approaching an observer and representing forces tending to move the left-hand portion of the turntable as seen in the figure out of the plane of the paper; and the feather mark 453 being analogous to the tail-on view of an arrow moving away from the observer and representing forces tending to move the right-hand portion of the turntable downward and into the plane of the paper. The direction of the forces applied by the tape as above described are the same for this turntable 108 in either direction of tape motion, i.e., when the turntable is operating as a supply or a takeup turntable, and in either fast wind or play-record mode. Opposed to these forces acting on the assembly, when the left-hand reel is a supply reel, a braking force is applied to the brake drum 141 as represented by the dot and feather symbols 456 and 457. It is clear that under these circumstances the spring 444 may be stretched and tensioned with the consequence that the tape between the left-hand reel 42 and the left-hand capstan 61 will be maintained under a tension that is a function of the distortion and spring rate of the spring 444. When the apparatus is returned to stop mode, the braking force on the drum 141 is maintained and the tape is maintained under tension during the stop mode. As previously noted, the described action takes place whenever the turntable 108 is operating as a supply turntable and in either fast wind or play-record mode. When the turntable 108 is operating as a takeup turntable as during reverse motion of the tape, the spring 444 is tensioned and the tape is tensioned thereby only in the fast wind mode of operation, and of course during a stop mode following a fast wind mode. During fast wind reverse motion, the left-hand drum 141 is not subjected to braking forces but is subjected to driving forces from the pulley tire 418, these driving forces being applied in the same direction to the drum as illustrated by the symbols 456 and 457. However, when the appaartus is in a reverse play-record mode there are no forces applied to the periphery of the left-hand drum 141, neither braking nor driving forces. The driving force for the reel is applied entirely through the left-hand play drum 142, which is keyed directly to the shaft 432 as by an extension 461 extending from the plate 448 and through an opening 462 in the play drum 142. The end of the shaft 432 is accommodated in an axial bore 463 in the play drum, so that the play drum is free for axial sliding motion on the shaft 432 but is keyed for rotation therewith. The tip 464 of the play drum shaft is engaged by the tilting plate 148 which holds the assembly together.

Despite the fact that the spring 444 does not operate to tension the tape between reel 42 and capstan 61 when the apparatus is in a reverse play-record mode, nevertheless some tension is applied to the tape by means of the friction slipping clutch in the corresponding drive pulley, i.e., the felt pad 421 between the portion 146 of the pulley and the play portion 147. The portion 146 is driven at all times by the belt 128 at a rotational speed exceeding the maximum rotational speed that is possible for the takeup reel 42 during the reverse play-record mode, this speed being governed by preselected dimensions of the reel and drive system, together with the speed of the tape as governed by the capstans 61, 62. Thus there is always a frictional slipping driving moment applied to the takeup reel which maintains the tape between capstan and reel in tensioned condition.

As shown in FIGURES 4 and 20, the pin 153 loaded by the spring 143 induces a tilting moment on the play slide 151, tending to cause the slide to bind in sliding motion. To counteract this effect, a bearing ball 581 is interposed between the slide 151 and a slot 582 in the plate 213, to take the load of the thrust of pin 153.

Figure 21:
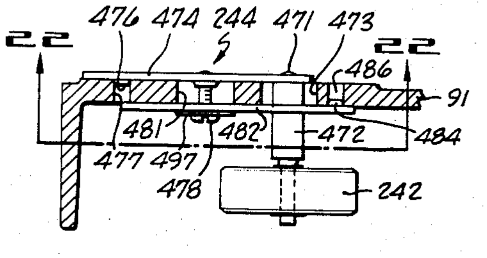
FIGURE 21 is an elevation section, to said further enlarged scale, taken on the plane of lines 21—21 of FIGURE 4.
Figure 22:
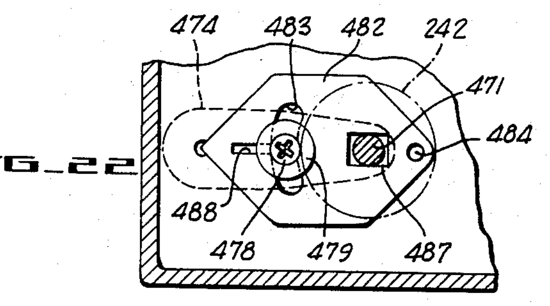
FIGURE 22 is a bottom view taken, to said further enlarged scale, on the plane of lines 22—22 of FIGURE 21.

Further details of the reel brake and mounting thereof are shown in FIGURES 4, 5 and 21–23. An important feature of the structure is the provision therein for adjusting the amount of braking force applied by positioning of the axis of the pressure rollers 242 and 243. As shown in FIGURES 21 and 22, the adjustable mount 244 includes a shaft 471 for mounting the roller, the shaft having a base portion 472 extending through an opening 473 in the mounting plate 91 and secured as by pivoting to a plate 474 that lies flat against the opposite face of the mounting plate 91. The plate 474 has an embossed protrusion 476 fitting into a conforming opening 477 in the plate 91, by which the plate 474 is rendered pivotable for adjusting the vertical position of the shaft 471. The adjusted position of the plate may be held by means of a clamping screw 478 and washer 479 positioned loosely in an opening 481 in the plate 91 and threaded into the plate 474. The washer 479 can be made to bear aginst the first side of the plate 91, i.e., the side from which the shaft 471 projects. However for convenience in making adjustments, the washer 479 is here shown as bearing against a second plate 482 mounted on the above described first side of the mounting plate 91 and formed with an opening 483 for passage of the screw 478. The opening 483 is formed along an elongated arc centered in the opposite end of the plate and at an embossed protrusion 484 by which the plate 482 is pivoted with respect to a conforming opening 486 in the mounting plate 91. The plate 482 also has an opening 487 for passage of the base portion 472 of the shaft 471, an opening 487 having a length along the length of the plate that is greater than the diameter of the base portion 472 but a width that is substantially equal to that diameter. A slot 488 is formed at the swinging end of the plate 482 for insertion of a tool such as a screwdriver for moving the plate in pivoting motion. It will be seen that with the structure described, rapid and very precise adjustments can be made to position the roller and adjust the braking force that is applied thereby through the leaf spring 246 to the corresponding reel.

In order to retain the brake bar 241 in the apparatus, the bar is formed as shown in FIGURE 23, as a channel member having a bottom web 491 and two side flanges 492 fitting on either side of the rollers 242, 243. A layer of frictional material 493 is cemented to the bottom of the web 491. The angled brackets 252, 253 are formed with feet 494 mounted with spacers 495 for the mounting of the spring leaves 246, 247, the assembly being secured together by bolts 496 on which are threaded retainers 497. To increase the range of spring forces that may be applied by the springs 246, 247 within the length and range of movement permitted, each spring is formed with an elongated opening 498 (FIGURE 23*a*) extending substantially between the stop and wind points of engagement with the rollers 242, 243. The spring leaves 256, 257 (FIGURES 4 and 5) are formed as two symmetrical portions of an integral member having a center portion 499 secured to the web 491 by a bolt 501. With the arrangements above described, desirable braking forces have been obtained in practice as follows: in the wind mode, 35 inch-grams; in the paly mode, 65 inch-grams; and in the stop mode, 285 inch-grams. In addition, the braking force applied to the takeup reel brake drum in the stop position is approximately one ounce.

As shown most clearly in FIGURES 3 and 20, the cam follower pin 153, in engagement with the tilting plate 148 is seated on the plate in a depression 502 that is formed in a peninsular portion 503 of the plate 148. The peninsular portion 503 is formed as by cutting away the plate in a U-shaped slot. The peninsular portion is readily bendable with ordinary tools and may thus be adjusted during the manufacturing process so that machining of the component portions to extremely close tolerances is not necessary.

Also as shown in FIGURE 3 and 20, the tilting plate 148 has a pair of extensions 504 and 506 for the mechanical operation of various electronic components. The use of the extension 504 will be explained in a later section. The extension 506 is used to operate a micro-switch 507 that is mounted on an ear 508 of the front suspension plate 116. When the tilting plate 148 is turned to the play-record position, it operates and closes the micro-switch 507. This micro-switch is connected in parallel with the main power switch of the machine for the purpose of perpetuating the play mode beyond the shut-off of the main power switch when, for example, it is desired to leave the machine unattended and to arm the machine to turn itself off when the end of the tape is reached. For example if the machine is playing in reverse direction when the main power switch is turned off, the machine continues to play with power supplied through the parallel micro-switch 507 until the end of tape is reached and the tape is disengaged from the right-hand reel and wound entirely on the left-hand reel 42. As soon as the tape is disengaged from the sensing arm 381, the switch leaves 386, 387 are opened, the play slide latching solenoid 371 is de-energized, the play slide 151 returns to stop position under the urging of wind slide 201 and its spring 211; the cam follower 153 is released to permit the tilting plate 148 to tip back to stop position; and when the tilting plate 148 returns to stop position the micro-switch 507 is opened and the machine is entirely turned off.

To maintain the capstans 61, 62 at constant speed, each is coupled to a flywheel 511 as shown in FIGURE 24. The flywheel may be heated and shrunk onto the elongated capstan shaft, and is formed with a flange 512 and an axially elongated cylindrical pulley face 513 to accommodate the drive belt 112 in at least three different axially spaced positions corresponding to the different positions occupied by the belt on the stepped pulley 111 as previously described. The capstan shaft above the flywheel is journalled in a boss 514 of the mounting plate 91, the boss containing a suitable bearing bushing 516, and a washer 517 being interposed between the lower end of the boss and bushing and the upper end of the flywheel hub 518. The lower end of the capstan shaft is formed to a spherical configuration and is resting on a thrust bearing 519 of suitable low-friction material. The bearing 519 is enclosed in an interior bore 521 of a boss 522 of the front suspension plate 116; and an adjustment screw 523 is threaded through the lower portion of the bore 521 to regulate the end play of the capstan shaft 61.

The stepped pulley 111 is formed, as shown in FIGURES 26 and 27, in this instance, for ease of manufacture, of a two-stepped lower pulley portion 531 having stepped grooves 532 and 533 formed therein, and a similar diameter single-stepped pulley portion 534 having a pulley groove 536 formed therein. The smallest stepped pulley portion 534 has an integrally formed arm 537 extending radially to slightly beyond the radius of the bottom of the greatest diameter groove 532. When it is desired to move the belt 112 from the groove 536 to a greater diameter groove 533 or 532, it is only necessary to displace the belt slightly toward the motor 101 slightly upstream from the pulley on the belt path, and the arm 537 automatically engages the belt and shifts it to the next higher step 533. The step 533 has a similar device in the form of a washer 538 secured by means of a bolt 539 near the periphery of the greatest diameter step 532 and extending radially beyond the bottom of the groove 532. Both the arm 537 and the washer 538 are formed with beveled surfaces 541 and 542 respectively to assist in the function of catching and shifting the belt. The arm 537 and washer 538 are positioned substantially at opposite ends of a diameter of the pulley assembly. Also as shown in the figure a third pulley 544 is secured to the shaft 107 to accommodate the reel drive belt 128. During starting in wind or play-record mode, slippage between belt 128 and pulley 544 absorbs the initial torque.

For displacing the belt upstream from the stepped pulley to initiate shifting as above described, a belt shifting fork member 551 (FIGURES 26, 27) is provided. The member comprises a pair of U-shaped arms 552 and 553 centrally mounted on a shaft 554 and separated by a spacer 555 of slightly greater axial length than the diameter of the belt 112, the assembly being held on the shaft 554 by means of a bolt 556. The upper end of the shaft 554 has a set of four disk-like spaced collars 561, 562, 563 and 564 formed thereon and journalled in the sleeve 402 previously described as extending from the mounting plate 91. The shaft 554 is free for axial motion and for rotation in the sleeve 402, but is positioned in one of three axial positions by means of a detent ball 566 retained in an opening in the side of the sleeve 402 by means of a leaf spring 567. The ball fits snugly between any adjacent pair of collars 561–564 and holds the shaft and fork member in any one of the three corresponding axial positions to which it is shifted.

The manual shifting mechanism for the fork member includes a plastic shifting lever 571 having a central bore 572 by which it is mounted on the control button mounting plate 161 as by means of the pin 303 previously described. The lever 571 has a second bore 573 at right angles to the bore 572 and communicating therewith so as to open toward the sleeve 402. Within the bore 573 is disposed a compression spring 574 which at one end is seated against the pin 303 and at the other end bears against the end of a pin 576 so as to urge the pin 576 in an outward direction, through a vertical slot 577 in the sleeve 402 and into the uppermost space between the two uppermost collars 561 and 562 of the shaft 554. Thus if the lever 571 is pivoted on the pin 303, the shaft 554 is moved up and down between its three vertical positions.

As previously explained the shaft 554 is free for rotation; and it will be noted that the two ends of each U-shaped arm 552, 553 are spaced at a distance much greater than the maximum diameter of the stepped pulley 111. This structure is another example of how the direction of rotation of the motor 101 controls the reversal of operating elements of the machine. It will be noted that no matter which way the motor is rotating, the belt 112 frictionally engaging the ends of the arms 552, 553 drags the arms in a rotational direction corresponding to that of the motor rotation and belt movement, so that the ends of the arms that are upstream from the stepped pulley are dragged close to the pulleys and the ends of the arms that are downstream from the stepped pulley are moved as far as possible from the pulley. A bracket 578 mounted on the rear suspension plate 103 is used to limit the degree of rotation of the arms 552, 553. However it will be seen that within the freedom of movement permitted, the rotation of the arms as above described is very convenient for correct and certain shifting of the belt 112, because as has been found in practice, the belt is quickly and easily shifted when it is displaced in an axial direction of the pulley and at a point immediately upstream from the pulley; but if the belt is displaced immediately downstream from the pulley a binding and tangling of the belt with the arm 537 and washer 538 may result in such a way as to break the belt or stop the machine. Thus by the above described structure, the upstream ends of the shifting arms are moved as close to the pulley as possible while the downstream ends of the arms are moved sufficiently far away not to be able to affect the shifting operation unfavorably.

One of the important features of the invention is the manner in which tape edge guides are mounted near the capstans for the purpose of countering tendencies of the capstans to skew drive the tape. Taking for example the structure of FIGURES 24 and 25, showing the arrangements in the vicinity of the left-hand capstan 61, it will be seen that a pair of tape edge guiding flanges 591 and 592 are mounted on a bolt 593 separated by a spacing sleeve 594, the bolt being threaded into a pedestal 596 extending downwardly from the head mounting plate 96, the assembly constituting a tape guide post with edge guiding flanges. The features of interest in the arrangement shown are that the flanges 591, 592 are positioned as close as possible to the capstan 61 and upstream therefrom on the path of tape movement, assuming that the tape is moving in a forward direction as indicated by the arrow 69; and that the tape in its path is caused to be sharply bent or folded both at the contact point with the sleeve 594 and at the contact point with the capstan 61. The principle employed by this structure may be stated as follows. Edge guiding is best accomplished when the tape to be guided has transverse stiffness, i.e., is not easily bent or deformed around an axis parallel to its length. Such stiffness is obtained by bending the tape about an axis transverse to its length, such as that provided by the sleeve 594, so that the tape has a cylindrical surface, the generatrices of which are parallel and transverse to the length of the tape. The flanges 591, 592 are then placed precisely at the point of bend of the tape where the stiffness is greatest and where the tendency of the edges of the tape to curl upon engagement with the flanges is least. Since the purpose of the guide is to keep the tape from being driven toward one end or the other of the capstan, and since the lateral stiffness induced by the bend extends with diminishing effects along the length of the tape, the best result is achieved when the bend induced by the guide is as close to the capstan as possible. The lateral stiffness is somewhat further increased by causing a second bend to be induced in the tape by the capstan itself. This arrangement has been found to be extremely effective in preventing skew driving of the tape by the capstan, particularly when the guide is placed immediately upstream from the capstan. For achieving the same effect during reverse motion of the tape, a second guide is placed immediately to the right of the capstan 61 and includes similar flanges **592*a*, 591*a*, sleeve 594*a*, bolt 593*a* and pedestal 596*a*. Thus in the vicinity of the capstan, there are induced three bends in the tape: one at sleeve 594, one at capstan 61, and the third at sleeve 594*a*. To assist in the threading of the tape, and to prevent the tape from becoming snagged in the apparatus when loosened, a pair of curved guard flanges 597, 598 are mounted immediately above and immediately below the guide flanges 591, 592, 591*a*** and 592*a*. The guide flanges may be made of a hard wear resistant material, but the guard flanges 597, 598 need not be so made. A similar set of guides is provided for the right-hand capstan 62 in mirror image disposition.

In order to keep the tape on the guides at all times despite the transient occurrence of slackness between the capstans, such as may be caused by changes in direction or speed of the tape or the passage of splices, there is provided a tension arm 581 (FIGURE 4) pivoted as by a pin 582 to the play slide 151, and loaded as by a spring 583 to pivot in a direction to tension the tape between the transducing heads. A cam extension 584 of the arm engages the post 167 when the play slide is moved to stop position, and causes withdrawal of the arm 581 from the tape path.

There are two ways in which the mechanical components above described are coupled to control the electronic system during the various operating modes of the machine.

As shown in FIGURES 4 and 28 the extension 504 from the tilting plate 148 is coupled to interlock the record button 78 when the machine is in play mode so that the record button cannot be accidentally depressed to erase something already recorded on the tape. If the operator actually intends to record on the tape, he must depress the record button 78 before he pushes the play-record button 63. If he has previously pushed the play-record button 63, to put the machine in play-record mode, the tilting plate extension 504 moves upward, engaging a fork arm 601, and pivoting the arm in a clockwise direction as shown in the figure about a pivot pin 602, and causing an extension 603 of the arm to be obtruded into the path of a sliding plate 604 on which the button 78 is mounted. The pivot pin 602 is secured to an ear 606 extending from the electronic mounting chassis 607, and an extension 608 of the arm 601 is guided during the pivoting motion in a slot 609 also formed in the chassis 607, so as to guide the arm 601 to pivot in a predetermined plane. The sliding plate 604 is mounted for sliding motion on the chassis 607 as by means of bolts 611 threaded through slots 612 in the sliding plate and into the chassis. An ear 613 of the plate 604 serves as a mounting for a pin 614 which constitutes the actual portion of the plate that encounters the extension 603 of the arm in movement. The plate 604 also has an extension 616 for mounting the button 78 and for holding the button over a lamp 617 that is mounted on the chassis. In this example the button 78 is a transparent plastic rod, and the lamp 617 is a red light that shows through the button 78 when the machine is in the record mode. The extension 616 of the sliding plate engages the plunger 618 of a micro-switch 619 when the button 78 is depressed, the micro-switch 619 being connected in the record and other electronic circuits to operate the same.

A second mechanical coupling is made from the speed changing lever 571 to alter the amplifier system when the play and record speeds are changed. As shown in FIGURES 4 and 29–31 a crank 621 formed as a bent rod is mounted to pivot about a portion 622 of its length, the portion 622 being cradled in a groove 623 formed in the mounting plate 91; and portion 622 is retained in the groove 623 by means of the wind slide 201, which overlies the groove 623. An upper end of the crank 621 includes an upwardly directed portion 624, a horizontally directed portion 626, and another upwardly directed portion 627 that fits within a recess 628 formed in the body of the speed change lever 571. The recess 628 is formed with a pair of pointed shoulders 629 confronting one another and engaging opposite sides of the upwardly directed portion 627 to provide bearing contact between the lever and the crank, which pivot around different axes. The other end of the crank 621 has a downwardly directed portion 631, and a horizontally directed portion 632 that fits into a vertical slot 633 in the sliding plate 634. When the speed change lever 571 is moved, the crank 621 is pivoted, and the plate 634 is caused to slide to operate a group of electrical switch leaves 636 to effect the electronic changes desired. The plate 634 has a pair of slots 637, 638 by which it is mounted on a pair of pins 639 and 641 for the desired sliding movement, the pins being mounted on a portion of the electronic chassis 607. To assist in holding the plate 634 in the selected one of its three possible positions, the slot 637 is formed with three notches 642, 643 and 644 in the upper side thereof, and a tension spring 646 is coupled between the lower portion of the plate 634 and a portion of the electronic chassis 607.

To provide for automatic reversal of tape motion at the end of forward play, or at any other time, a 20-cycle signal may be recorded on the tape. When the head reads the 20-cycle signal during playback, the transport is automatically reversed through the action of the reversing mechanism, shown in FIGURES 17, 24 and 32–35 and described as follows.

As shown in FIGURE 24 four two-channel heads may be provided: a forward record and play head 58, which may be used for either recording or playing on channels 1 and 3 of a four-channel array, corresponding to a distribution of four recording tracks across the width of the tape; a forward erase head 57, also operating on channels 1 and 3; a reverse record and play head 56, operating on channels 2 and 4, and a reverse erase head 59 (in phantom in the figure). To record in both directions on the tape, the tape is first moved forwardly with head 57 erasing and head 58 recording, and then in reverse direction with head 59 erasing and head 56 recording. For playback, the erase heads are inactivated and heads 58 and 56 are coupled to read the tape in forward and reverse modes respectively. However for home use with pre-recorded tapes, the head 59 may be eliminated. Head 58 is then coupled as a forward record and play head, head 57 as a forward erase head, and head 56 as a reverse play head. For recording with this arrangement, the tape is first moved in forward mode to the end of tape, with head 57 erasing and head 58 recording on tracks 1 and 3 of the tape, and then the two reels are removed with the tape thereon and interchanged, so as to invert the tape. The recording is then continued with the machine still in forward mode and with head 57 erasing and head 58 recording on tracks 2 and 4 of the tape, and in a direction that is opposite, on the tape, to the direction in which tracks 1 and 3 were recorded. For playback, the reels are started in their original positions, and are played first in forward mode, but are not interchanged to invert the tape for reverse playback. Thus upon playback in forward mode, the erase head 57 is inactivated and tracks 1 and 3 of the tape are read by head 58, and upon reversal of tape motion, head 58 is uncoupled and head 56 is coupled to read tracks 2 and 4 of the tape. The coupling and uncoupling is effected by various contacts of the switch 365, shown in FIGURES 17 and 32.

To provide the 20-cycle signal to be recorded on the tape at the end of the forward recording cycle, a 20-cycle signal generator 706 is provided as shown in FIGURE 32. The generator includes a coil 707 coupled in series with the audio signal circuits 708 and the appropriate head 58 or 56 through the switch 365, so that the audio signal to be recorded by head 58, or the audio signal that is read by head 58 or 56 passes through the coil. The coil 707 is inductively coupled to a vibratable arm 709 that is balanced to vibrate substantially at 20 cycles per second. When it is desired to produce the 20-cycle signal, for recording on the tape, the operator operates a mechanical triggering mechanism, hereinafter described, to cause the armature to vibrate, and the consequent variation of the inductive linkage between the arm and coil causes a 20-cycle signal to be superimposed on the audio signal and recorded on the tape. Such a low-frequency signal is not ordinarily recognizable to the ear, so that upon playback the listener's enjoyment of the audio signal is not interfered with. The 20-cycle signal may also be recorded at the end of the reverse recording cycle as above described for the purpose of repeating the playing of the entire tape as hereinafter described.

When during playback the recorded 20-cycle signal is read by the head 58 or 56, the signal passing through the coil 707 causes the arm 709 to vibrate, and to repeatedly close a pair of switch contacts 711 that are coupled in series with ground, with a resistor 712, with a parallel coupled capacitor 713 and relay coil 714, and with a 33-volt power source 716. The repeated closing of the contacts 711 causes a growing current to build up in coil 714, which current eventually attains a value sufficient to close two pairs of ganged contacts 717 and 718 of the relay coil 714, for operation of the stopping and reversing mechanisms. A manual switch 719 is operable to permit the energization of this circuit only in the playback mode.

During forward play, the reversing solenoid 352 is energized, through a resistor 721, at a fraction of the voltage required to pull the plunger of the solenoid to closed or centralized position in the coil against the tension of spring 351; although as previously described, the energizing force is sufficient to hold the armature in closed position if it is manually moved thereto, as in hand operation to reverse play mode. For automatic reversal as by the 20-cycle tone above described, the reception of the tone by the head 58 and the consequent closing of contacts 718 cause the solenoid 352 to be coupled directly between ground and the power source 716, so that the solenoid is energized with sufficient force to move the armature to closed or reverse position. Although the dying away of the 20-cycle tone results in the opening of contacts 718, the fractional holding energization to which the solenoid is returned is sufficient to maintain the reverse position of the armature and associated apparatus, and the machine plays in the reverse direction until the tape is completely rewound (if there is no 20-cycle tone recorded at the end of the reverse track), when tape switch 386, 387 is opened, dropping out the solenoid 352; or alternatively until a 20-cycle tone at the end of the reverse track is reached and the machine is sent into "repeat" operation, as follows.

For stopping the machine at the end of the reverse track without completely rewinding the tape and in particular for setting the machine for a repetition of forward play of the same tape, a stopping relay 722 is provided in series with the power supply 716, with a resistor 723, and with a pair of contacts of the reversing switch 105 that are open in the forward mode and closed in reverse mode. Thus, as soon as the machine goes into reverse mode, the relay 722 is energized, and a pair of contacts 724 of the relay, between the power source 716 and the contacts 717, 718, are opened to prevent the full-strength energization of the solenoid 352 at the end of the reverse track. The repositioning of contacts 724 also couples the switches 717, 718 to ground through a manually operated "repeat" switch 726. Thus at the end of the reverse track, the recorded 20-cycle signal causes closing of contacts 717, 718 and short-circuiting of the solenoid 352 through contacts 724 and 726 to ground, resulting in dropping out of the solenoid and return thereof to "forward" mode position under the urging of spring 351. The contacts 717 meanwhile perpetuate the energization of relay 722, despite the opening of reverse switch contacts 105, until the 20-cycle signal has entirely died away, at which time the contacts 717, 718 are opened, the relay 722 is de-energized, contacts 724 are returned to couple the source 716 and contacts 717, 718, and the solenoid 352 is returned to fractional strength energization in the forward position. The apparatus is then entirely in the forward mode condition.

The repeat operation above described does not take place unless the switch 26 is closed and a 20-cycle tone has previously been recorded at the end of the reverse track. If both of these conditions do not obtain concurrently, the tape rewinds completely and the switch 386, 387 is opened, stopping the machine.

Also shown is the switch 507 in parallel with the main power switch 730, coupled between the A.C. line and power source 716.

The construction of the 20-cycle tone generator is shown in FIGURES 33–35. A U-shaped bracket 731 is provided between the legs of which is stretched a spring steel ribbon 732 forming in effect a torsional shaft for mounting the vibrating arm 709. The tension in the ribbon 732 is adjusted and maintained by means of a spreading device, including a bolt 736 threaded through one of the legs of the bracket 731 and mounting a compression spring 737 that bears against the other leg of the bracket 731. When the screw is tightened the spring exerts greater tension on the steel ribbon 732. This tension is adjusted so as to cause the vibrating arm 709 to vibrate at substantially 20 cycles per second when it is set in motion, as by means of a trigger 738. The trigger 738 is a spring leaf having a shoulder 739 for engaging the arm 709 and is mounted on a plate 741 that pivots on a pin 742 affixed to a mounting member 743. A tension spring 744, coupled to a stud 746 on the plate 741 and to a stud 747 on the mounting member 743, urges the plate to an inactive position against the stud 747. When it is desired to activate the trigger, the operator turns the knob 77 to rotate a shatf 749 and a cam 751 mounted thereon, and the cam moves the stud 746 to rotate the plate 741 and brings the trigger shoulder 739 into engagement with the vibrating arm 709. The arm 709 is displaced for a predetermined angle and is then released for vibration, as by engagement of the leaf 738 with a pin 740, which displaces the leaf to a position disengaging the shoulder 739 from the arm 709. Thus the arm is set in vibration.

To produce the 20-cycle signal, the arm 709 is positioned so that at one extreme angle of displacement (FIGURE 34), it is aligned with a pair of pole tips 752, 753 that are coupled to a magnetic core 754 upon which is wound the coil 707. In such an angle of displacement, the arm 709, which is made of high permeability material, more effectively bridges the gap between the pole tips, while in other positions, the bridging is less effective. Consequently, the repeated and cyclic vibration of the arm 709 casues a cyclic variation of the reluctance path of the apparatus and impresses a 20-cycle signal upon the coil 707, which signal is recorded by the head 58.

For use as above described during the playback process, the switch 711 is mounted on a bracket 756 that extends from the pole tip 752, and one leaf of the switch has an insulated projecting member 757 extending therefrom, which is repeatedly struck by the vibrating arm 709 to close the switch. It is to be understood that the vibration of the arm 709 during playback is caused by the passage of the reproduced 20-cycle signal through the coil 707, and not by mechanical turning of the knob 77. To prevent the switch 711 from interfering with the vibration of the arm 709 during recording of the 20-cycle signal, the switch is lifted out of the vibrational path of the arm 709 whenever the knob is turned. For this purpose a lifting lever 758 is provided, pivoted at a midpoint by a pin 759 extending from mounting member 743, and terminating in a fork portion 761 engaging the stud 746. Thus when the knob 77 is turned and plate 741 is depressed, the switch 711 is lifted away from the arm 709.

It will be understood that the reversing system above described may be adapted within the scope of the invention to cause fast rewind of the tape at the end of forward play.

Thus there has ben described a tape recording and reproducing machine driven by a single reversible electric motor. The motor drives a pair of tape driving captans in such a way that in either direction of rotation of the motor and capstans, the latter act to tension the tape across the transducing heads. Also coupled to the motor for reversible rotation is a reel drive means that is responsive to the direction of rotation to drive the play takeup reel or to fast-wind the tape. A brake for the reels is also provided that is responsive to the direction of the tape motion to apply suitable braking forces in the various operating modes of the apparatus.

What is claimed is:

1. In a magnetic tape transport of the class in which the tape is mounted on a pair of reels for selective winding and playing movement in both forward and reverse longitudinal directions, the combination comprising:
main drive means operable in forward and reverse direction;
means for selectively coupling and uncoupling said tape and said main drive means in both of said forward and reverse directions of operation;
means for selectively coupling and uncoupling said main drive means and the takeup one of said reels for winding up said tape in the direction of movement thereof;
said tape-coupling means having a lost-motion connection with said reel-coupling means such that operation of said tape-coupling means causes corresponding operation of said reel-coupling means, said reel-coupling means being also operable independently of said tape-coupling means; and
reel brake means operatively associated with said reels for continuous braking of at least the supply one of said reels.

2. In a magnetic tape transport of the class in which the tape is mounted on a pair of reels for selective winding and playing movement in either longitudinal direction, the combination comprising:
main drive means having an output element disposed for movement in one direction corresponding to movement of said tape in a forward longitudinal direction and toward a first one of said reels, and for movement in the opposite direction corresponding to movement of said tape in the reverse longitudinal direction and toward the second of said reels;
direction control means operatively associated with said main drive means for selectively causing movement of said output element in said one and opposite directions;
tape-driving control means operatively associated with said main drive means and said tape for selectively causing tape-driving coupling and uncoupling of said tape and said output element in both of said forward and reverse directions of operation;
reel-driving control means operatively associated with said main drive means and said reels for selectively causing reel-driving coupling and uncoupling between said output element and the takeup one of said reels for winding up said tape thereon;
said tape-driving control means having a lost-motion connection wth said reel-driving control means such that operation of said tape-driving control means for said coupling and uncoupling of said tape and output element causes correesponding operation of said reel-driving control means for said coupling and uncoupling respectively of said takeup reel and output element, said reel-driving control means being also operable independently of said tape-driving control means; and
reel brake means operatively associated with said reels for continuous braking of at least the supply one of said reels.

3. In a magnetic tape transport of the class in which the tape is mounted on a pair of reels for selective winding and playing movement in either longitudinal direction, the combination comprising:
main drive means having an output element disposed for movement in one direction corresponding to movement of said tape in a forward longitudinal direction and toward a first one of said reels, and for movement in the opposite direction corresponding to movement of said tape in the reverse longitudinal direction and toward the second of said reels;
direction control means operatively associated with said main drive means for selectively causing movement of said output element in said one and opposite directions;
tape-driving control means operatively associated with said main drive means and said tape and having tape-driving and stop positions for selectively causing tape-driving coupling and uncoupling respectively of said tape and said output element in both of said forward and reverse directions of operation;
reel-driving control means operatively associated with said main drive means and said reels and having at least one reel-driving position and one stop position for selectively causing reel-driving coupling and uncoupling respectively between said output element and the takeup one of said reels, with said reel-driving coupling being such as to wind up said tape on said first reel upon movement of said output element in said one direction thereof and to wind up said tape on said second reel upon movement of said output member in said opposite direction thereof;
said tape-driving control means having a lost-motion connection with said reel-driving control means such that movement of said tape-driving control means between said stop and tape-driving positions thereof causes corresponding movement of said reel-driving control means between said stop and reel-driving positions thereof, said reel-driving control means also being movable independently of said tape-driving control means; and
reel brake means operatively associated with said reels and having forward and reverse operating positions for continuous braking of at least the supply one of said reels.

4. In a magnetic tape transport of the class in which the tape is mounted on a pair of reels for selective winding and playing movement on a predetermined path and in either longitudinal direction past a magnetic transducing means, the combination comprising:
main drive means having an output member mounted for rotation in one direction for driving said tape in a forward longitudinal direction and toward a first of said reels, and for rotation in the opposite direction for driving said tape in the reverse longitudinal direction and toward the second of said reels;
direction control means coupled to said main drive means for selectively causing rotation of said output member in said one and opposite rotational directions;
a pair of tape driving capstans mounted on said tape path at either side of said transducing means and coupled to said output member for conjoint rotation therewith to drive said tape in said forward and reverse longitudinal directions;
tape control means having play and stop positions for selectively engaging and disengaging said tape and both of said capstans conjointly;
reel drive means coupled to said output member and having a stop position disengaged from both of said reels and a pair of play positions and a pair of wind positions constituting reel driving positions and selectively controlled by the rotational direction of said output member, said reel drive means engaging a different one of said reels in each of said play positions and in each of said wind positions for driving said respective engaged reel in a tape winding direction so as to wind up said tape on said first reel upon rotation of said output member in said one direction thereof and to wind up said tape on said second reel upon rotation of said output member in said opposite direction thereof;

self-energizing and de-energizing reel brake means mounted for continuous engagement with at least the supply one of said reels and urged thereby for movement from stop, through play and to wind positions of decreasing supply reel braking force in each direction of rotation of said reels;

reel control means having a stop position engaging and holding said reel drive means and said brake means in said stop positions thereof, and play and wind positions disengaged from said reel drive means and engaging and holding said brake means in the corresponding one of said play and wind positions thereof;

said tape control means having a lost-motion connection with said reel control means in said stop and play positions thereof so that movement of said tape control means between said stop and play positions thereof causes corresponding movement of said reel control means between said stop and play positions thereof, said reel control means being also movable between said stop, play and wind positions thereof independently of said tape control means.

5. In a magnetic tape transport of the class in which the tape is mounted on a pair of reels for selective winding and playing movement on a predetermined path and in either longitudinal direction past magnetic transducing and guide means, the combination comprising:

main drive means having an output member mounted for rotation in one direction for driving said tape in a forward longitudinal direction and toward a first of said reels, and for rotation in the opposite direction for driving said tape in the reverse longitudinal direction and toward the second of said reels;

direction control means coupled to said main drive means for selectively causing rotation of said output member in said one and opposite rotational directions;

a pair of tape driving capstans mounted on said tape path at either side of said transducing means and coupled to said output member for conjoint rotation therewith to drive said tape in said forward and reverse longitudinal directions;

tape control means having play and stop positions for selectively engaging and disengaging said tape and both of said capstans conjointly;

reel drive means coupled to said output member and having a stop position disengaged from both of said reels and a pair of play positions and a pair of wind positions constituting reel-driving positions and selectively controlled by the rotational direction of said output member, said reel drive means engaging a different one of said reels in each of said play positions and in each of said wind positions for driving said respective engaged reel in a tape winding direction so as to wind up said tape on said first reel upon rotation of said output member in said one direction thereof and to wind up said tape on said second reel upon rotation of said output member in said opposite direction thereof;

self-energizing and de-energizing reel brake means mounted for continuous engagement with at least the supply one of said reels and urged thereby for movement from stop, through play and to wind positions of decreasing supply reel braking force in each direction of rotation of said reels;

reel control means having a stop position engaging and holding said reel drive means and said brake means in said stop positions thereof, and play and wind positions disengaged from said reel drive means and engaging and holding said brake means in the corresponding one of said play and wind positions thereof;

said tape control means having a lost-motion connection with said reel control means in said stop and play positions thereof so that movement of said tape control means between said stop and play positions thereof causes corresponding movement of said reel control means between said stop and play positions thereof, said reel control means being also movable between said stop, play and wind positions thereof independently of said tape control means;

said reels and said transducing and guide means being arranged to provide a bend in said tape at each of said capstans, whereby the transverse rigidity of said tape is increased; and a pair of edge-guiding flanges mounted to engage the edges of said tape at both the upstream and downstream sides of each capstan and immediately contiguous thereto, so as to provide edge guiding for said tape immediately upstream from each capstan in each direction of tape motion, each pair of said flanges being provided with a lateral guiding post spaced from and on either side of the respective capstan and each post inducing a further bend in said tape.

6. In a magnetic tape transport of the class in which the tape is mounted on a pair of reels for selective winding and playing movement on a predetermined path and in either longitudinal direction past magnetic transducing means, the combination comprising:

main drive means having an output member mounted for rotation in one direction for driving said tape in a forward longitudinal direction and toward a first of said reels, and for rotation in the opposite direction for driving said tape in the reverse longitudinal direction and toward the second of said reels;

direction control means coupled to said main drive means for selectively causing rotation of said output member in said one and opposite rotational directions;

a pair of tape driving capstans mounted on said tape path at either side of said transducing means;

an elastic belt coupling said capstans to said output member for conjoint rotation therewith to drive said tape in said forward and reverse longitudinal directions, with the direction of motion of said belt in each direction of tape motion being from said output element to that one of said capstans that is upstream with respect to the direction of tape motion, thence to the downstream capstan, and thence to said output element, whereby the downstream capstan in each direction of tape motion tends to drive said tape faster than the upstream capstan, and said tape is tensioned between said capstans;

tape control means having play and stop positions for selectively engaging and disengaging said tape and both of said capstans conjointly;

reel drive means coupled to said output member and having a stop position disengaged from both of said reels and a pair of play positions and a pair of wind positions constituting reel-driving positions and selectively controlled by the rotational direction of said output member, said reel drive means engaging a different one of said reels in each of said play positions and in each of said wind positions for driving said respective engaged reel in a tape winding direction so as to wind up said tape on said first reel upon rotation of said output member in said one direction thereof and to wind up said tape on said second reel upon rotation of said output member in said opposite direction thereof;

self-energizing and de-energizing reel brake means mounted for continuous engagement with at least the supply one of said reels and urged thereby for movement from stop, through play and to wind positions of decreasing supply reel braking force in each direction of rotation of said reels;

said tape control means having a lost-motion connection with said reel control means in said stop and play positions thereof so that movement of said tape control means between said stop and play positions thereof causes corresponding movement of said reel control means between said stop and play positions thereof, said reel control means being also movable between said stop, play and wind positions thereof independently of said tape control means.

9. In a magnetic tape transport of the class in which the tape is mounted on a pair of reels for selective winding and playing movement on a predetermined path and in either longitudinal direction past magnetic transducing means, the combination comprising:

main drive means having an output member mounted for rotation in one direction for driving said tape in a forward longitudinal direction and toward a first of said reels, and for rotation in the opposite direction for driving said tape in the reverse longitudinal direction and toward the second of said reels;

direction control means coupled to said main drive means for selectively causing rotation of said output member in said one and opposite rotational directions;

a pair of tape driving capstans mounted on said tape path at either side of said transducing means and coupled to said output member for conjoint rotation therewith to drive said tape in said forward and reverse longitudinal directions;

tape control means having play and stop positions for selectively engaging and disengaging said tape and both of said capstans conjointly, said tape control means including a play slide member mounted for sliding motion between said stop and play positions, means for urging said play slide member toward said stop position thereof, latch means for holding said play slide member in said play position thereof against the urging of said urging means, a pair of pinch rollers each mounted at one end of a centrally pivoted arm for swinging motion toward and away from a position of engagement with a respective one of said capstans, the other end of each arm constituting a cam follower, and a pair of cams mounted on said play slide member for movement therewith between said play and stop positions thereof, each of said cams engaging one of said cam follower ends of said arms and urging said respective roller thereby to said position of capstan engagement in said play position of said play slide member, and away from said position of capstan engagement in said stop position of said play slide member, each of said cams being mounted on said play slide member for pivoting motion toward and away from said respective cam follower end of said arms, a pair of leaf springs are mounted each on one of said cams, a pair of adjusting screws are mounted on said play slide member, each bearing against one of said leaf springs and urging same in a direction to cause engagement of said respective cam and arm and movement of said respective arm toward said position of engagement of said respective roller with said respective capstan, and stop means mounted on said play slide member and engaging said cams only in the play position of said play slide member and thereby limitign the motions of said cams, arms and rollers toward said engaged positions with said capstans, whereby the force of engagement of said rollers and said capstans in said play position of said play slide member may be adjusted and equalized by use of said adjusting screws;

reel drive means coupled to said output member and having a stop position disengaged from both of said reels and a pair of play positions and a pair of wind positions constituting reel-driving positions and selectively controlled by the rotational direction of said output member, said reel drive means engaging a different one of said reels in each of said play positions and in each of said wind positions for driving said respective engaged reel in a tape winding direction so as to wind up said tape on said first reel upon rotation of said output member in said one direction thereof and to wind up said tape on said second reel upon rotation of said output member in said opposite direction thereof;

self-energizing and de-energizing reel brake means mounted for continuous engagement with at least the supply one of said reels and urged thereby for movement from stop, through play and to wind positions of decreasing supply reel braking force in each direction of rotation of said reels;

reel control means having a stop position engaging and holding said reel drive means and said brake means in said stop positions thereof, and play and wind positions disengaged from said reel drive means and engaging and holding said brake means in the corresponding one of said play and wind positions thereof;

said tape control means having a lost-motion connection with said reel control means in said stop and play positions thereof so that movement of said tape control means between said stop and play positions thereof causes corresponding movement of said reel control means between said stop and play positions thereof, said reel control means being also movable between said stop, play and wind positions thereof independently of said tape control means.

10. In a magnetic tape transport of the class in which the tape is mounted on a pair of reels for selective winding and playing movement on a predetermined path and in either longitudinal direction past magnetic transducing means, the combination comprising:

main drive means having an output member mounted for rotation in one direction for driving said tape in a forward longitudinal direction and toward a first of said reels, and for rotation in the opposite direction for driving said tape in the reverse longitudinal direction and toward the second of said reels;

direction control means coupled to said main drive means for selectively causing rotation of said output member in said one and opposite rotational directions;

a pair of tape driving capstans mounted on said tape path at either side of said transducing means and coupled to said output member for conjoint rotation therewith to drive said tape in said forward and reverse longitudinal directions;

tape control means having play and stop positions for selectively engaging and disengaging said tape and both of said capstans conjointly, said tape control means including a play slide member mounted for sliding motion between said stop and play positions, and latch means for holding said play slide member in said play position thereof;

reel drive means coupled to said output member and having a stop position disengaged from both of said reels and a pair of play positions and a pair of wind positions constituting reel-driving positions and selectively controlled by the rotational direction of said output member, said reel drive means engaging a different one of said reels in each of said play positions and in each of said wind positions for driving said respective engaged reel in a tape winding direction so as to wind up said tape on said first reel upon rotation of said output member in said one direction thereof and to wind up said tape on said second reel upon rotation of said output member in said opposite direction thereof;

self-energizing and de-energizing reel brake means mounted for continuous engagement with at least reel control means having a stop position engaging and holding said reel drive means and said brake means in said stop positions thereof, and play and wind positions disengaged from said reel drive means and engaging and holding said brake means in the corresponding one of said play and wind positions thereof;

said tape control means having a lost-motion connection with said reel control means in said stop and play positions thereof so that movement of said tape control means between said stop and play positions thereof causes corresponding movement of said reel control means between said stop and play positions thereof, said reel control means being also movable between said stop, play and wind positions thereof independently of said tape control means.

7. In a magnetic tape transport of the class in which the tape is mounted on a pair of reels for selective winding and playing movement on a predetermined path and in either longitudinal direction past magnetic transducing means, the combination comprising:

main drive means having an output member mounted for rotation in one direction for driving said tape in a forward longitudinal direction and toward a first of said reels, and for rotation in the opposite direction for driving said tape in the reverse longitudinal direction and toward the second of said reels;

direction control means coupled to said main drive means for selectively causing rotation of said output member in said one and opposite rotational directions;

a pair of tape driving capstans mounted on said tape path at either side of said transducing means and coupled to said output member for conjoint rotation therewith to drive said tape in said forward and reverse longitudinal directions;

tape control means having play and stop positions for selectively engaging and disengaging said tape and both of said capstans conjointly, said tape control means including a play slide member mounted for sliding motion between said stop and play positions, means for urging said play slide member toward said stop position thereof, and latch means for holding said play slide member in said play position thereof against the urging of said urging means;

reel drive means coupled to said output member and having a stop position disengaged from both of said reels and a pair of play positions and a pair of wind positions constituting reel-driving positions and selectively controlled by the rotational direction of said output member, said reel drive means engaging a different one of said reels in each of said play positions and in each of said wind positions for driving said respective engaged reel in a tape winding direction so as to wind up said tape on said first reel upon rotation of said output member in said one direction thereof and to wind up said tape on said second reel upon rotation of said output member in said opposite direction thereof;

self-energizing and de-energizing reel brake means mounted for continuous engagement with at least the supply one of said reels and urged thereby for movement from stop, through play and to wind positions of decreasing supply reel braking force in each direction of rotation of said reels;

reel control means having a stop position engaging and holding said reel drive means and said brake means in said stop positions thereof, and play and wind positions disengaged from said reel drive means and engaging and holding said brake means in the corresponding one of said play and wind positions thereof;

said tape control means having a lost-motion connection with said reel control means in said stop and play positions thereof so that movement of said tape control means between said stop and play positions thereof causes corresponding movement of said reel control means between said stop and play positions thereof, said reel control means being also movable between said stop, play and wind positions thereof independently of said tape control means.

8. In a magnetic tape transport of the class in which the tape is mounted on a pair of reels for selective winding and playing movement on a predetermined path and in either longitudinal direction past magnetic transducing means, the combination comprising:

main drive means having an output member mounted for rotation in one direction for driving said tape in a forward longitudinal direction and toward a first of said reels, and for rotation in the opposite direction for driving said tape in the reverse longitudinal direction and toward the second of said reels;

direction control means coupled to said main drive means for selectively causing rotation of said output member in said one and opposite rotational directions;

a pair of tape driving capstans mounted on said tape path at either side of said transducing means and coupled to said output member for conjoint rotation therewith to drive said tape in said forward and reverse longitudinal directions;

tape control means having play and stop positions for selectively engaging and disengaging said tape and both of said capstans conjointly, said tape control means including a play slide member mounted for sliding motion between said stop and play positions, means for urging said play slide member toward said stop position thereof, latch means for holding said play slide member in said play position thereof against the urging of said urging means, a pair of pinch rollers each mounted at one end of a centrally pivoted arm for swinging motion toward and away from a position of engagement with a respective one of said capstans, the other end of each arm constituting a cam follower, and a pair of cams mounted on said play slide member for movement therewith between said play and stop positions thereof, each of said cams engaging one of said cam follower ends of said arms and urging said respective roller thereby to said position of capstan engagement in said play position of said play slide member, and away from said position of capstan engagement in said stop position of said play slide member;

reel drive means coupled to said output member and having a stop position disengaged from both of said reels and a pair of play positions and a pair of wind positions constituting reel-driving positions and selectively controlled by the rotational direction of said output member, said reel drive means engaging a different one of said reels in each of said play positions and in each of said wind positions for driving said respective engaged reel in a tape winding direction so as to wind up said tape on said first reel upon rotation of said output member in said one direction thereof and to wind up said tape on said second reel upon rotation of said output member in said opposite direction thereof;

self-energizing and de-energizing reel brake means mounted for continuous engagement with at least the supply one of said reels and urged thereby for movement from stop, through play and to wind positions of decreasing supply reel braking force in each direction of rotation of said reels;

reel control means having a stop position engaging and holding said reel drive means and said brake means in said stop positions thereof, and play and wind positions disengaged from said reel drive means and engaging and holding said brake means in the corresponding one of said play and wind positions thereof;

the supply one of said reels and urged thereby for movement from stop, through play and to wind positions of decreasing supply reel braking force in each direction of rotation of said reels;

reel control means having a stop position engaging and holding said reel drive means and said brake means in said stop positions thereof, and play and wind positions disengaged from said reel drive means and engaging and holding said brake means in the corresponding one of said play and wind positions thereof;

said reel control means including a wind slide member mounted for sliding motion between said stop, play and wind positions thereof and in the same direction as said play slide member, said wind slide member being positioned to substantially abut said play slide member so that said play slide member in movement from said stop to said play position thereof engages and forces said wind slide member from said stop to said play position thereof, means for urging said wind slide member toward said stop position thereof, whereby said play slide member is also urged to said stop position thereof, and whereby upon return of said play slide member to said stop position thereof, said wind slide member is returned to said stop position thereof, and latch means for holding said wind slide member in said wind position thereof against the urging of said wind slide member urging means.

11. In a magnetic tape transport of the class in which the tape is mounted on a pair of reels for selective winding and playing movement on a predetermined path and in either longitudinal direction past magnetic transducing means, the combination comprising:

main drive means having an output member mounted for rotation in one direction for driving said tape in a forward longitudinal direction and toward a first of said reels, and for rotation in the opposite direction for driving said tape in the reverse longitudinal direction and toward the second of said reels;

direction control means coupled to said main drive means for selectively causing rotation of said output member in said one and opposite rotational directions;

a pair of tape driving capstans mounted on said tape path at either side of said transducing means and coupled to said output member for conjoint rotation therewith to drive said tape in said forward and reverse longitudinal directions;

tape control means having play and stop positions for selectively engaging and disengaging said tape and both of said capstans conjointly, said tape control means including a play slide member mounted for sliding motion between said stop and play positions, and latch means for holding said play slide member in said play position thereof;

reel drive means coupled to said output member and having a stop position disengaged from both of said reels and a pair of play positions and a pair of wind positions constituting reel-driving positions and selectively controlled by the rotational direction of said output member, said reel drive means engaging a different one of said reels in each of said play positions and in each of said wind positions for driving said respective engaged reel in a tape winding direction so as to wind up said tape on said first reel upon rotation of said output member in said one direction thereof and to wind up said tape on said second reel upon rotation of said output member in said opposite direction thereof;

self-energizing and de-energizing reel brake means mounted for continuous engagement with at least the supply one of said reels and urged thereby for movement from stop, through play and to wind positions of decreasing supply reel braking force in each direction of rotation of said reels;

reel control means having a stop position engaging and holding said reel drive means and said brake means in said stop positions thereof, and play and wind positions disengaged from said reel drive means and engaging and holding said brake means in the corresponding one of said play and wind positions thereof;

said reel control means including a wind slide member mounted for sliding motion between said stop, play and wind positions thereof and in the same direction as said play slide member, said wind slide member being positioned to substantially abut said play slide member so that said play slide member in movement from said stop to said play position thereof engages and forces said wind slide member from said stop to said play position thereof, means for urging said wind slide member toward said stop position thereof, whereby said play slide member is also urged to said stop position thereof, and whereby upon return of said play slide member to said stop position thereof, said wind slide member is returned to said stop position thereof, and latch means for holding said wind slide member in said wind position thereof against the urging of said wind slide member urging means;

said tape control means including a manually operable play-record button coupled to said play slide member for sliding motion therewith, said play-record button having a first shoulder facing in the direction of the play position of said play slide member;

said reel control means including a manually-operable fast-wind button mounted for sliding movement between stop and wind positions and having a lost-motion connection to said wind slide member such that movement of said fast-wind button to wind position causes movement of said wind slide member to wind position but movement of said wind slide member to play position as caused by movement of said play slide member to play position leaves said fast-wind button in stop position, said fast-wind button having a second shoulder facing in the direction of the wind position of said wind slide member and a third shoulder facing away from said second shoulder; and a detent member mounted for reciprocal motion between said play-record and wind buttons such that upon movement of one of said buttons away from stop position said detent member is caused to engage one of said shoulders of said other button to prevent movement of said other button away from stop position, said detent member and said third shoulder constituting said wind slide member latch means;

said direction control means including a manually operabe forward-reverse button and switch means operable thereby to control the rotational direction of said main drive means output member, said forward-reverse button being mounted for sliding motion generally parallel to said tape path in the vicinity of said transducing means, spring means urging said forward-reverse button toward a forward position thereof, and latch means for holding said forward-reverse button in a reverse position against the urging of said spring means, said forward-reverse button having an extension and said detent member having a portion obtruding into the path of said extension only when said detent member is engaging said fast-wind button third shoulder so as to block movement of said forward-reverse button between said forward and reverse positions thereof.

12. In a magnetic tape transport of the class in which the tape is mounted on a pair of reels for selective winding and playing movement on a predetermined path and in either longitudinal direction past magnetic transducing means, the combination comprising:

main drive means having an output member mounted for rotation in one direction for driving said tape in a forward longitudinal direction and toward a first of said reels, and for rotation in the opposite direction for driving said tape in the reverse longitudinal direction and toward the second of said reels;

direction control means coupled to said main drive means for selectively causing rotation of said output member in said one and opposite rotational directions;

a pair of tape driving capstans mounted on said tape path at either side of said transducing means and coupled to said output member for conjoint rotation therewith to drive said tape in said forward and reverse longitudinal directions;

tape control means having play and stop positions for selectively engaging and disengaging said tape and both of said capstans conjointly, said tape control means including a play slide member mounted for sliding motion between said stop and play positions, means for urging said play slide member toward said stop position thereof, and latch means for holding said play slide member in said play position thereof against the urging of said urging means;

reel drive means coupled to said output member and having a stop position disengaged from both of said reels and a pair of play positions and a pair of wind positions constituting reel-driving positions and selectively controlled by the rotational direction of said output member, said reel drive means engaging a different one of said reels in each of said play positions and in each of said wind positions for driving said respective engaged reel in a tape winding direction so as to wind up said tape on said first reel upon rotation of said output member in said one direction thereof and to wind up said tape on said second reel upon rotation of said output member in said opposite direction thereof;

drum means mounted for rotation with each of said reels;

said reel drive means including a rocking arm mounted for central pivoting motion midway between said reels, a pair of pulleys mounted at the ends of said rocking arm for alternative engagement with said drum means, said rocking arm in said stop position thereof being aligned so that said pulleys are both retracted from the respective drum means, and in said reel-driving positions thereof being pivoted to engage a respective one of said pulleys with the corresponding drum means, a drive belt looped around said pulleys and said main drive means output element in such a manner that said drive belt moves from said output element to that pulley corresponding to the supply reel in each direction of rotation of said output element, whereby said arm tends to pivot to engage the takeup reel pulley with the takeup reel drum means for driving of the takeup reel in a tape-winding direction, while the supply reel pulley remains disengaged from the supply reel drum means, the selection of the driven drum means being automatically controlled by the direction of rotation of said output element;

self-energizing and de-energizing reel brake means mounted for continuous engagement with at least the supply one of said reels and urged thereby for movement from stop, through play and to wind positions of decreasing supply reel braking force in each direction of rotation of said reels;

reel control means having a stop position engaging and holding said reel drive means and said brake means in said stop positions thereof, and play and wind positions disengaged from said reel drive means and engaging and holding said brake means in the corresponding one of said play and wind positions thereof;

said reel control means having a portion engaging and centralizing said rocking arm in the stop position thereof upon movement of said reel control means to said stop position thereof, whereby the drive train is broken to both of said reels;

said tape control means having a lost-motion connection with said reel control means in said stop and play positions thereof so that movement of said tape control means between said stop and play positions thereof causes corresponding movement of said reel control means between said stop and play positions thereof, said reel control means being also movable between said stop, play and wind positions thereof independently of said tape control means.

13. In a magnetic tape transport of the class in which the tape is mounted on a pair of reels for selective winding and playing movement on a predetermined path and in either longitudinal direction past magnetic transducing means, the combination comprising:

main drive means having an output member mounted for rotation in one direction for driving said tape in a forward longitudinal direction and toward a first of said reels, and for rotation in the opposite direction for driving said tape in the reverse longitudinal direction and toward the second of said reels;

direction control means coupled to said main drive means for selectively causing rotation of said output member in said one and opposite rotational directions;

a pair of tape driving capstans mounted on said tape path at either side of said transducing means and coupled to said output member for conjoint rotation therewith to drive said tape in said forward and reverse longitudinal directions;

tape control means having play and stop positions for selectively engaging and disengaging said tape and both of said capstans conjointly, said tape control means including a play slide member mounted for sliding motion between said stop and play positions, means for urging said play slide member toward said stop position thereof, and latch means for holding said play slide member in said play position thereof against the urging of said urging means;

reel drive means coupled to said output member and having a stop position disengaged from both of said reels and a pair of play positions and a pair of wind positions constituting reel-driving positions and selectively controlled by the rotational direction of said output member, said reel drive means engaging a different one of said reels in each of said play positions and in each of said wind positions for driving said respective engaged reel in a tape winding direction so as to wind up said tape on said first reel upon rotation of said output member in said one direction thereof and to wind up said tape on said second reel upon rotation of said output member in said opposite direction thereof;

drum means mounted for rotation with each of said reels;

said reel drive means including a rocking arm mounted for central pivoting motion midway between said reels, a pair of pulleys mounted at the ends of said rocking arm for alternative engagement with said drum means, said rocking arm in said stop position thereof being aligned so that said pulleys are both retracted from the respective drum means, and in said reel-driving positions thereof being pivoted to engage a respective one of said pulleys with the corresponding drum means, a drive belt looped around said pulleys and said main drive means output element in such a manner that said drive belt moves from said output element to that pulley corresponding to the supply reel in each direction of rotation of said output element, whereby said arm tends to pivot to engage the takeup reel pulley with the takeup reel drum means for driving of the takeup reel in a tape-winding direction, while the supply reel pulley remains disengaged from the supply reel drum means, the selection of the driven drum means being automatically controlled by the direction of rotation of said output element;

self-energizing and de-energizing reel brake means mounted for continuous engagement with at least the supply one of said reels and urged thereby for movement from stop, through play and to wind positions of decreasing supply reel braking force in each direction of rotation of said reels;

reel control means having a stop position engaging and holding said reel drive means and said brake means in said stop positions thereof, and play and wind positions disengaged from said reel drive means and engaging and holding said brake means in the corresponding one of said play and wind positions thereof;

said reel control means having a portion engaging and centralizing said rocking arm in the stop position thereof upon movement of said reel control means to said stop position thereof, whereby the drive train is broken to both of said reels;

said tape control means having a lost-motion connection with said reel control means in said stop and play positions thereof so that movement of said tape control means between said stop and play positions thereof causes corresponding movement of said reel control means between said stop and play positions thereof, said reel control means being also movable between said stop, play and wind positions thereof independently of said tape control means;

said drum means and pulleys including portions of different diameters providing a play speed drive for said reels and a faster wind speed drive for said reels, said portions providing said wind speed drive being engaged upon movement of only said reel control means away from the stop position thereof; and means coupled to said tape control means for causing engagement of said drum means and pulley portions providing said play speed reel drive upon movement of both said reel control means and tape control means to said play positions thereof.

14. In a magnetic tape transport of the class in which the tape is mounted on a pair of reels for selective winding and playing movement on a predetermined path and in either longitudinal direction past magnetic transducing means, the combination comprising:

main drive means having an output member mounted for rotation in one direction for driving said tape in a forward longitudinal direction and toward a first of said reels, and for rotation in the opposite direction for driving said tape in the reverse longitudinal direction and toward the second of said reels;

direction control means coupled to said main drive means for selectively causing rotation of said output member in said one and opposite rotational directions;

a pair of tape driving capstans mounted on said tape path at either side of said transducing means and coupled to said output member for conjoint rotation therewith to drive said tape in said forward and reverse longitudinal directions;

tape control means having play and stop positions for selectively engaging and disengaging said tape and both of said capstans conjointly, said tape control means including a play slide member mounted for sliding motion between said stop and play positions, means for urging said play slide member toward said stop position thereof, and latch means for holding said play slide member in said play position thereof against the urging of said urging means;

reel drive means coupled to said output member and having a stop position disengaged from both of said reels and a pair of play positions and a pair of wind positions constituting reel-driving positions and selectively controlled by the rotational direction of said output member, said reel drive means engaging a different one of said reels in each of said play positions and in each of said wind positions for driving said respective engaged reel in a tape winding direction so as to wind up said tape on said first reel upon rotation of said output member in said one direction thereof and to wind up said tape on said second reel upon rotation of said output member in said opposite direction thereof;

drum means mounted for rotation with each of said reels;

said reel drive means including a rocking arm mounted for central pivoting motion midway between said reels, a pair of pulleys mounted at the ends of said rocking arm for alternative engagement with said drum means, said rocking arm in said stop position thereof being aligned so that said pulleys are both retracted from the respective drum means, and in said reel-driving positions thereof being pivoted to engage a respective one of said pulleys with the corresponding drum means, a drive belt looped around said pulleys and said main drive means output element in such a manner that said drive belt moves from said output element to that pulley corresponding to the supply reel in each direction of rotation of said output element, whereby said arm tends to pivot to engage the takeup reel pulley with the takeup reel drum means for driving of the takeup reel in a tape-winding direction, while the supply reel pulley remains disengaged from the supply reel drum means, the selection of the driven drum means being automatically controlled by the direction of rotation of said output element;

self-energizing and de-energizing reel brake means mounted for continuous engagement with at least the supply one of said reels and urged thereby for movement from stop, through play and to wind positions of decreasing supply reel braking force in each direction of rotation of said reels;

reel control means having a stop position engaging and holding said reel drive means and said brake means in said stop positions thereof, and play and wind positions disengaged from said reel drive means and engaging and holding said brake means in the corresponding one of said play and wind positions thereof;

said reel control means having a portion engaging and centralizing said rocking arm in the stop position thereof upon movement of said reel control means to said stop position thereof, whereby the drive train is broken to both of said reels;

said tape control means having a lost-motion connection with said reel control means in said stop and play positions thereof so that movement of said tape control means between said stop and play positions thereof causes corresponding movement of said reel control means between said stop and play positions thereof, said reel control means being also movable between said stop, play and wind positions thereof independently of said tape control means;

each of said pulleys having a wind portion and a play portion with said wind portion being of greater diameter than said play portion;

each of said drum means including a wind drum in the same plane of said pulley wind portions, and a play drum of greater diameter and keyed for rotation with said wind drum and for axial sliding motion with respect thereto, and means for urging each of said play drums axially away from the corresponding wind drum and out of the plane of said pulley play portions; and means coupled to said tape control means for moving said play drums against the urging of said play drum urging means and into the plane of said pulley play portions upon movement of said tape control means to said play position thereof;

the sum of the diameters of each of said play drums and corresponding pulley play portions being substantially greater than the sum of the diameters of the corresponding wind drum and pulley wind portion, whereby said wind drums and corresponding pulley wind portions are disengaged during engagement of said play drums and pulley play portions.

15. In a magnetic tape transport of the class in which the tape is mounted on a pair of reels for selective winding and playing movement on a predetermined path and in either longitudinal direction past magnetic transducing means, the combination comprising:

main drive means having an output member mounted for rotation in one direction for driving said tape in a forward longitudinal direction and toward a first of said reels, and for rotation in the opposite direction for driving said tape in the reverse longitudinal direction and toward the second of said reels;

direction control means coupled to said main drive means for selectively causing rotation of said output member in said one and opposite rotational directions;

a pair of tape driving capstans mounted on said tape path at either side of said transducing means and coupled to said output member for conjoint rotation therewith to drive said tape in said forward and reverse longitudinal directions;

tape control means having play and stop positions for selectively engaging and disengaging said tape and both of said capstans conjointly, said tape control means including a play slide member mounted for sliding motion between said stop and play positions, means for urging said play slide member toward said stop position thereof, and latch means for holding said play slide member in said play position thereof against the urging of said urging means;

reel drive means coupled to said output member and having a stop position disengaged from both of said reels and a pair of play positions and a pair of wind positions constituting reel-driving positions and selectively controlled by the rotational direction of said output member, said reel drive means engaging a different one of said reels in each of said play positions and in each of said wind positions for driving said respective engaged reel in a tape winding direction so as to wind up said tape on said first reel upon rotation of said output member in said one direction thereof and to wind up said tape on said second reel upon rotation of said output member in said opposite direction thereof;

drum means mounted for rotation with each of said reels;

said reel drive means including a rocking arm mounted for central pivoting motion midway between said reels, a pair of pulleys mounted at the ends of said rocking arm for alternative engagement with said drum means, said rocking arm in said stop position thereof being aligned so that said pulleys are both retracted from the respective drum means, and in said reel-driving positions thereof being pivoted to engage a respective one of said pulleys with the corresponding drum means, a drive belt looped around said pulleys and said main drive means output element in such a manner that said drive belt moves from said output element to that pulley corresponding to the supply reel in each direction of rotation of said output element, whereby said arm tends to pivot to engage the takeup reel pulley with the takeup reel drum means for driving of the takeup reel in a tape-winding direction, while the supply reel pulley remains disengaged from the supply reel drum means, the selection of the driven drum means being automatically controlled by the direction of rotation of said output element;

said arm, said pulleys and said drum means being arranged so that upon engagement of one of said pulleys with one of said drum means, said arm is inclined at an acute angle to the plane of tangency of said pulley and corresponding drum means, whereby automatic pressurized frictional engagement of said pulley and drum means is caused;

self-energizing and de-energizing reel brake means mounted for continuous engagement with at least the supply one of said reels and urged thereby for movement from stop, through play and to wind positions of decreasing supply reel braking force in each direction of rotation of said reels;

reel control means having a stop position engaging and holding said reel drive means and said brake means in said stop positions thereof, and play and wind positions disengaged from said reel drive means and engaging and holding said brake means in the corresponding one of said play and wind positions thereof;

said reel control means having a portion engaging and centralizing said rocking arm in the stop position thereof upon movement of said reel control means to said stop position thereof, whereby the drive train is broken to both of said reels;

said tape control means having a lost-motion connection with said reel control means in said stop and play positions thereof so that movement of said tape control means between said stop and play positions thereof causes corresponding movement of said reel control means between said stop and play positions thereof, said reel control means being also movable between said stop, play and wind positions thereof independently of said tape control means;

each of said pulleys having a wind portion and a play portion with said wind portion being of greater diameter than said play portion;

each of said pulleys having a frictional slipping clutch between the play and wind portions thereof, said pulley drive belt being coupled to said wind portions of said pulleys;

each of said drum means including a wind drum in the same plane as said pulley wind portions, and a play drum of greater diameter and mounted for axial sliding motion with respect thereto, and means for urging each of said play drums axially away from the corresponding wind drum and out of the plane of said pulley play portion, a key member solidly mounted for rotation with the corresponding reel and having a portion axially slidably extending through a conforming opening in the corresponding play drum so as to key said play drum to said reel, a tension spring coupling said wind drum and said key member so as to urge said wind drum to rotate in the same direction as said reel when said reel is being driven by said tape in a tape unwinding direction, and stop means extending from said wind drum and engaging said key member so as to force said wind drum to rotate in the same direction as said play drum when said play drum is being driven in a tape take-up direction, and said brake means being arranged to engage said wind drum; and a tilting plate engaging said play drums and mounted for pivoted tilting motion to move said play drums in an axial direction against the urging of said play drum urging means, a cam mounted on said tape control means, and a cam follower pin coupled between said tilting plate and cam, whereby movement of said tape control means from stop to play position causes movement of said cam, said cam follower pin, said tilting plate, and said play drums to corresponding play positions with said play drums in the plane of said pulley play portions;

the sum of the diameters of each of said play drums and corresponding pulley play portions being substantially greater than the sum of the diameters of the corresponding wind drum and pulley wind portion, whereby said wind drums and corresponding pulley wind portions are disengaged during engagement of said play drums and pulley play portions.

16. In a magnetic tape transport of the class in which the tape is mounted on a pair of reels for selective winding and playing movement on a predetermined path and in either longitudinal direction past magnetic transducing means, the combination comprising:

main drive means having an output member mounted for rotation in one direction for driving said tape in a forward longitudinal direction and toward a first of said reels, and for rotation in the opposite direction for driving said tape in the reverse longitudinal direction and toward the second of said reels;

direction control means coupled to said main drive means for selectively causing rotation of said output member in said one and opposite rotational directions;

a pair of tape driving capstans mounted on said tape path at either side of said transducing means and coupled to said output member for conjoint rotation therewith to drive said tape in said forward and reverse longitudinal directions;

tape control means having play and stop positions for selectively engaging and disengaging said tape and both of said capstans conjointly;

reel drive means coupled to said output member and having a stop position disengaged from both of said reels and a pair of play positions and a pair of wind positions constituting reel-driving positions and selectively controlled by the rotational direction of said output member, said reel drive means engaging a different one of said reels in each of said play positions and in each of said wind positions for driving said respective engaged reel in a tape winding direction so as to wind up said tape on said first reel upon rotation of said output member in said one direction thereof and to wind up said tape on said second reel upon rotation of said output member in said opposite direction thereof;

drum means mounted for rotation with each of said reels;

an elongated brake bar spanning the space between said reels and tangentially frictionally engaging both of said drum means, said bar being mounted for longitudinal sliding motion between forward and reverse supply reel braking positions so as to be driven by said drum means toward said second reel and to said forward braking position upon movement of said tape in said forward direction thereof, and toward said first reel and to said reverse braking position upon movement of said tape in said reverse direction thereof;

a pair of rollers mounted in fixed axial relation to said drum means and on the side of said brake bar opposite the points of tangential engagement between said bar and drum means;

a pair of brake leaf springs mounted on said side of said bar and extending parallel thereto and spaced therefrom from the middle portion of said bar toward the ends thereof for engagement with the sides of said rollers that face said drum means, the spacing between the extending portions of said brake leaf springs and said bar being such as to provide pinching of each brake leaf spring and said bar between said corresponding roller and drum means and consequent increased frictional braking engagement of said bar and corresponding drum means;

said brake leaf springs being positioned on said bar for engagement of only one of said brake leaf springs at a time with the corresponding roller, with said brake leaf spring corresponding with said second reel engaging the corresponding roller in the forward braking position of said bar, and the other brake leaf spring engaging the corresponding roller in the reverse braking position of said bar;

reel control means including a wind slide member having a stop position engaging and holding said reel drive means and said brake means in said stop positions thereof, and play and wind positions disengaged from said reel drive means and engaging and holding said brake means in the corresponding one of said play and wind positions thereof;

said tape control means having a lost-motion connection with said reel control means in said stop and play positions thereof so that movement of said tape control means between said stop and play positions thereof causes corresponding movement of said reel control means between said stop and play positions thereof, said reel control means being also movable between said stop, play and wind positions thereof independently of said tape control means.

17. In a magnetic tape transport of the class in which the tape is mounted on a pair of reels for selective winding and playing movement on a predetermined path and in either longitudinal direction past magnetic transducing means, the combination comprising:

main drive means having an output member mounted for rotation in one direction for driving said tape in a forward longitudinal direction and toward a first of said reels, and for rotation in the opposite direction for driving said tape in the reverse longitudinal direction and toward the second of said reels;

direction control means coupled to said main drive means for selectively causing rotation of said output member in said one and opposite rotational directions;

a pair of tape driving capstans mounted on said tape path at either side of said transducing means and coupled to said output member for conjoint rotation therewith to drive said tape in said forward and reverse longitudinal directions;

tape control means having play and stop positions for selectively engaging and disengaging said tape and both of said capstans conjointly;

reel drive means coupled to said output member and having a stop position disengaged from both of said reels and a pair of play positions and a pair of wind positions constituting reel-driving positions and selectively controlled by the rotational direction of said output member, said reel drive means engaging a different one of said reels in each of said play positions and in each of said wind positions for driving said respective engaged reel in a tape winding direction so as to wind up said tape on said first reel upon rotation of said output member in said one direction thereof and to wind up said tape on said second reel upon rotation of said output member in said opposite direction thereof;

drum means mounted for rotation with each of said reels;

an elongated brake bar spanning the space between said reels and tangentially frictionally engaging both of said drum means, said bar being mounted for longitudinal sliding motion between forward and reverse supply reel braking positions so as to be driven by said drum means toward said second reel and to said forward braking position upon movement of said tape in said forward direction thereof, and toward said first reel and to said reverse braking position upon movement of said tape in said reverse direction thereof;

a pair of rollers mounted in fixed axial relation to said drum means and on the side of said brake bar opposite the points of tangential engagement between said bar and drum means;

a pair of brake leaf springs mounted on said side of said bar and extending parallel thereto and spaced therefrom from the middle portion of said bar toward the ends thereof for engagement with the sides of said rollers that face said drum means, the spacing between the extending portions of said brake leaf springs and said bar being such as to provide pinching of each brake leaf spring and said bar between said corresponding roller and drum means and consequent increased frictional braking engagement of said bar and corresponding drum means;

said brake leaf springs being positioned on said bar for engagement of only one of said brake leaf springs at a time with the corresponding roller, with said brake leaf spring corresponding with said second reel engaging the corresponding roller in the forward braking position of said bar, and the other brake leaf spring engaging the corresponding roller in the reverse braking position of said bar;

reel control means including a wind slide member having a stop position engaging and holding said reel drive means and said brake means in said stop positions thereof, and play and wind positions disengaged from said reel drive means and engaging and holding said brake means in the corresponding one of said play and wind positions thereof;

said brake bar being provided with a pair of motion-limiting lugs extending therefrom in a direction generally away from said drum means; and said wind slide member being mounted for movement in the plane of said drum means in a direction normal to the length of said bar, said wind slide member being provided with a portion extending between said lugs for alternatively engaging same and establishing the limits of motion of said brake bar in the forward and reverse braking positions thereof, and in all of said stop, play, and wind positions of said wind slide member;

said tape control means having a lost-motion connection with said reel control means in said stop and play positions thereof so that movement of said tape control means between said stop and play positions thereof causes corresponding movement of said reel control means between said stop and play positions thereof, said reel control means being also movable between said stop, play and wind positions thereof independently of said tape control means.

18. In a magnetic tape transport of the class in which the tape is mounted on a pair of reels for selective winding and playing movement on a predetermined path and in either longitudinal direction past magnetic transducing means, the combination comprising:

main drive means having an output member mounted for rotation in one direction for driving said tape in a forward longitudinal direction and toward a first of said reels, and for rotation in the opposite direction for driving said tape in the reverse longitudinal direction and toward the second of said reels;

direction control means coupled to said main drive means for selectively causing rotation of said output member in said one and opposite rotational directions;

a pair of tape driving capstans mounted on said tape path at either side of said transducing means and coupled to said output member for conjoint rotation therewith to drive said tape in said forward and reverse longitudinal directions;

tape control means having play and stop positions for selectively engaging and disengaging said tape and both of said capstans conjointly;

reel drive means coupled to said output member and having a stop position disengaged from both of said reels and a pair of play positions and a pair of wind positions constituting reel-driving positions and selectively controlled by the rotational direction of said output member, said reel drive means engaging a different one of said reels in each of said play positions and in each of said wind positions for driving said respective engaged reel in a tape winding direction so as to wind up said tape on said first reel upon rotation of said output member in said one direction thereof and to wind up said tape on said second reel upon rotation of said output member in said opposite direction thereof;

drum means mounted for rotation with each of said reels;

an elongated brake bar spanning the space between said reels and tangentially frictionally engaging both of said drum means, said bar being mounted for longitudinal sliding motion between forward and reverse supply reel braking positions so as to be driven by said drum means toward said second reel and to said forward braking position upon movement of said tape in said forward direction thereof, and toward said first reel and to said reverse braking position upon movement of said tape in said reverse direction thereof;

a pair of rollers mounted in fixed axial relation to said drum means and on the side of said brake bar opposite the points of tangential engagement between said bar and drum means;

a pair of brake leaf springs mounted on said side of said bar and extending parallel thereto and spaced therefrom from the middle portion of said bar toward the ends thereof for engagement with the sides of said rollers that face said drum means, the spacing between the extending portions of said brake leaf springs and said bar being such as to provide pinching of each brake leaf spring and said bar between said corresponding roller and drum means and consequently increased frictional braking engagement of said bar and corresponding drum means;

said brake leaf springs being positioned on said bar for engagement of only one of said brake leaf springs at a time with the corresponding roller, with said brake leaf spring corresponding with said second reel engaging and corresponding roller in the forward braking position of said bar, and the other brake leaf spring engaging the corresponding roller in the reverse braking position of said bar;

reel control means including a wind slide member having a stop position engaging and holding said reel drive means and said brake means in said stop positions thereof, and play and wind positions disengaged from said reel drive means and engaging and holding said brake means in the corresponding one of said play and wind positions thereof;

said brake bar being provided with a pair of motion-limiting lugs extending therefrom in a direction generally away from said drum means;

said wind slide member being mounted for movement in the plane of said drum means in a direction normal to the length of said bar, said wind slide member being provided with a portion extending between said lugs for alternatively engaging same and establishing the limits of motion of said brake bar in the forward and reverse braking positions thereof, and in all of said stop, play, and wind positions of said wind slide member;

said lugs being provided with confronting faces inclined from said bar and towards one another and establishing a range of stop, play and wind positions of said bar in each of said forward and reverse positions thereof, and according to the location of said wind slide member and said extending portion thereof in the corresponding stop, play and wind positions thereof, the respective brake leaf spring and roller being engaged more closely adjacent the extending end of said respective brake leaf spring in said wind position than in said play position, and in said play position than in said stop position, whereby increasing supply reel braking force is applied in movement of said bar from said wind through said play to said stop position thereof;

said tape control means having a lost-motion connection with said reel control means in said stop and play positions thereof so that movement of said tape control means between said stop and play positions thereof causes corresponding movement of said reel control means between said stop and play positions thereof, said reel control means being also movable between said stop, play and wind positions thereof independently of said tape control means.

19. In a magnetic tape transport of the class in which the tape is mounted on a pair of reels for selective winding and playing movement on a predetermined path and in either longitudinal direction past magnetic transducing means, the combination comprising:

main drive means having an output member mounted for rotation in one direction for driving said tape in a forward longitudinal direction and toward a first of said reels, and for rotation in the opposite direction for driving said tape in the reverse longitudinal direction and toward the second of said reels;

direction control means coupled to said main drive means for selectively causing rotation of said output member in said one and opposite rotational directions;

a pair of tape driving capstans mounted on said tape path at either side of said transducing means and coupled to said output member for conjoint rotation therewith to drive said tape in said forward and reverse longitudinal directions;

tape control means having play and stop positions for selectively engaging and disengaging said tape and both of said capstans conjointly;

reel drive means coupled to said output member and having a stop position disengaging from both of said reels and a pair of play positions and a pair of wind positions constituting reel-driving positions and selectively controlled by the rotational direction of said output member, said reel drive means engaging a different one of said reels in each of said play positions and in each of said wind positions for driving said respective engaged reel in a tape winding direction so as to wind up said tape on said first reel upon rotation of said output member in said one direction thereof and to wind up said tape on said second reel upon rotation of said output member in said opposite direction thereof;

drum means mounted for rotation with each of said reels;

an elongated brake bar spanning the space between said reels and tangentially frictionally engaging both of said drum means, said bar being mounted for longitudinal sliding motion between forward and reverse supply reel braking positions so as to be driven by said drum means toward said second reel and to said forward braking position upon movement of said tape in said forward direction thereof, and toward said first reel and to said reverse braking position upon movement of said tape in said reverse direction thereof;

a pair of rollers mounted in fixed axial relation to said drum means and on the side of said brake bar opposite the points of tangential engagement between said bar and drum means;

a pair of brake leaf springs mounted on said side of said bar and extending parallel thereto and spaced therefrom from the middle portion of said bar toward the ends thereof for engagement with the sides of said rollers that face said drum means, the spacing between the extending portions of said brake leaf springs and said bar being such as to provide pinching of each brake leaf spring and said bar between said corresponding roller and drum means and consequent increased frictional braking engagement of said bar and corresponding drum means;

said brake leaf springs being positioned on said bar for engagement of only one of said brake leaf springs at a time with the corresponding roller, with said brake leaf spring corresponding with said second reel engaging the corresponding roller in the forward braking position of said bar, and the other brake leaf spring engaging the corresponding roller in the reverse braking position of said bar;

reel control means including a wind slide member having a stop position engaging and holding said reel drive means and said brake means in said stop positions thereof, and play and wind positions disengaged from said reel drive means and engaging and holding said brake means in the corresponding one of said play and wind positions thereof;

said brake bar being provided with a pair of motion-limiting lugs extending therefrom in a direction generally away from said drum means;

said wind slide member being mounted for movement in the plane of said drum means in a direction normal to the length of said bar, said wind slide member being provided with a portion extending between said lugs for alternatively engaging same and establishing the limits of motion of said brake bar in the forward and reverse braking positions thereof, and in all of said stop, play and wind positions of said wind slide member;

said lugs being provided with confronting faces inclined from said bar and towards one another and establishing a range of stop, play and wind positions of said bar in each of said forward and reverse positions thereof, and according to the location of said wind slide member and said extending portion thereof in the corresponding stop, play and wind positions thereof, the respective brake leaf spring and roller being engaged more closely adjacent the extending end of said respective brake leaf spring in said wind position than in said play position, and in said play position than in said stop position, whereby increasing supply reel braking force is applied in movement of said bar from said wind through said play to said stop position thereof;

a pair of stop leaf springs mounted on said side of said bar between said lugs and extending toward said lugs for engagement and compression by said extending portion of said wind slide member in the stop position thereof to apply to the takeup reel a stop mode braking force less than the supply reel stop mode braking force;

said tape control means having a lost-motion connection with said reel control means in said stop and play positions thereof so that movement of said tape control means between said stop and play positions thereof causes corresponding movement of said reel control means between said stop and play positions thereof, said reel control means being also movable between said stop, play and wind positions thereof independently of said tape control means.

20. In a magnetic tape transport of the class in which the tape is mounted on a pair of reels for selective winding and playing movement on a predetermined path and in either longitudinal direction past magnetic transducing means, the combination comprising:

main drive means having an output member mounted for rotation in one direction for driving said tape in a forward longitudinal direction and toward a first of said reels, and for rotation in the opposite direction for driving said tape in the reverse longitudinal direction and toward the second of said reels;

direction control means coupled to said main drive means for selectively causing rotation of said output member in said one and opposite rotational directions;

a pair of tape driving capstans mounted on said tape path at either side of said transducing means;

an elastic belt coupling said capstans to said output member for conjoint rotation therewith to drive said tape in said forward and reverse longitudinal directions, with the direction of motion of said belt in each direction of tape motion being from said output element to that one of said capstans that is farthest downstream with respect to the direction of tape motion, thence to the upstream capstan, and thence to said output element, whereby the downstream capstan in each direction of tape motion tends to drive said tape faster than the upstream capstan, and said tape is tensioned between said capstans;

said output member including a stepped pulley providing a plurality of different drive speeds for said capstans, each step of said pulley having a radially projecting portion on the axial side corresponding to the adjacent step of smaller diameter, and extending to the radius of the largest diameter step for assisting in the shifting of said belt to said each step from said adjacent smaller diameter step;

a belt-shifting device including a shaft mounted for rotation and for axial sliding motion parallel to the axis of said output member, a first pair of fork arms extending radially from said shaft and passing on either side of said belt on one side of said output member, a second pair of fork arms extending radially from said shaft and passing on either side of said belt on the other side of said output member, the angular spacing between said first and second pairs of fork arms being substantially greater than the angle subtended by said output member, whereby upon axial movement of said shaft to shift said belt upon said stepped pulley, said fork arms engage said belt and are rotated in the direction of motion thereof to bring that pair of fork arms that is upstream on the belt path into close proximity with said stepped pulley for more positive operation thereof in the shifting process;

tape control means having play and stop positions for selectively engaging and disengaging said tape and both of said capstans conjointly;

reel drive means coupled to said output member and having as stop position disengaged from both of said reels and a pair of play positions and a pair of wind positions constituting reel-driving positions and selectively controlled by the rotational direction of said output member, said reel drive means engaging a different one of said reels in each of said play positions and in each of said wind positions for driving said respective engaged reel in a tape winding direction so as to wind up said tape on said first reel upon rotation of said output member in said one direction thereof and to wind up said tape on said second reel upon rotation of said output member in said opposite direction thereof;

self-energizing and de-energizing reel brake means mounted for continuous engagement with at least the supply one of said reels and urged thereby for movement from stop, through play and to wind positions of decreasing supply reel braking force in each direction of rotation of said reels;

reel control means having a stop position engaging and holding said reel drive means and said brake means in said stop positions thereof, and play and wind positions disengaged from said reel drive means and engaging and holding said brake means in the corresponding one of said play and wind positions thereof;

said tape control means having a lost-motion connection with said reel control means in said stop and play positions thereof so that movement of said tape control means between said stop and play positions thereof causes corresponding movement of said reel control means between said stop and play positions thereof, said reel control means being also movable between said stop, play and wind positions thereof independently of said tape control means.

21. In a tape transport of the class in which the tape is mounted on a pair of reels for selective winding and playing movement on a predetermined path in both forward and reverse longitudinal directions past a transducing means, the combination comprising:

main drive means operable in forward and reverse directions;

a pair of tape driving capstans mounted on said tape path at either side of said transducing means;

an elastic belt coupled to said capstans and said drive means to drive said capstans and tape in said forward and reverse longitudinal directions, the direction of motion of said belt in each direction of tape motion being from said drive means to that one of said capstans that is upstream with respect to the direction of tape motion, thence to the downstream capstan, and thence to said drive means, whereby the downstream capstan in each direction of tape motion tends to drive said tape faster than the upstream capstan, and said tape is tensioned between said captans;

means for selectively coupling and uncoupling said tape and said capstans;

means for selectively coupling and uncoupling said main drive means and the takeup one of said reels for winding up said tape in the direction of movement thereof;

said tape-coupling means having a lost-motion connection with said reel-coupling means such that operation of said tape-coupling means causes corresponding operation of said reel-coupling means, said reel-coupling means being also operable independently of said tape-coupling means; and reel brake means operatively associated with said reels for continuous braking of at least the supply one of said reels.

22. A tape driving device comprising:

a tape arranged for motion in forward and reverse directions on a predetermined path;

a pair of rotatable capstans frictionally engaging said tape at spaced points on said path for causing said motion;

an endless elastic belt engaging both of said capstans for driving same;

the ratio of the tape-engaging and belt-engaging diameters of each capstan being equal to the ratio of said diameters of the other capstan; and reversible drive means arranged for driving said drive belt in a direction from said drive means to that one of said capstans that is upstream with respect to tape motion on said path, thence to the downstream capstan and thence to said drive means.

23. A tape driving device comprising:

a tape arranged for motion in forward and reverse directions on a predetermined path;

a pair of rotatable capstans frictionally engaging said tape at spaced points on said path for causing said motion;

an endless elastic belt engaging both of said capstans for driving same;

the ratio of the tape-engaging and belt-engaging diameters of each capstan being equal to the ratio of said diameters of the other capstan;

reversible drive means arranged for driving said drive belt in a direction from said drive means to that one of said capstans that is upstream on said path, thence to the downstream capstan and thence to said drive means; and means coupled to said drive means and controlled thereby for tensioning said tape upstream from said capstans in both directions of tape motion.

24. A tape driving device comprising:
a tape arranged for motion in forward and reverse directions on a predetermined path;
a pair of rotatable capstans frictionally engaging said tape at spaced points on said path for causing said motion;
an endless elastic belt engaging both of said capstans for driving same;
the ratio of the tape-engaging and belt-engaging diameters of each capstan being equal to the ratio of said diameters of the other capstan;
reversible drive means arranged for driving said drive belt in a direction from said drive means to that one of said capstans that is upstream on said path, thence to the downstream capstan and thence to said drive means;
means coupled to said drive means and controlled thereby for tensioning said tape upstream from said capstans in both directions of tape motion; and
a tape tensioning arm engaging said tape between said capstans for maintaining the tension thereof during stopping and reversal of said tape.

25. In a tape transport of the class in which the tape is mounted on a pair of reels for selective winding and playing movement on a predetermined path in both forward and reverse longitudinal directions past a transducing means, the combination comprising:
main drive means operable in forward and reverse directions;
a pair of tape driving capstans mounted on said tape path at either side of said transducing means and coupled to said drive means to drive said capstans and tape in said forward and reverse longitudinal directions;
each of said capstans having mounted contiguous thereto a pair of tape edge guiding flanges extending both upstream and downstream therefrom with respect to the direction of tape motion, and a pair of transverse tape guide posts mounted between said flanges and spaced from said capstan on either side thereof, the tape-engaging elements of said transport, including said capstans and posts, being arranged to induce bends in said tape at said capstans and posts for strengthening the lateral rigidity of said tape at said flanges;
means for selectively coupling and uncoupling said tape and said capstans;
means for selectively coupling and uncoupling said main drive means and the takeup one of said reels for winding up said tape in the direction of movement thereof;
said tape-coupling means having a lost-motion connection with said reel-coupling means such that operation of said tape-coupling means causes corresponding operation of said reel-coupling means, said reel-coupling means being also operable independently of said tape-coupling means; and
reel brake means operatively associated with said reels for continuous braking of at least the supply one of said reels.

26. In a tape transport of the class in which tape is mounted on a pair of reels for selective movement in either longitudinal direction, a braking apparatus comprising:
drum means mounted for rotation with each of said reels;
an elongated brake bar spanning the space between said reels and tangentially frictionally engaging both of said drum means, said bar being mounted for longitudinal sliding motion between forward and reverse supply reel braking positions so as to be driven by said drum means toward said second reel and to said forward braking position upon movement of said tape in said forward direction thereof, and toward said first reel and to said reverse braking position upon movement of said tape in said reverse direction thereof;
a pair of rollers mounted in fixed axial relation to said drum means and on the side of said brake bar opposite the points of tangential engagement between said bar and drum means;
a pair of brake leaf springs mounted on said side of said bar and extending parallel thereto and spaced therefrom from the middle portion of said bar toward the ends thereof for engagement with the sides of said rollers that face said drum means, the spacing between the extending portions of said brake leaf springs and said bar being such as to provide pinching of each brake leaf spring and said bar between said corresponding roller and drum means and consequent increased frictional braking engagement of said bar and corresponding drum means;
said brake leaf springs being positioned on said bar for engagement of only one of said brake leaf springs at a time with the corresponding roller, with said brake leaf spring corresponding with said second reel engaging the corresponding roller in the forward braking position of said bar, and the other brake leaf spring engaging the corresponding roller in the reverse braking position of said bar.

27. A belt shifting apparatus for use with a reversible drive means including a rotatable output element, a stepped pulley driven thereby, a belt and a driven member, comprising:
a shaft mounted for rotation and for axial sliding motion parallel to the axis of said output element;
a first pair of fork arms extending radially from said shaft and passing on either side of said belt on one side of said output element;
a second pair of fork arms extending radially from said shaft and passing on either side of said belt on the other side of said output element so that said pairs of fork arms have portions bracketing said output element;
said bracketing portions of said pairs of fork arms being spaced apart for a dimension substantially greater than the diameter of said output element;
whereby upon axial movement of said shaft to shift said belt upon said stepped pulley, said fork arms engage said belt and are rotated in the direction of motion thereof to bring that pair of fork arms that is upstream on the belt path into close proximity with said stepped pulley for more positive operation thereof in the shifting process.

28. In a tape transport of the class in which the tape is mounted on a pair of reels for selective winding and playing movement in both forward and reverse longitudinal directions, the combination comprising:
reversible drive means for said tape;
means for selectively coupling and uncoupling said tape and said drive means in both of said forward and reverse directions of operation;
means for selectively coupling and uncoupling said drive means and the takeup one of said reels for winding up said tape in the direction of movement thereof;
said tape-coupling means having a lost-motion connection with said reel-coupling means such that operation of said tape-coupling means causes corresponding operation of said reel-coupling means, said reel-coupling means being also operable independently of said tape-coupling means;
reel brake means operatively associated with said reels for continuous braking of at least the supply one of said reels;
means for recording and reproducing a predetermined signal on and from said tape; and reversing means coupled to said drive means and to said recording and reproducing means for receiving said signal upon reproduction thereof and for responding to cause reversal of said drive means.

29. A reversible tape recording and reproducing machine, comprising:

reversible drive means for said tape including a first switch having forward and reverse positions controlling the direction of motion of said tape;

a reversing solenoid having a coil and a plunger coupled to said first switch for positioning said first switch in reverse position when said plunger is centralized in said coil;

a spring coupled to said plunger and first switch for urging said first switch to forward position;

a direct current power source and a first resistor coupled in series to said coil and to ground for energizing said coil and urging said last switch toward reverse position with a force less than that needed to move the first switch from forward to reverse position against the urging of said spring but sufficient to hold said first switch in reverse position upon movement thereto;

a second normally open switch coupled in parallel with said first resistor and operating on closing to cause full energization of said coil to move said plunger and said first switch to reverse position;

a first relay coil, a second resistor, and a third switch coupled in series between said power source and ground, said third switch being mechanically coupled to said plunger so as to be open in the forward position of said first switch and closed in the reverse position of said first switch for energization of said first relay coil;

said first relay coil having a pair of normally closed contacts in the circuit between said second switch and power source;

a fourth switch coupled to ground and having a repeat contact;

said first relay coil having a pair of normally open contacts coupled between said repeat contact and said second switch;

a fifth normally open switch coupled to said first relay coil in parallel with said second resistor and in series with said second switch, said reversing solenoid coil and ground;

a second relay coil and a capacitor coupled in parallel, said second relay coil being mechanically coupled to close said second and fifth switches upon energization;

a third resistor and a sixth and a seventh switch coupled in series between said second relay coil and ground, said power source also being coupled to said second relay coil for the energization thereof upon closing of said sixth and seventh switches, said sixth switch being mechanically coupled to the manual controls of said machine so as to be closed only in the play mode thereof;

a vibrating arm mechanically coupled to close said seventh switch in one extreme position of vibration thereof;

a transducing head assembly for said tape and a third coil coupled to said assembly for transmitting and receiving signals to and from said assembly;

a core and a pair of pole tips electromagnetically linked with said third coil and said vibrating arm in one extreme position of vibration thereof;

means for manually causing vibration of said arm;

an eighth switch coupled between said power source and said reversing solenoid;

a tape tension sensing arm mounted on the path of said tape and controlling said eighth switch in a manner that said eighth switch is closed only when said tape is threaded and tensioned on said path at said arm;

an alternating current line power source;

a main power switch coupled between said line power source and said direct current power source for energization of the latter;

at least one other operating circuit of said machine coupled to said main power switch in parallel with said direct current power source;

a bypass switch coupled in parallel with said main power switch;

a manually operable play control assembly having play and stop positions and coupled to close said bypass switch only in said play position;

means for urging said assembly toward stop position; and latch means for holding said assembly in play position and including a play solenoid coupled to said direct current power source for energization.

References Cited

UNITED STATES PATENTS

| | | | |
|---|---|---|---|
| 2,658,398 | 11/1953 | Masterson | 242—55.14 X |
| 2,673,041 | 3/1954 | Hittle | 242—55.12 |
| 2,790,643 | 4/1957 | Gedde et al. | |
| 2,948,485 | 8/1960 | Cotte | 242—55.12 |
| 2,952,746 | 9/1960 | Sampson | 242—55.12 |
| Re. 22,970 | 2/1948 | Begun. | |
| 2,623,702 | 12/1952 | Masterson | 242—55.12 |
| 2,670,212 | 2/1954 | Heller et al. | 242—55.12 |
| 2,958,475 | 11/1960 | Mandell | 242—55.12 |
| 2,962,237 | 11/1960 | Loewe | 242—55.12 |
| 3,000,583 | 9/1961 | Hoskin | 242—55.12 |
| 3,003,710 | 10/1961 | Shiver et al. | 242—55.12 |
| 3,091,410 | 5/1963 | Widener | 242—55.12 |
| 3,092,344 | 6/1963 | Dinsmore et al. | 242—55.12 |
| 3,122,294 | 2/1964 | Laa | 226—188 |
| 3,199,834 | 6/1965 | Nakavchi | 226—181 X |
| 3,305,186 | 2/1967 | Burdorf et al. | 242—55.12 |

GEORGE F. MAUTZ, *Primary Examiner.*